(12) United States Patent
Nguyen et al.

(10) Patent No.: US 11,130,907 B2
(45) Date of Patent: Sep. 28, 2021

(54) COMPOSITIONS PROVIDING CONSOLIDATION AND WATER-CONTROL

(71) Applicant: Halliburton Energy Services, Inc., Houston, TX (US)

(72) Inventors: Philip D. Nguyen, Houston, TX (US); Loan K. Vo, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 33 days.

(21) Appl. No.: 16/731,159

(22) Filed: Dec. 31, 2019

(65) Prior Publication Data

US 2020/0148941 A1 May 14, 2020

Related U.S. Application Data

(62) Division of application No. 14/910,511, filed as application No. PCT/US2013/065241 on Oct. 16, 2013, now Pat. No. 10,563,118.

(51) Int. Cl.
*C09K 8/575* (2006.01)
*E21B 43/16* (2006.01)
(Continued)

(52) U.S. Cl.
CPC ............... *C09K 8/62* (2013.01); *C04B 28/02* (2013.01); *C09K 8/035* (2013.01); *C09K 8/487* (2013.01); *C09K 8/506* (2013.01); *C09K 8/512* (2013.01); *C09K 8/514* (2013.01); *C09K 8/52* (2013.01); *C09K 8/575* (2013.01); *C09K 8/5756* (2013.01); *C09K 8/5758* (2013.01); *C09K 8/602* (2013.01); *C09K 8/72* (2013.01); *C09K 8/80* (2013.01); *C09K 8/805* (2013.01); *E21B 21/00* (2013.01); *E21B 43/025* (2013.01); *E21B 43/04* (2013.01); *E21B 43/16* (2013.01); *E21B 43/26* (2013.01);
(Continued)

(58) Field of Classification Search
None
See application file for complete search history.

(56) References Cited

U.S. PATENT DOCUMENTS 4,009,684 A 3/1977 Kliment et al.
4,279,301 A 7/1981 Williams
(Continued)

FOREIGN PATENT DOCUMENTS

WO WO2015057215 A1 4/2015

OTHER PUBLICATIONS

International Application Serial No. PCT/US2013/065241, International Search Report and Written Opinion dated Jul. 24, 2014, 2 pgs.

*Primary Examiner* — Anuradha Ahuja
(74) *Attorney, Agent, or Firm* — Chamberlain Hrdlicka

(57) ABSTRACT

Methods of treating a subterranean formation include obtaining or providing compositions that include an alkenoate ester. The compositions also includes at least one of a dialkenyldihydrocarbylammonium halide and an N,N-dihydrocarbyl-substituted alkenamide. The methods also include placing the composition in a subterranean formation downhole. Methods of treating a subterranean formation include using a composition including a polymer that is a reaction product of a mixture including an alkenoate ester and at least one of a dialkenyldihydrocarbylammonium halide and an N,N-dihydrocarbyl-substituted alkenamide.

20 Claims, 2 Drawing Sheets

(51) Int. Cl.
  *C09K 8/62*    (2006.01)
  *E21B 43/02*   (2006.01)
  *E21B 43/26*   (2006.01)
  *E21B 43/267*  (2006.01)
  *E21B 43/04*   (2006.01)
  *C09K 8/506*   (2006.01)
  *C09K 8/60*    (2006.01)
  *C09K 8/80*    (2006.01)
  *C09K 8/72*    (2006.01)
  *C09K 8/52*    (2006.01)
  *C09K 8/487*   (2006.01)
  *C09K 8/512*   (2006.01)
  *C09K 8/514*   (2006.01)
  *C04B 28/02*   (2006.01)
  *C09K 8/035*   (2006.01)
  *E21B 21/00*   (2006.01)

(52) U.S. Cl.
  CPC .......... *E21B 43/261* (2013.01); *E21B 43/267* (2013.01); *C09K 2208/08* (2013.01)

(56) References Cited

U.S. PATENT DOCUMENTS

| | | |
|---|---|---|
| 5,775,425 A | 7/1998 | Weaver et al. |
| 5,787,986 A | 8/1998 | Weaver et al. |
| 6,109,350 A | 8/2000 | Nguyen et al. |
| 6,364,016 B1 | 4/2002 | Dalrymple et al. |
| 6,476,169 B1 | 11/2002 | Eoff et al. |
| 6,719,053 B2 | 4/2004 | Thompson |
| 6,832,650 B2 | 12/2004 | Nguyen et al. |
| 6,978,836 B2 | 12/2005 | Nguyen et al. |
| 7,114,570 B2 | 10/2006 | Nguyen et al. |
| 7,931,084 B2 | 4/2011 | Nguyen et al. |
| 7,934,557 B2 | 5/2011 | Nguyen |
| 7,956,017 B2 | 6/2011 | Gatlin et al. |
| 8,272,440 B2 | 9/2012 | Dalrymple et al. |
| 2005/0274520 A1 | 12/2005 | Nguyen |
| 2006/0065396 A1* | 3/2006 | Dawson ................. C09K 8/512 166/279 |
| 2008/0196897 A1* | 8/2008 | Nguyen ................. C09K 8/512 166/295 |
| 2009/0095535 A1 | 4/2009 | Nguyen |
| 2009/0253594 A1* | 10/2009 | Dalrymple ............. C09K 8/514 507/222 |
| 2009/0298720 A1* | 12/2009 | Nguyen ................. C09K 8/74 507/204 |
| 2011/0098377 A1 | 4/2011 | Huang et al. |
| 2012/0071372 A1 | 3/2012 | Iaconelli et al. |
| 2012/0298354 A1* | 11/2012 | Sullivan ............... C08F 226/04 166/248 |
| 2013/0048282 A1 | 2/2013 | Adams et al. |
| 2013/0105161 A1 | 5/2013 | Funkhouser et al. |

* cited by examiner

COMPOSITIONS PROVIDING CONSOLIDATION AND WATER-CONTROL

BACKGROUND OF THE INVENTION

The production of water from oil and gas wells constitutes a major problem and expense. When the hydrocarbon-producing formation in which an oil or gas well is completed contains layers of water and hydrocarbons or when there are water-producing zones near the hydrocarbon-producing formation, the higher mobility of the water often allows it to flow into the wellbore. In the production of such wells, the ratio of water to hydrocarbons recovered can become so high that the cost of producing the water, separating it from the hydrocarbons, and disposing of it represents a significant economic loss.

Hydrocarbon wells are often located in subterranean zones that contain unconsolidated particulate matter that can migrate out of the well along with oil, gas, water, or other fluids produced by the well. The presence of the particulate matter, such as sand, in the produced fluids is problematic since, for example, it can abrade pumping and other producing equipment and reduce the fluid production capabilities of the producing zones. Unconsolidated subterranean zones can include those which contain loose particulates that are readily entrained by produced fluids and those wherein the particulates making up the zone are held together with insufficient bond strength to withstand the forces produced by the production of fluids through the zones.

Downhole water control treatments to mitigate production of water and downhole treatments to consolidate particulate matter are performed as at least two separate treatments, with each requiring different treatment compositions. The transportation, preparation, and application downhole of each composition is inconvenient, and requires both time and economic expenditure.

SUMMARY OF THE INVENTION

In various embodiments, the present invention provides a method of treating a subterranean formation. The method includes obtaining or providing a composition. The composition includes an alkenoate ester. The composition also includes at least one of a dialkenyldihydrocarbylammonium halide and an N,N-dihydrocarbyl-substituted alkenamide. The method also includes placing the composition in a subterranean formation downhole.

In various embodiments, the present invention provides a method of treating a subterranean formation. The method includes obtaining or providing a composition. The composition includes a ($C_1$-$C_{30}$)hydrocarbyl ($C_1$-$C_{10}$)alkenoate ester or a poly(($C_2$-$C_{30}$)hydrocarbylene oxide) ($C_1$-$C_{10}$) alkenoate ester, wherein the ($C_1$-$C_{30}$)hydrocarbyl, ($C_1$-$C_{30}$) hydrocarbyene, and ($C_1$-$C_{10}$)alkenoate are independently substituted or unsubstituted. The composition also includes at least one of a di((($C_1$-$C_{30}$)alkenyl)di(($C_1$-$C_{30}$)hydrocarbyl))ammonium halide, wherein the ($C_1$-$C_{30}$)alkenyl and the ($C_1$-$C_{30}$)hydrocarbyl are each independently selected and are independently substituted or unsubstituted, and an N,N-di(($C_1$-$C_{30}$)hydrocarbyl)-substituted ($C_1$-$C_{10}$)alkenamide, wherein the ($C_1$-$C_{30}$)alkyl are independently selected and the ($C_1$-$C_{30}$)hydrocarbyl and ($C_1$-$C_{10}$)alkenamide are independently substituted or unsubstituted. The method also includes placing the composition in a subterranean formation downhole.

In various embodiments, the present invention provides a method of treating a subterranean formation. The method includes obtaining or providing a composition. About 0.001 wt % to about 99.999 wt % is of at least one of hydroxyethyl acrylate and a ($C_1$-$C_{15}$)alkyl acrylate. About 0.001 wt % to about 99.999 wt % of the composition is at least one of diallyldimethylammonium chloride, and an N,N-dihydrocarbyl-substituted acrylamide. The method also includes placing the composition in a subterranean formation downhole.

In various embodiments, the present invention provides a method of treating a subterranean formation. The method includes obtaining or providing a composition. The composition includes a polymer including repeating units having at least one of the following structures:

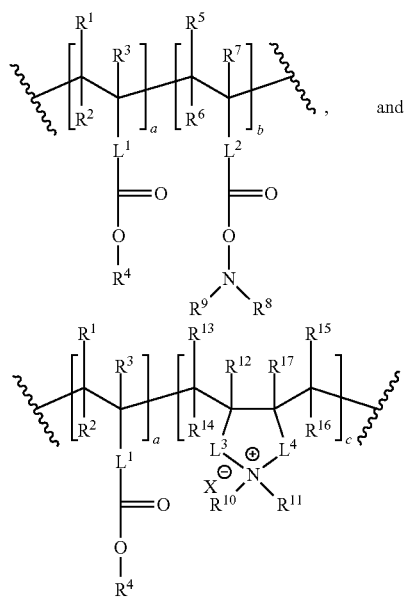

The repeating units are in a block or random arrangement in the polymer wherein each repeating unit at each occurrence independently occurs in the orientation shown or in an opposite orientation. The variable $X^-$ is selected from the group consisting of $I^-$, $Br^-$, and $Cl^-$. The variables $R^1$, $R^2$, $R^3$, $R^5$, $R^6$, $R^7$, $R^{12}$, $R^{13}$, $R^{14}$, $R^{15}$, $R^{16}$, and $R^{17}$ at each occurrence are each independently selected from the group consisting of —H and substituted or unsubstituted ($C_1$-$C_{30}$) hydrocarbyl interrupted or terminated by 0, 1, 2, or 3 atoms selected from the group consisting of O, NH, and S. The variables $L^1$, $L^2$, $L^3$, and $L^4$ at each occurrence are each independently selected from a bond and substituted or unsubstituted ($C_1$-$C_{30}$)hydrocarbylene interrupted or terminated by 0, 1, 2, or 3 atoms selected from the group consisting of O, NH, and S. The variables $R^8$, $R^9$, $R^{10}$, $R^{11}$ at each occurrence are each independently substituted or unsubstituted ($C_1$-$C_{30}$)hydrocarbyl interrupted or terminated by 0, 1, 2, or 3 atoms selected from the group consisting of O, NH, and S. At each occurrence the variable $R^4$ is independently selected from the group consisting of a substituted or unsubstituted ($C_1$-$C_{30}$)hydrocarbyl interrupted or terminated by 0, 1, 2, or 3 atoms selected from the group consisting of O, NH, and S, or —R—(O—R)$_n$—OH, wherein R is a substituted or unsubstituted ($C_2$-$C_{10}$)hydrocarbylene and n is about 0 to about 10,000. The variable a is about 1 to about 100,000, b is about 1 to about 100,000, and c is about 1 to about 100,000. The method also includes placing the composition in a subterranean formation downhole.

In various embodiments, the present invention provides a method of treating a subterranean formation. The method includes obtaining or providing a composition. The composition includes a polymer including repeating units having at least one of the following structures:

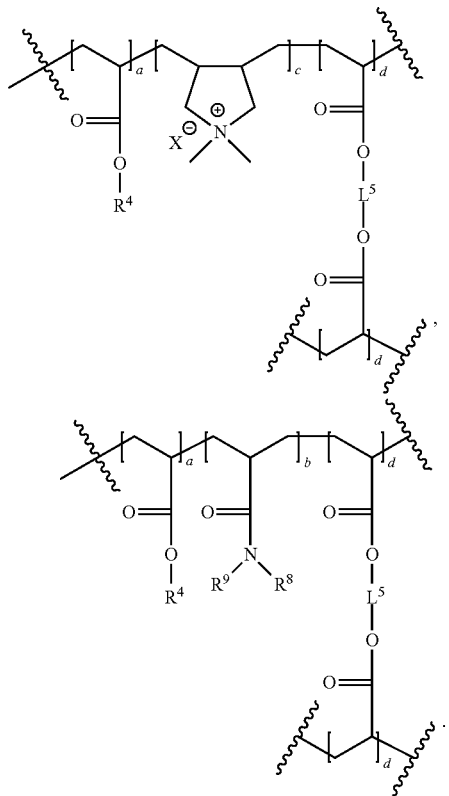

The repeating units are in a block or random arrangement in the polymer wherein each repeating unit at each occurrence independently occurs in the orientation shown or in an opposite orientation. The repeating unit including $L^5$ is coupled to the same polymer or to a different polymer. At each occurrence $R^4$ is independently selected from the group consisting of $(C_1-C_{15})$alkyl, and —R—(O—R)$_n$—OH, wherein R is a $(C_2-C_5)$alkylene and n is about 0 to about 1,000. The variables $R^8$ and $R^9$ at each occurrence are each independently $(C_{10}-C_{25})$alkyl. At each occurrence $L^5$ is independently selected from the group consisting of a $(C_1-C_{30})$alkylene, and —R—(O—R)$_n$—, wherein R is a $(C_2-C_5)$alkylene and n is about 0 to about 10,000. The variable a is about 1 to about 100,000, b is about 1 to about 100,000, c is about 1 to about 100,000, and d is about 1 to about 100,000. The method also includes placing the composition in a subterranean formation downhole.

In various embodiments, the present invention provides a method of treating a subterranean formation. The method includes obtaining or providing a proppant or a gravel pack including an at least partial coating of a tackifier and at least partial coating of a water-control agent on the proppant or the gravel pack. The method also includes placing the proppant or gravel pack in a subterranean formation downhole.

In various embodiments, the present invention provides a composition for treatment of a subterranean formation. The composition includes a proppant or a gravel pack that includes an at least partial coating of a tackifier and an at least partial coating of a water-control agent.

In various embodiments, the present invention provides a system including a composition. The composition includes at least one of a) an alkenoate ester and at least one of a dialkenyldihydrocarbylammonium halide and an N,N-dihydrocarbyl-substituted alkenamide, b) the polymer including repeating units having at least one of the following structures

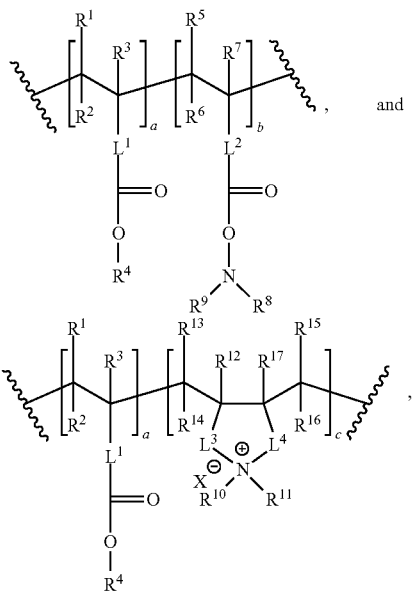

and c) a proppant or a gravel pack that includes an at least partial coating of a tackifier and an at least partial coating of a water-control agent. The system also includes a subterranean formation including the composition therein.

In various embodiments, the present invention provides a composition for treatment of a subterranean formation. The composition includes an alkenoate ester; and at least one of a dialkenyldihydrocarbylammonium halide and an N,N-dihydrocarbyl-substituted alkenamide. The alkenoate ester has the structure

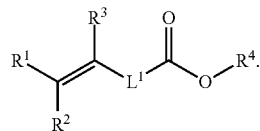

The variables $R^1$, $R^2$, and $R^3$ are each independently selected from the group consisting of —H and substituted or unsubstituted $(C_1-C_{30})$hydrocarbyl interrupted or terminated by 0, 1, 2, or 3 atoms selected from the group consisting of O, NH, and S. The variable $L^1$ is independently selected from a bond and substituted or unsubstituted $(C_1-C_{30})$hydrocarbylene interrupted or terminated by 0, 1, 2, or 3 atoms selected from the group consisting of O, NH, and S. The variable $R^4$ is selected from the group consisting of a substituted or unsubstituted $(C_1-C_{30})$hydrocarbyl interrupted or terminated by 0, 1, 2, or 3 atoms selected from the group consisting of O, NH, and S, and —R—(O—R)$_n$—OH, wherein R is a substituted or unsubstituted $(C_2-C_{10})$hydrocarbylene and n is about 0 to about 10,000. The dialkenyldihydrocarbylammonium halide has the structure

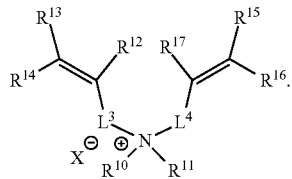

The variable $X^-$ is selected from the group consisting of $I^-$, $Br^-$, and $Cl^-$. The variables $R^{12}$, $R^{13}$, $R^{14}$, $R^{15}$, $R^{16}$, and $R^{17}$ are each independently selected from the group consisting of —H and substituted or unsubstituted ($C_1$-$C_{30}$)hydrocarbyl interrupted or terminated by 0, 1, 2, or 3 atoms selected from the group consisting of O, NH, and S. The variables $R^{10}$ and $R^{11}$ are each independently a substituted or unsubstituted ($C_1$-$C_{30}$)hydrocarbyl interrupted or terminated by 0, 1, 2, or 3 atoms selected from the group consisting of O, NH, and S. The variables $L^3$ and $L^4$ are independently selected from a bond and substituted or unsubstituted ($C_1$-$C_{30}$)hydrocarbylene interrupted or terminated by 0, 1, 2, or 3 atoms selected from the group consisting of O, NH, and S. The N,N-dihydrocarbyl-substituted alkenamide has the structure

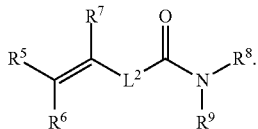

The variables $R^5$, $R^6$, and $R^7$ are each independently selected from the group consisting of —H and substituted or unsubstituted ($C_1$-$C_{30}$)hydrocarbyl interrupted or terminated by 0, 1, 2, or 3 atoms selected from the group consisting of O, NH, and S. The variables $R^8$ and $R^9$ are each independently substituted or unsubstituted ($C_1$-$C_{30}$)hydrocarbyl interrupted or terminated by 0, 1, 2, or 3 atoms selected from the group consisting of O, NH, and S. The variable $L^2$ is independently selected from a bond and substituted or unsubstituted ($C_1$-$C_{30}$)hydrocarbylene interrupted or terminated by 0, 1, 2, or 3 atoms selected from the group consisting of O, NH, and S.

In various embodiments, the present invention provides a composition for treatment of a subterranean formation. The composition includes a polymer including repeating units having at least one of the following structures:

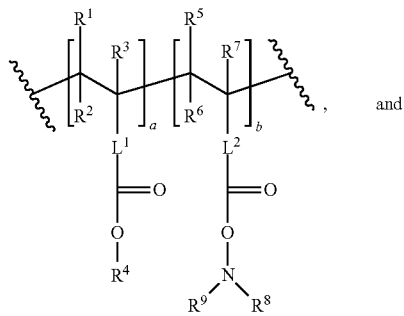

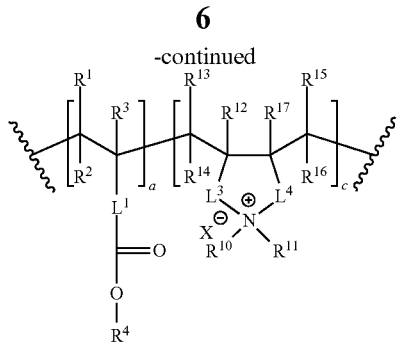

The repeating units are in a block or random arrangement in the polymer wherein each repeating unit at each occurrence independently occurs in the orientation shown or in an opposite orientation. The variable $X^-$ is selected from the group consisting of $I^-$, $Br^-$, and $Cl^-$. The variables $R^1$, $R^2$, $R^3$, $R^5$, $R^6$, $R^7$, $R^{12}$, $R^{13}$, $R^{14}$, $R^{15}$, $R^{16}$, and $R^{17}$ at each occurrence are each independently selected from the group consisting of —H and substituted or unsubstituted ($C_1$-$C_{30}$) hydrocarbyl interrupted or terminated by 0, 1, 2, or 3 atoms selected from the group consisting of O, NH, and S. The variables $L^1$, $L^2$, $L^3$, and $L^4$ at each occurrence are each independently selected from a bond and substituted or unsubstituted ($C_1$-$C_{30}$)hydrocarbylene interrupted or terminated by 0, 1, 2, or 3 atoms selected from the group consisting of O, NH, and S. The variables $R^8$, $R^9$, $R^{10}$, $R^{11}$ at each occurrence are each independently substituted or unsubstituted ($C_1$-$C_{30}$)hydrocarbyl interrupted or terminated by 0, 1, 2, or 3 atoms selected from the group consisting of O, NH, and S. At each occurrence $R^4$ is independently selected from the group consisting of a substituted or unsubstituted ($C_1$-$C_{30}$)hydrocarbyl interrupted or terminated by 0, 1, 2, or 3 atoms selected from the group consisting of O, NH, and S, and —R—(O—R)$_n$—OH, wherein R is a substituted or unsubstituted ($C_2$-$C_{10}$)hydrocarbylene and n is about 0 to about 10,000. The variable a is about 1 to about 100,000, b is about 1 to about 100,000, and c is about 1 to about 100,000.

In various embodiments, the present invention provides a method of preparing a composition for treatment of a subterranean formation. The method includes forming a composition. The composition includes an alkenoate ester. The composition also includes at least one of a dialkenyldihydrocarbylammonium halide and an N,N-dihydrocarbyl-substituted alkenamide.

In various embodiments, the present invention provides a method of preparing a composition for treatment of a subterranean formation. The method includes forming a composition. The composition includes a polymer including repeating units having at least one of the following structures:

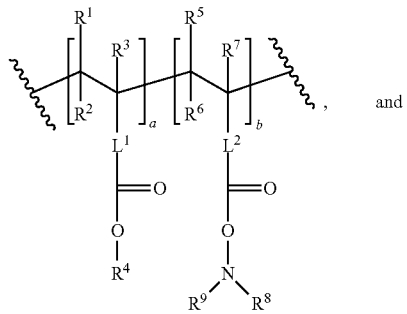

-continued

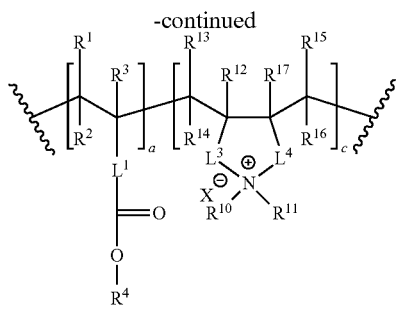

The repeating units are in a block or random arrangement in the polymer wherein each repeating unit at each occurrence independently occurs in the orientation shown or in an opposite orientation. The variable $X^-$ is selected from the group consisting of $I^-$, $Br^-$, and $Cl^-$. The variables $R^1$, $R^2$, $R^3$, $R^5$, $R^6$, $R^7$, $R^{12}$, $R^{13}$, $R^{14}$, $R^{15}$, $R^{16}$, and $R^{17}$ at each occurrence are each independently selected from the group consisting of —H and substituted or unsubstituted ($C_1$-$C_{30}$) hydrocarbyl interrupted or terminated by 0, 1, 2, or 3 atoms selected from the group consisting of O, NH, and S. The variables $L^1$, $L^2$, $L^3$, and $L^4$ at each occurrence are each independently selected from a bond and substituted or unsubstituted ($C_1$-$C_{30}$)hydrocarbylene interrupted or terminated by 0, 1, 2, or 3 atoms selected from the group consisting of O, NH, and S. The variables $R^8$, $R^9$, $R^{10}$, $R^{11}$ at each occurrence are each independently substituted or unsubstituted ($C_1$-$C_{30}$)hydrocarbyl interrupted or terminated by 0, 1, 2, or 3 atoms selected from the group consisting of O, NH, and S. At each occurrence $R^4$ is independently selected from the group consisting of a substituted or unsubstituted ($C_1$-$C_{30}$)hydrocarbyl interrupted or terminated by 0, 1, 2, or 3 atoms selected from the group consisting of O, NH, and S, and —R—(O—R)$_n$—OH, wherein R is a substituted or unsubstituted ($C_2$-$C_{10}$)hydrocarbylene and n is about 0 to about 10,000. The variable a is about 1 to about 100,000, b is about 1 to about 100,000, and c is about 1 to about 100,000.

In various embodiments, the present invention provides a method of preparing a composition for treatment of a subterranean formation. The method includes forming a composition for treatment of a subterranean formation. The composition includes a proppant or a gravel pack including an at least partial coating of a tackifier and an at least partial coating of a water-control agent.

In various embodiments, the present invention provides certain advantages over other compositions for treatment of a subterranean formation, and methods and systems including the same, at least some of which are unexpected. For example, in some embodiments, the present invention advantageously provides a single treatment, or a coated proppant or gravel, that provides both water control and particulate consolidation downhole, and can provide consolidation of produced sand and fines downhole or consolidation of proppants placed downhole. By providing both water control and particulate consolidation with a single composition, or with a coated proppant or gravel, various embodiments avoid the need to perform two separate treatments to achieve both water control and consolidation.

By avoiding two separate treatments, various embodiments can provide a more efficient method of achieving water control and consolidation of particulates. In some embodiments, the transportation, preparation, and application of two separate treatment compositions can be avoided, saving time and money. In some embodiments, incompatibilities between water control treatments and consolidation or stabilization treatments can be avoided. In some embodiments, shut-in time needed by some consolidation resins prior to water treatment application can be avoided. In some embodiments, water control and particulate consolidation can be achieved more quickly than with other methods. In some embodiments, water control and particulate consolidation can be achieved with less financial expenditure than with other methods. In some embodiments, the composition, or coated proppant or gravel, can be applied as part of a primary treatment, such as part of a hydraulic fracturing treatment.

In some embodiments, the water control provided by the present composition and method can be more effective than the water control provided by other methods, such as by more effectively preventing water from being produced by the formation along with the hydrocarbons. In various embodiments, the particulate consolidation provided by the present composition and method can be more effective than the particulate consolidation provided by other compositions and methods, such as by more effectively holding together particulates produced downhole (e.g., sand or fines) or placed downhole (e.g, proppant or gravel). In some embodiments, the composition can have a more lasting and robust water control effect due to the water control and consolidation properties stemming from a single polymer, and thus the water control treatment is less likely to wash away as compared to other water control treatments.

BRIEF DESCRIPTION OF THE FIGURES

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

DETAILED DESCRIPTION OF THE INVENTION

Figure 1:
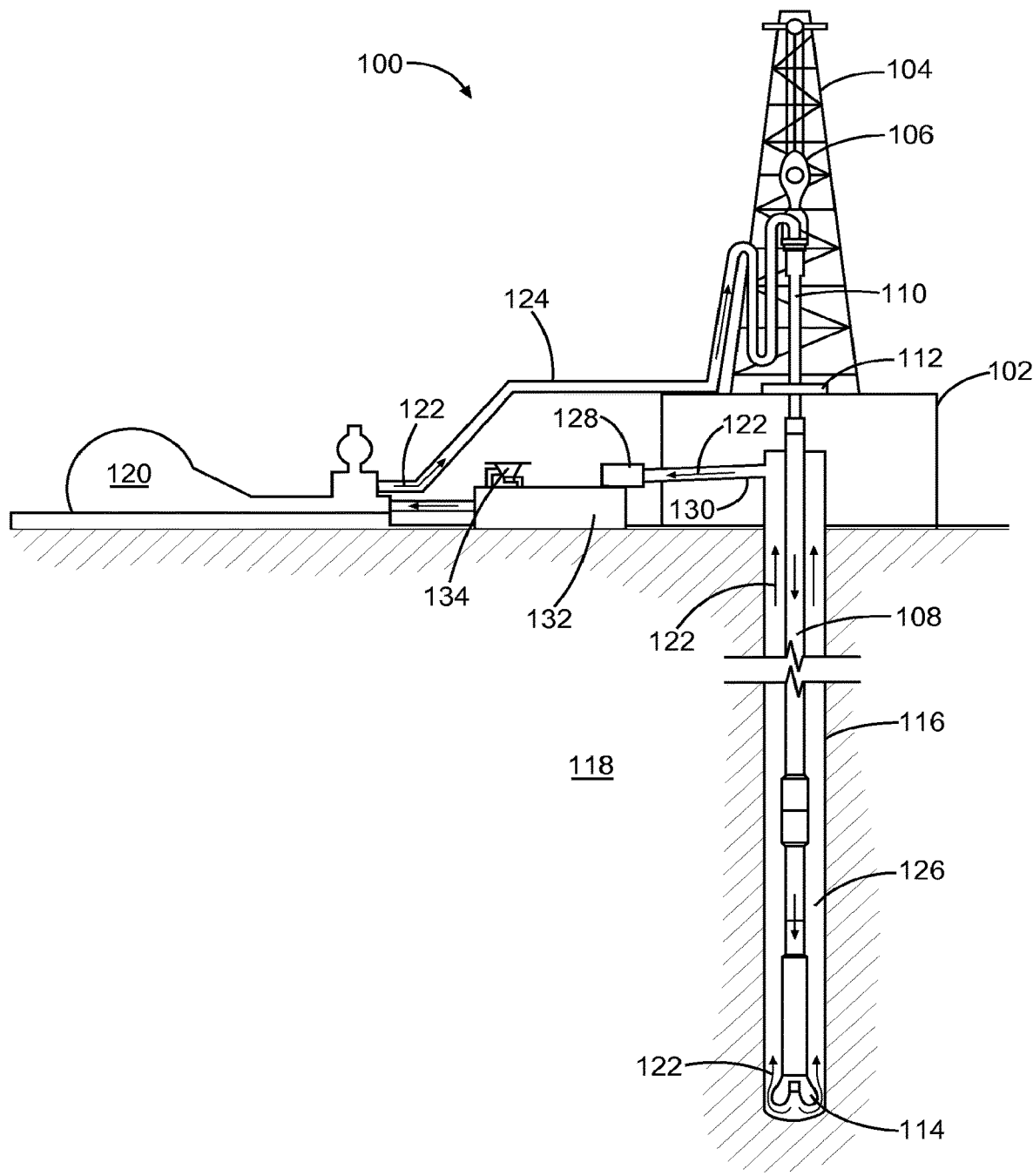
FIG. 1 illustrates a drilling assembly, in accordance with various embodiments.

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In the methods of manufacturing described herein, the steps can be carried out in any order without departing from the principles of the invention, except when a temporal or operational sequence is explicitly recited. Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

Selected substituents within the compounds described herein are present to a recursive degree. In this context, "recursive substituent" means that a substituent may recite another instance of itself or of another substituent that itself recites the first substituent. Recursive substituents are an intended aspect of the disclosed subject matter. Because of the recursive nature of such substituents, theoretically, a large number may be present in any given claim. One of ordinary skill in the art of organic chemistry understands that the total number of such substituents is reasonably limited by the desired properties of the compound intended. Such properties include, by way of example and not limitation, physical properties such as molecular weight, solubility, and practical properties such as ease of synthesis. Recursive substituents can call back on themselves any suitable number of times, such as about 1 time, about 2 times, 3, 4, 5, 6, 7, 8, 9, 10, 15, 20, 30, 50, 100, 200, 300, 400, 500, 750, 1000, 1500, 2000, 3000, 4000, 5000, 10,000, 15,000, 20,000, 30,000, 50,000, 100,000, 200,000, 500,000, 750,000, or about 1,000,000 times or more.

The term "about" as used herein can allow for a degree of variability in a value or range, for example, within 10%, within 5%, or within 1% of a stated value or of a stated limit of a range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The term "organic group" as used herein refers to but is not limited to any carbon-containing functional group. For example, an oxygen-containing group such as an alkoxy group, aryloxy group, aralkyloxy group, oxo(carbonyl) group, a carboxyl group including a carboxylic acid, carboxylate, and a carboxylate ester; a sulfur-containing group such as an alkyl and aryl sulfide group; and other heteroatom-containing groups. Non-limiting examples of organic groups include OR, OOR, OC(O)N(R)$_2$, CN, CF$_3$, OCF$_3$, R, C(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, or C(=NOR)R wherein R can be hydrogen (in examples that include other carbon atoms) or a carbon-based moiety, and wherein the carbon-based moiety can itself be further substituted.

The term "substituted" as used herein refers to an organic group as defined herein or molecule in which one or more hydrogen atoms contained therein are replaced by one or more non-hydrogen atoms. The term "functional group" or "substituent" as used herein refers to a group that can be or is substituted onto a molecule or onto an organic group. Examples of substituents or functional groups include, but are not limited to, a halogen (e.g., F, Cl, Br, and I); an oxygen atom in groups such as hydroxyl groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxylamines, nitriles, nitro groups, N-oxides, hydrazides, azides, and enamines; and other heteroatoms in various other groups. Non-limiting examples of substituents J that can be bonded to a substituted carbon (or other) atom include F, Cl, Br, I, OR, OC(O)N(R')$_2$, CN, NO, NO$_2$, ONO$_2$, azido, CF$_3$, OCF$_3$, R', O (oxo), S (thiono), C(O), S(O), methylenedioxy, ethylenedioxy, N(R)$_2$, SR, SOR, SO$_2$R', SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, or C(=NOR)R wherein R can be hydrogen or a carbon-based moiety, and wherein the carbon-based moiety can itself be further substituted; for example, wherein R can be hydrogen, alkyl, acyl, cycloalkyl, aryl, aralkyl, heterocyclyl, heteroaryl, or heteroarylalkyl, wherein any alkyl, acyl, cycloalkyl, aryl, aralkyl, heterocyclyl, heteroaryl, or heteroarylalkyl or R can be independently mono- or multi-substituted with J; or wherein two R groups bonded to a nitrogen atom or to adjacent nitrogen atoms can together with the nitrogen atom or atoms form a heterocyclyl, which can be mono- or independently multi-substituted with J.

The term "alkyl" as used herein refers to straight chain and branched alkyl groups and cycloalkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term "alkenyl" as used herein refers to straight and branched chain and cyclic alkyl groups as defined herein, except that at least one double bond exists between two carbon atoms. Thus, alkenyl groups have from 2 to 40 carbon atoms, or 2 to about 20 carbon atoms, or 2 to 12 carbons or, in some embodiments, from 2 to 8 carbon atoms. Examples include, but are not limited to vinyl, —CH═CH (CH$_3$), —CH═C(CH$_3$)$_2$, —C(CH$_3$)═CH$_2$, —C(CH$_3$)═CH(CH$_3$), —C(CH$_2$CH$_3$)═CH$_2$, cyclohexenyl, cyclopentenyl, cyclohexadienyl, butadienyl, pentadienyl, and hexadienyl among others.

The term "acyl" as used herein refers to a group containing a carbonyl moiety wherein the group is bonded via the carbonyl carbon atom. The carbonyl carbon atom is also bonded to another carbon atom, which can be part of an alkyl, aryl, aralkyl cycloalkyl, cycloalkylalkyl, heterocyclyl, heterocyclylalkyl, heteroaryl, heteroarylalkyl group or the like. In the special case wherein the carbonyl carbon atom is bonded to a hydrogen, the group is a "formyl" group, an acyl group as the term is defined herein. An acyl group can include 0 to about 12-20 or 12-40 additional carbon atoms bonded to the carbonyl group. An acyl group can include double or triple bonds within the meaning herein. An acryloyl group is an example of an acyl group. An acyl group can also include heteroatoms within the meaning here. A nicotinoyl group (pyridyl-3-carbonyl) is an example of an acyl group within the meaning herein. Other examples include acetyl, benzoyl, phenylacetyl, pyridylacetyl, cinnamoyl, and acryloyl groups and the like. When the group containing the carbon atom that is bonded to the carbonyl carbon atom contains a halogen, the group is termed a "haloacyl" group. An example is a trifluoroacetyl group.

The term "aryl" as used herein refers to cyclic aromatic hydrocarbons that do not contain heteroatoms in the ring. Thus aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined herein. Representative substituted aryl groups can be mono-substituted or substituted more than once, such as, but not limited to, 2-, 3-, 4-, 5-, or 6-substituted phenyl or 2-8 substituted naphthyl groups, which can be substituted with carbon or non-carbon groups such as those listed herein.

The term "heterocyclyl" as used herein refers to aromatic and non-aromatic ring compounds containing 3 or more ring members, of which, one or more is a heteroatom such as, but not limited to, N, O, and S. Thus, a heterocyclyl can be a cycloheteroalkyl, or a heteroaryl, or if polycyclic, any combination thereof. In some embodiments, heterocyclyl groups include 3 to about 20 ring members, whereas other such groups have 3 to about 15 ring members.

The term "alkoxy" as used herein refers to an oxygen atom connected to an alkyl group, including a cycloalkyl group, as are defined herein. Examples of linear alkoxy groups include but are not limited to methoxy, ethoxy, propoxy, butoxy, pentyloxy, hexyloxy, and the like. Examples of branched alkoxy include but are not limited to isopropoxy, sec-butoxy, tert-butoxy, isopentyloxy, isohexyloxy, and the like. Examples of cyclic alkoxy include but are not limited to cyclopropyloxy, cyclobutyloxy, cyclopentyloxy, cyclohexyloxy, and the like. An alkoxy group can include one to about 12-20 or about 12-40 carbon atoms bonded to the oxygen atom, and can further include double or triple bonds, and can also include heteroatoms. For example, an allyloxy group is an alkoxy group within the meaning herein. A methoxyethoxy group is also an alkoxy group within the meaning herein, as is a methylenedioxy group in a context where two adjacent atoms of a structure are substituted therewith.

The term "amine" as used herein refers to primary, secondary, and tertiary amines having, e.g., the formula N(group)$_3$ wherein each group can independently be H or non-H, such as alkyl, aryl, and the like. Amines include but are not limited to R—NH$_2$, for example, alkylamines, arylamines, alkylarylamines; R$_2$NH wherein each R is independently selected, such as dialkylamines, diarylamines, aralkylamines, heterocyclylamines and the like; and R$_3$N wherein each R is independently selected, such as trialkylamines, dialkylarylamines, alkyldiarylamines, triarylamines, and the like. The term "amine" also includes ammonium ions as used herein.

The term "amino group" as used herein refers to a substituent of the form—NH$_2$, —NHR, —NR$_2$, —NR$_3^+$, wherein each R is independently selected, and protonated forms of each, except for —NR$_3^+$, which cannot be protonated. Accordingly, any compound substituted with an amino group can be viewed as an amine. An "amino group" within the meaning herein can be a primary, secondary, tertiary or quaternary amino group. An "alkylamino" group includes a monoalkylamino, dialkylamino, and trialkylamino group.

The terms "halo," "halogen," or "halide" group, as used herein, by themselves or as part of another substituent, mean, unless otherwise stated, a fluorine, chlorine, bromine, or iodine atom.

The term "haloalkyl" group, as used herein, includes mono-halo alkyl groups, poly-halo alkyl groups wherein all halo atoms can be the same or different, and per-halo alkyl groups, wherein all hydrogen atoms are replaced by halogen atoms, such as fluoro. Examples of haloalkyl include trifluoromethyl, 1,1-dichloroethyl, 1,2-dichloroethyl, 1,3-dibromo-3,3-difluoropropyl, perfluorobutyl, and the like.

The term "hydrocarbon" as used herein refers to a functional group or molecule that includes carbon and hydrogen atoms. The term can also refer to a functional group or molecule that normally includes both carbon and hydrogen atoms but wherein all the hydrogen atoms are substituted with other functional groups.

As used herein, the term "hydrocarbyl" refers to a functional group derived from a straight chain, branched, or cyclic hydrocarbon, and can be alkyl, alkenyl, alkynyl, aryl, cycloalkyl, acyl, or any combination thereof.

The term "solvent" as used herein refers to a liquid that can dissolve a solid, liquid, or gas. Nonlimiting examples of solvents are silicones, organic compounds, water, alcohols, ionic liquids, and supercritical fluids.

The term "number-average molecular weight" as used herein refers to the ordinary arithmetic mean of the molecular weight of individual molecules in a sample. It is defined as the total weight of all molecules in a sample divided by the total number of molecules in the sample. Experimentally, the number-average molecular weight ($M_n$) is determined by analyzing a sample divided into molecular weight fractions of species i having $n_i$ molecules of molecular weight $M_i$ through the formula $M_n = \Sigma M_i n_i / \Sigma n_i$. The number-average molecular weight can be measured by a variety of well-known methods including gel permeation chromatography, spectroscopic end group analysis, and osmometry. If unspecified, molecular weights of polymers given herein are number-average molecular weights.

The term "weight-average molecular weight" as used herein refers ($M_w$), which is equal to $\Sigma M_i^2 n_i / \Sigma M_i n_i$, where $n_i$ is the number of molecules of molecular weight $M_i$. In various examples, the weight-average molecular weight can be determined using light scattering, small angle neutron scattering, X-ray scattering, and sedimentation velocity.

The term "room temperature" as used herein refers to a temperature of about 15° C. to 28° C.

The term "standard temperature and pressure" as used herein refers to 20° C. and 101 kPa.

As used herein, "degree of polymerization" is the number of repeating units in a polymer.

As used herein, the term "polymer" refers to a molecule having at least one repeating unit and can include copolymers.

The term "copolymer" as used herein refers to a polymer that includes at least two different monomers. A copolymer can include any suitable number of monomers.

The term "downhole" as used herein refers to under the surface of the earth, such as a location within or fluidly connected to a wellbore.

As used herein, the term "drilling fluid" refers to fluids, slurries, or muds used in drilling operations downhole, such as during the formation of the wellbore.

As used herein, the term "stimulation fluid" refers to fluids or slurries used downhole during stimulation activities of the well that can increase the production of a well, including perforation activities. In some examples, a stimulation fluid can include a fracturing fluid or an acidizing fluid.

As used herein, the term "clean-up fluid" refers to fluids or slurries used downhole during clean-up activities of the well, such as any treatment to remove material obstructing the flow of desired material from the subterranean formation. In one example, a clean-up fluid can be an acidification treatment to remove material formed by one or more perforation treatments. In another example, a clean-up fluid can be used to remove a filter cake.

As used herein, the term "fracturing fluid" refers to fluids or slurries used downhole during fracturing operations.

As used herein, the term "spotting fluid" refers to fluids or slurries used downhole during spotting operations, and can be any fluid designed for localized treatment of a downhole region. In one example, a spotting fluid can include a lost circulation material for treatment of a specific section of the wellbore, such as to seal off fractures in the wellbore and prevent sag. In another example, a spotting fluid can include a water control material. In some examples, a spotting fluid can be designed to free a stuck piece of drilling or extraction equipment, can reduce torque and drag with drilling lubricants, prevent differential sticking, promote wellbore stability, and can help to control mud weight.

As used herein, the term "production fluid" refers to fluids or slurries used downhole during the production phase of a well. Production fluids can include downhole treatments designed to maintain or increase the production rate of a well, such as perforation treatments, clean-up treatments, or remedial treatments.

As used herein, the term "completion fluid" refers to fluids or slurries used downhole during the completion phase of a well, including cementing compositions.

As used herein, the term "remedial treatment fluid" refers to fluids or slurries used downhole for remedial treatment of a well. Remedial treatments can include treatments designed to increase or maintain the production rate of a well, such as stimulation or clean-up treatments.

As used herein, the term "abandonment fluid" refers to fluids or slurries used downhole during or preceding the abandonment phase of a well.

As used herein, the term "acidizing fluid" refers to fluids or slurries used downhole during acidizing treatments. In one example, an acidizing fluid is used in a clean-up operation to remove material obstructing the flow of desired material, such as material formed during a perforation operation. In some examples, an acidizing fluid can be used for damage removal.

As used herein, the term "cementing fluid" refers to fluids or slurries used during cementing operations of a well. For example, a cementing fluid can include an aqueous mixture including at least one of cement and cement kiln dust. In another example, a cementing fluid can include a curable resinous material such as a polymer that is in an at least partially uncured state.

As used herein, the term "water control material" refers to a solid or liquid material that interacts with aqueous material downhole, such that hydrophobic material can more easily travel to the surface and such that hydrophilic material (including water) can less easily travel to the surface. A water control material can be used to treat a well to cause the proportion of water produced to decrease and to cause the proportion of hydrocarbons produced to increase, such as by selectively binding together material between water-producing subterranean formations and the wellbore while still allowing hydrocarbon-producing formations to maintain output.

As used herein, the term "packing fluid" refers to fluids or slurries that can be placed in the annular region of a well between tubing and outer casing above a packer. In various examples, the packing fluid can provide hydrostatic pressure in order to lower differential pressure across the sealing element, lower differential pressure on the wellbore and casing to prevent collapse, and protect metals and elastomers from corrosion.

As used herein, the term "fluid" refers to liquids and gels, unless otherwise indicated.

As used herein, the term "subterranean material" or "subterranean formation" refers to any material under the surface of the earth, including under the surface of the bottom of the ocean. For example, a subterranean formation or material can be any section of a wellbore and any section of a subterranean petroleum- or water-producing formation or region in fluid contact with the wellbore. Placing a material in a subterranean formation can include contacting the material with any section of a wellbore or with any subterranean region in fluid contact therewith. Subterranean materials can include any materials placed into the wellbore such as cement, drill shafts, liners, tubing, or screens; placing a material in a subterranean formation can include contacting with such subterranean materials. In some examples, a subterranean formation or material can be any below-ground region that can produce liquid or gaseous petroleum materials, water, or any section below-ground in fluid contact therewith. For example, a subterranean formation or material can be at least one of an area desired to be fractured, a fracture or an area surrounding a fracture, and a flow pathway or an area surrounding a flow pathway, wherein a fracture or a flow pathway can be optionally fluidly connected to a subterranean petroleum- or water-producing region, directly or through one or more fractures or flow pathways.

As used herein, "treatment of a subterranean formation" can include any activity directed to extraction of water or petroleum materials from a subterranean petroleum- or water-producing formation or region, for example, including drilling, stimulation, hydraulic fracturing, clean-up, acidizing, completion, cementing, remedial treatment, abandonment, and the like.

As used herein, a "flow pathway" downhole can include any suitable subterranean flow pathway through which two subterranean locations are in fluid connection. The flow pathway can be sufficient for petroleum or water to flow from one subterranean location to the wellbore, or vice-versa. A flow pathway can include at least one of a hydraulic fracture, a fluid connection across a screen, across gravel pack, across proppant, including across resin-bonded proppant or proppant deposited in a fracture, and across sand. A flow pathway can include a natural subterranean passageway through which fluids can flow. In some embodiments, a flow pathway can be a water source and can include water. In some embodiments, a flow pathway can be a petroleum source and can include petroleum. In some embodiments, a flow pathway can be sufficient to divert from a wellbore, fracture, or flow pathway connected thereto at least one of water, a downhole fluid, or a produced hydrocarbon.

Method of Treating a Subterranean Formation.

In various embodiments, the present invention provides a method of treating a subterranean formation. The method can include obtaining or providing a composition. The obtaining or providing of the composition can be performed at any suitable time and in any suitable location. For example, the obtaining or providing of the composition can occur above-surface, downhole, or any combination thereof. In some embodiments, the composition includes an alkenoate ester. The composition can also include at least one of a dialkenyldihydrocarbylammonium halide and an N,N-dihydrocarbyl-substituted alkenamide. In some embodiments, the composition includes a polymer that can be derived from (e.g., derivable, and optionally but not necessarily derived from) an alkenoate ester and at least one of a dialkenyldihydrocarbylammonium halide and an N,N-dihydrocarbyl-substituted alkenamide. Some embodiments include performing free-radical polymerization to provide the polymer. In other embodiments, the polymer is pre-formed at the time of performance of the method, either from the mixture described or from any suitable mixture. The method can also include placing the composition in a subterranean formation downhole.

In some embodiments, the alkenoate and dialkenyldihydrocarbylammonium or alkeylamide components can form a polymer, wherein the polyalkenoate portion of the polymer can provide water control properties, such as via hydrolysis and swelling, while the amide or dialkenyldihydrocarbylammonium portion of the polymer can act as a tackyfing agent with consolidation properties. In various embodiments, the alkenoate portion of the polymer is coupled to provide consolidation properties. The ester groups can act as delay-activated water control agents, which upon hydrolysis can swell in the presence of water. In various embodiments, the composition includes an alkenoate ester, at least one of a dialkenyldihydrocarbylammonium halide and an N,N-dihydrocarbyl-substituted alkenamide, a radical initiator, a carrier fluid, optionally a silane coupling agent, and optionally a surfactant.

Some embodiments include polymerizing the composition including the alkenoate ester and at least one of the dialkenyldihydrocarbylammonium halide and the N,N-dihydrocarbyl-substituted alkenamide, such as free-radical polymerizing the unsaturated carbon-carbon bonds in the components. The polymerizing can occur at any suitable time and location. For example, the polymerizing can occur above-surface, downhole, or any combination thereof. Some embodiments include crosslinking the composition including the alkenoate ester and at least one of the dialkenyldihydrocarbylammonium halide and the N,N-dihydrocarbyl-substituted alkenamide or a polymer derivable therefrom, such as inter- or intra-molecularly crosslinking the carboxylate moieties of the acrylate portions of the mixture or polymer. The crosslinking can occur at any suitable time and location. For example, the crosslinking can occur above-surface, downhole, or any combination thereof.

The placing of the composition in the subterranean formation can include contacting the composition and any suitable part of the subterranean formation, or contacting the composition and a subterranean material downhole, such as any suitable subterranean material. The subterranean formation can be any suitable subterranean formation. In some examples, the placing of the composition in the subterranean formation includes contacting the composition with or placing the composition in at least one of a fracture, at least a part of an area surrounding a fracture, a flow pathway, an area surrounding a flow pathway, and an area desired to be fractured. The placing of the composition in the subterranean formation can be any suitable placing and can include any suitable contacting between the subterranean formation and the composition. In some embodiments, the placing of the composition in the subterranean formation can include placing a proppant or gravel in the subterranean formation that includes a coating of or forms a slurry with the composition including the alkenoate ester and at least one of the dialkenyldihydrocarbylammonium halide and the N,N-dihydrocarbyl-substituted alkenamide or a polymer derived or derivable therefrom. The placing of the composition in the subterranean formation can include at least partially depositing the composition in a fracture, flow pathway, or area surrounding the same.

The proppant can include any suitable proppant. A proppant is a material that can keep an induced hydraulic fracture at least partially open during or after a fracturing treatment. Examples of proppants can include sand, gravel, glass beads, polymer beads, ground products from shells and seeds such as walnut hulls, and manmade materials such as ceramic proppant, bauxite, tetrafluoroethylene materials (e.g., TEFLON™ available from DuPont), fruit pit materials, processed wood, composite particulates prepared from a binder and fine grade particulates such as silica, alumina, fumed silica, carbon black, graphite, mica, titanium dioxide, meta-silicate, calcium silicate, kaolin, talc, zirconia, boron, fly ash, hollow glass microspheres, and solid glass, or mixtures thereof. In some embodiments, proppant can have an average particle size, wherein particle size is the largest dimension of a particle, of about 0.001 mm to about 3 mm, about 0.15 mm to about 2.5 mm, about 0.25 mm to about 0.43 mm, about 0.43 mm to about 0.85 mm, about 0.85 mm to about 1.18 mm, about 1.18 mm to about 1.70 mm, or about 1.70 to about 2.36 mm. In some embodiments, the proppant can have a distribution of particle sizes clustering around multiple averages, such as one, two, three, or four different average particle sizes.

The subterranean material wherein the composition is placed can include a subterranean area surrounding a wellbore. Placing the composition in the subterranean formation can be sufficient to saturate at least part of an area surrounding the wellbore to at least a depth of about 1 foot to about 3 feet. Placing the composition in the subterranean formation can include contacting the composition with at least one of a fracture, flow path, perforation, and at least a part of an area surrounding at least one of a fracture, flow path, or perforation. In some embodiments, the composition is placed in the subterranean formation such that at least part of the area surrounding the fracture, flow path, or perforation is saturated to a depth of at least about 0.25 to about 2 inches. The placing of the composition in the subterranean formation can be sufficient to at least partially control particulate migration and at least partially mitigate the production of water from the formation.

The method can include hydraulic fracturing, such as a method of hydraulic fracturing to generate a fracture or flow pathway. The placing of the composition in the subterranean formation or the contacting of the subterranean formation and the hydraulic fracturing can occur at any time with respect to one another; for example, the hydraulic fracturing can occur at least one of before, during, and after the contacting or placing. In some embodiments, the contacting or placing occurs during the hydraulic fracturing, such as during any suitable stage of the hydraulic fracturing, such as during at least one of a pre-pad stage (e.g., during injection of water with no proppant, and additionally optionally mid- to low-strength acid), a pad stage (e.g., during injection of fluid only with no proppant, with some viscosifier, such as to begin to break into an area and initiate fractures to produce sufficient penetration and width to allow proppant-laden later stages to enter), or a slurry stage of the fracturing (e.g., viscous fluid with proppant). The method can include performing a stimulation treatment at least one of before, during, and after placing the composition in the subterranean formation in the fracture, flow pathway, or area surrounding the same. The stimulation treatment can be, for example, at least one of perforating, acidizing, injecting of cleaning fluids, propellant stimulation, and hydraulic fracturing. In some embodiments, the stimulation treatment at least partially generates a fracture or flow pathway where the composition is placed or contacted, or the composition is placed or contacted to an area surrounding the generated fracture or flow pathway. In some embodiments, the composition is placed into a screen-wellbore annulus.

In various embodiments, the composition can be contacted with particles above-surface, downhole, or a combination thereof. In some embodiments, the composition includes particles. For example, placing the composition in the subterranean formation can include contacting the composition with downhole particulates. The downhole particulates can include any suitable downhole particulates, such as at least one of fines, sand, gravel, and proppant. In some embodiments, the method further includes, prior to placing the composition in the subterranean formation, mixing the composition with a particulate substrate to form a particulate mixture, wherein placing the composition in the subterranean formation includes contacting the subterranean material with the particulate mixture. The particulate substrate can include any suitable material, such as gravel or a proppant. In some embodiments, the particulate substrate can include at least one of sand, bauxite, ceramic materials, glass materials, polymer materials, tetrafluoroethylene materials, nut shell materials, seed shell materials, fruit pit materials, wood, processed wood, hollow glass microspheres, and solid glass, and composite particulates prepared from a binder and at least one of silica, alumina, fumed silica, carbon black, graphite, mica, titanium dioxide, metasilicate, calcium silicate, kaolin, talc, zirconia, boron, and fly ash. The particulate substrate can form any suitable proportion of the particulate mixture, such as about 30 wt % to about 99.999 wt %, or about 30 wt % or less, or 35 wt %, 40, 45, 50, 55, 60, 65, 70, 75, 80, 85, 90, 95, 96, 97, 98, 99, 99.9, 99.99 wt %, or about 99.999 wt % or more of the particulate mixture.

The mixing of the composition with a particulate substrate includes can include mixing of the composition with a particulate substrate in a carrier fluid, wherein the particulate mixture includes a coated particulate. The mixing of the composition with a particulate substrate can include mixing of the composition with a particulate substrate to provide a coated particulate. The method can further include mixing the coated particulate substrate with a carrier fluid.

The method can further include applying a preflush solution to the subterranean formation. The preflush solution can be any suitable preflush solution. For example, the preflush solution can ready the subterranean material to receive the composition and can remove oils that can impede the composition from making contact with particulates that are desired to be consolidated by the composition. The preflush solution can include an aqueous liquid. The aqueous liquid in the preflush solution can include at least one of salt water and brine. The preflush solution can include a surfactant. The surfactant in the preflush solution can include at least one of an ethoxylated nonyl phenol phosphate ester, a cationic surfactant, a non-ionic surfactant, an alkyl phosphonate surfactant, or mixtures thereof.

The method can further include applying an afterflush fluid to the subterranean formation. For example, the afterflush fluid can displace the composition from selected areas of the wellbore to remove the composition from the pore spaces inside the subterranean formation and thereby restore permeability while leaving behind composition at, for example, contact points between the subterranean formation and particulates such that the particulates can be consolidated. The afterflush fluid can be any suitable afterflush fluid, such as at least one of salt water, brine, and nitrogen gas.

In some embodiments, the method includes allowing a composition including an alkenoate ester and at least one of a dialkenyldihydrocarbylammonium halide and an N,N-dihydrocarbyl-substituted alkenamide to react to form a polymer, such as any suitable polymer described herein, such as a polymer including repeating units having at least one of the following structures:

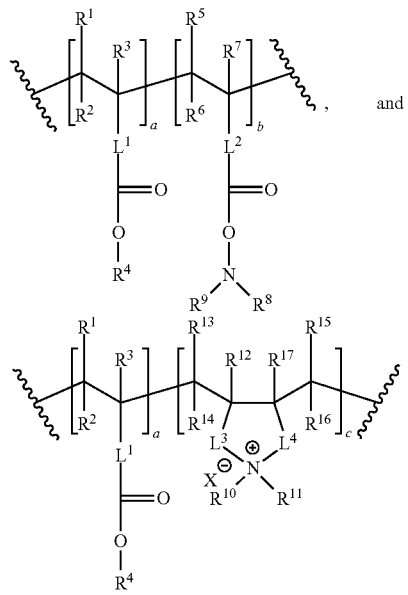

The repeating units are in a block or random arrangement in the polymer wherein each repeating unit at each occurrence independently occurs in the orientation shown or in an opposite orientation. The variable $X^-$ can be selected from the group consisting of $I^-$, $Br^-$, and $Cl^-$. The variables $R^1$, $R^2$, $R^3$, $R^5$, $R^6$, $R^7$, $R^{12}$, $R^{13}$, $R^{14}$, $R^{15}$, $R^{16}$, and $R^{17}$ at each occurrence can be each independently selected from the group consisting of —H and substituted or unsubstituted $(C_1-C_{30})$hydrocarbyl interrupted or terminated by 0, 1, 2, or 3 atoms selected from the group consisting of O, NH, and S. Herein, when a hydrocarbyl or alkyl group is terminated by an O or S, the hydrocarbyl or alkyl group is either bonded at one end through O or S (e.g., —O-hydrocarbyl or —S-hydrocarbyl) or the hydrocarbyl or alkyl group ends with an OH or SH (e.g., hydrocarbyl-OH or hydrocarbyl-SH). The variables $L^1$, $L^2$, $L^3$, and $L^4$ at each occurrence can be each independently selected from a bond and substituted or unsubstituted $(C_1-C_{30})$hydrocarbylene interrupted or terminated by 0, 1, 2, or 3 atoms selected from the group consisting of O, NH, and S. Herein, when a hydrocarbylene or alkylene group is terminated with an O or S, the hydrocarbylene or alkylene is bonded through O or S at one or more ends (e.g., —O-hydrocarbylene- or —S-hydrocarbylene). The variables $R^8$, $R^9$, $R^{10}$, $R^{11}$ at each occurrence can be each independently substituted or unsubstituted $(C_1-C_{30})$ hydrocarbyl interrupted or terminated by 0, 1, 2, or 3 atoms selected from the group consisting of O, NH, and S. At each occurrence $R^4$ can be independently selected from the group consisting of a substituted or unsubstituted $(C_1-C_{30})$hydrocarbyl interrupted or terminated by 0, 1, 2, or 3 atoms selected from the group consisting of O, NH, and S, and —R—(O—R)$_n$—OH, wherein R is a substituted or unsubstituted $(C_2-C_{10})$hydrocarbylene and n is about 0 to about 10,000. The variable a is about 1 to about 100,000, b is about 1 to about 100,000, and c is about 1 to about 100,000. The polymer can further include a repeating unit having the structure:

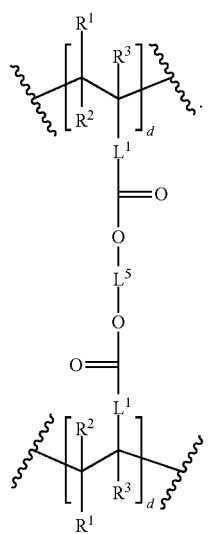

The repeating unit is in a block or random arrangement in the polymer wherein each repeating unit at each occurrence independently occurs in the orientation shown or in an opposite orientation. The repeating unit including $L^5$ can be coupled to the same polymer or to a different polymer. The variable $L^5$ at each occurrence can be independently selected from a substituted or unsubstituted $(C_1-C_{30})$hydrocarbylene interrupted or terminated by 0, 1, 2, or 3 atoms selected from the group consisting of O, NH, and S, and —R—(O—R)$_n$—, wherein R is a substituted or unsubstituted $(C_2-C_{10})$hydrocarbylene and n is about 0 to about 10,000, and d is about 1 to about 100,000.

Alkenoate Ester.

The composition can include at least one of an alkenoate ester or a polymer derived or derivable therefrom such as via free-radical polymerization of the unsaturated carbon-carbon bond in the alkenoate. The alkenoate ester can form any suitable proportion of the composition. For example, the alkenoate ester can be 0.001 wt % to about 99.999 wt % of the composition, about 1 wt % to about 60 wt %, or about 0.001 wt % or less, or about 0.01 wt %, 0.1, 1, 2, 3, 4, 5, 10, 15, 20, 25, 30, 35, 40, 45, 50, 55, 60, 65, 70, 75, 80, 85, 90, 95, 96, 97, 98, 99, 99.9, 99.99 wt %, or about 99.999 wt % or more of the composition.

The alkenoate ester can be any suitable alkenoate ester, such that the method can be performed as described herein. The alkenoate ester can be a $(C_1-C_{30})$alkyl $(C_1-C_{10})$alkenoate ester or a poly($(C_2-C_{30})$alkenyene oxide) $(C_1-C_{10})$alkenoate ester, wherein the $(C_1-C_{30})$alkyl, $(C_1-C_{30})$alkenyene, and $(C_1-C_{10})$alkenoate are independently substituted or unsubstituted. The alkenoate ester can be a $(C_1-C_{10})$alkyl $(C_1-C_{10})$alkenoate ester or a poly($(C_2-C_5)$alkenyene oxide) $(C_1-C_{10})$alkenoate ester, wherein the $(C_1-C_{30})$alkyl, $(C_1-C_{30})$alkenyene, and $(C_1-C_{10})$alkenoate are independently substituted or unsubstituted. The alkenoate ester can be an acrylate ester. The alkenoate ester is a $(C_1-C_{15})$alkyl alkenoate, such as a $(C_1-C_{12})$alkyl alkenoate, having an alkyl group that is linear or branched. The alkenoate ester can be a hydroxyl$(C_1-C_{is})$alkyl alkenoate or a hydroxypoly($(C_1-C_5)$alkenylene oxide) alkenoate. The alkenoate ester can be hydroxyethyl acrylate.

In some embodiments, the alkenoate ester has the structure

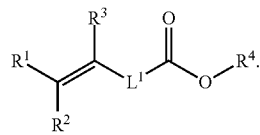

The variables $R^1$, $R^2$, and $R^3$ can be each independently selected from the group consisting of —H and substituted or unsubstituted $(C_1-C_{30})$hydrocarbyl interrupted or terminated by 0, 1, 2, or 3 atoms selected from the group consisting of O, NH, and S. The variable $L^1$ can be independently selected from a bond and substituted or unsubstituted $(C_1-C_{30})$ hydrocarbylene interrupted or terminated by 0, 1, 2, or 3 atoms selected from the group consisting of O, NH, and S. The variable $R^4$ can be independently selected from the group consisting of a substituted or unsubstituted $(C_1-C_{30})$ hydrocarbyl interrupted or terminated by 0, 1, 2, or 3 atoms selected from the group consisting of O, NH, and S, and —R—(O—R)$_n$—OH, wherein R is a substituted or unsubstituted $(C_2-C_{10})$hydrocarbylene and n is about 0 to about 10,000. The variables $R^1$, $R^2$, and $R^3$ can be each independently selected from the group consisting of —H and $(C_1-C_{10})$alkyl. The variable $L^1$ can be independently selected from a bond and $(C_1-C_{10})$alkylene. The variable $R^4$ can be selected from the group consisting of a $(C_1-C_{15})$alkyl, and —R—(O—R)$_n$—OH, wherein R is a $(C_2-C_5)$alkylene and n is about 0 to about 1,000.

The alkenoate ester can have the structure

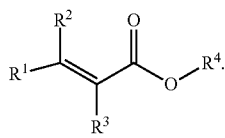

The variables $R^1$, $R^2$, and $R^3$ can be each independently selected from the group consisting of —H and $(C_1-C_5)$alkyl. At least one of $R^1$, $R^2$, and $R^3$ can be —H. The variable $R^4$ can be selected from the group consisting of $(C_1-C_{15})$alkyl, and —R—(O—R)$_n$—OH, wherein R is a $(C_2-C_5)$alkylene and n is about 0 to about 1,000.

The alkenoate ester can have the structure

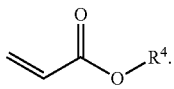

Dialkenyldihydrocarbylammonium Halide.

The composition can include at least one of a dialkenyldihydrocarbylammonium halide or a polymer derived or derivable therefrom such as via free-radical polymerization of the unsaturated carbon-carbon bond in the dialkenyldihydrocarbylammonium halide. The dialkenyldihydrocarbylammonium halide can form any suitable proportion of the composition. For example, the dialkenyldihydrocarbylammonium halide can be 0.001 wt % to about 99.999 wt % of the composition, about 1 wt % to about 60 wt %, or about 0.001 wt % or less, or about 0.01 wt %, 0.1, 1, 2, 3, 4, 5, 10, 15, 20, 25, 30, 35, 40, 45, 50, 55, 60, 65, 70, 75, 80, 85, 90, 95, 96, 97, 98, 99, 99.9, 99.99 wt %, or about 99.999 wt % or more of the composition.

The dialkenyldihydrocarbylammonium halide can be any suitable dialkenyldihydrocarbylammonium halide, such that the method can be performed as described herein. For example, the dialkenyldihydrocarbylammonium halide can be a di($(C_1-C_{30})$alkenyl)di($(C_1-C_{30})$alkyl))ammonium halide, wherein the $(C_1-C_{30})$alkenyl and the $(C_1-C_{30})$alkyl are each independently selected and are independently substituted or unsubstituted. The dialkenyldihydrocarbylammonium halide can be a di($(C_1-C_{10})$alkenyl)di($(C_1-C_{10})$alkyl)) ammonium halide, wherein the $(C_1-C_{10})$alkenyl and the $(C_1-C_{10})$alkyl are each independently selected. The dialkenyldihydrocarbylammonium halide can be a di($(C_1-C_5)$ alkenyl)dimethylammonium halide, wherein the $(C_1-C_{10})$ alkenyl and the $(C_1-C_{30})$alkyl are each independently selected. The dialkenyldihydrocarbylammonium halide can be diallyldimethylammonium chloride (DADMAC).

In some embodiments, the dialkenyldihydrocarbylammonium halide can have the structure

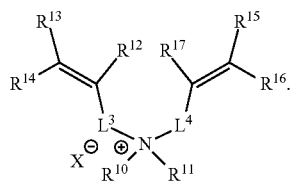

The variable $X^-$ can be selected from the group consisting of $I^-$, $Br^-$, and $Cl^-$. The variables $R^{12}$, $R^{13}$, $R^{14}$, $R^{15}$, $R^{16}$, and $R^{17}$ can be each independently selected from the group consisting of —H and substituted or unsubstituted $(C_1-C_{30})$ hydrocarbyl interrupted or terminated by 0, 1, 2, or 3 atoms selected from the group consisting of O, NH, and S. The variables $R^{10}$ and $R^{11}$ can be each independently a substituted or unsubstituted $(C_1-C_{30})$hydrocarbyl interrupted or terminated by 0, 1, 2, or 3 atoms selected from the group consisting of O, NH, and S. The variables $L^3$ and $L^4$ can be independently selected from a bond and substituted or unsubstituted $(C_1-C_{30})$hydrocarbylene interrupted or terminated by 0, 1, 2, or 3 atoms selected from the group consisting of O, NH, and S. The variables $R^{12}$, $R^{13}$, $R^{14}$, $R^{15}$, $R^{16}$, and $R^{17}$ can be each independently selected from the group consisting of —H and $(C_1-C_{10})$alkyl. The variables $R^{10}$ and $R^{11}$ can be each independently $(C_1-C_{10})$alkyl. The variables $L^3$ and $L^4$ can be independently selected from a bond and $(C_1-C_{10})$alkyl.

The dialkenyldihydrocarbylammonium halide can have the structure

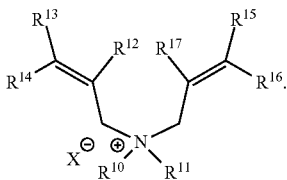

The variables $R^{12}$, $R^{13}$, $R^{14}$, $R^{15}$, $R^{16}$, and $R^{17}$ can be each independently selected from the group consisting of —H and $(C_1-C_5)$alkyl. The variables $R^{10}$ and $R^{11}$ can be each independently $(C_1-C_{10})$alkyl. At least one of $R^{12}$, $R^{13}$, and $R^{14}$ can be —H. At least one of $R^{15}$, $R^{16}$, and $R^{17}$ can be —H.

The dialkenyldihydrocarbylammonium halide can have the structure

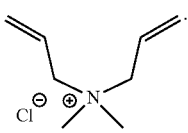

N-Dihydrocarbyl-Substituted Alkenamide.

The composition can include at least one of an N,N-dihydrocarbyl-substituted alkenamide or a polymer derived or derivable therefrom such as via free-radical polymerization of the unsaturated carbon-carbon bond in the N,N-dihydrocarbyl-substituted alkenamide. The N,N-dihydrocarbyl-substituted alkenamide can form any suitable proportion of the composition. For example, the N,N-dihydrocarbyl-substituted alkenamide can be 0.001 wt % to about 99.999 wt % of the composition, about 1 wt % to about 60 wt %, or about 0.001 wt % or less, or about 0.01 wt %, 0.1, 1, 2, 3, 4, 5, 10, 15, 20, 25, 30, 35, 40, 45, 50, 55, 60, 65, 70, 75, 80, 85, 90, 95, 96, 97, 98, 99, 99.9, 99.99 wt %, or about 99.999 wt % or more of the composition.

The N,N-dihydrocarbyl-substituted alkenamide can be any suitable N,N-dihydrocarbyl-substituted alkenamide, such that the method can be performed as described herein. For example, the N,N-dihydrocarbyl-substituted alkenamide can be an N,N-di($(C_1-C_{30})$alkyl)-substituted $(C_1-C_{10})$alkenamide, wherein the $(C_1-C_{30})$alkyl groups are independently selected and the $(C_1-C_{30})$alkyl and $(C_1-C_{10})$alkenamide groups are independently substituted or unsubstituted. The N,N-dihydrocarbyl-substituted alkenamide can be an N,N-di(($C_{10}$-$C_{25}$)alkyl)-substituted ($C_1$-$C_{10}$)alkenamide, wherein the ($C_1$-$C_{30}$)alkyl groups are independently selected. The N,N-dihydrocarbyl-substituted alkenamide is an N,N-di(($C_{10}$-$C_{25}$)alkyl)-substituted acrylamide, such as an N,N-di(($C_{16}$-$C_{18}$)alkyl)-substituted acrylamide.

In some embodiments, the N,N-dihydrocarbyl-substituted alkenamide can have the structure

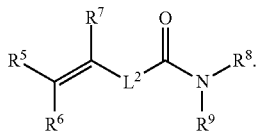

The variables $R^5$, $R^6$, and $R^7$ can be each independently selected from the group consisting of —H and substituted or unsubstituted ($C_1$-$C_{30}$)hydrocarbyl interrupted or terminated by 0, 1, 2, or 3 atoms selected from the group consisting of O, NH, and S. The variables $R^8$ and $R^9$ are each independently substituted or unsubstituted ($C_1$-$C_{30}$)hydrocarbyl interrupted or terminated by 0, 1, 2, or 3 atoms selected from the group consisting of O, NH, and S. The variable $L^2$ can be independently selected from a bond and substituted or unsubstituted ($C_1$-$C_{30}$)hydrocarbylene interrupted or terminated by 0, 1, 2, or 3 atoms selected from the group consisting of O, NH, and S. The variables $R^5$, $R^6$, and $R^7$ can be each independently selected from the group consisting of —H and ($C_1$-$C_{10}$)alkyl. The variables $R^8$ and $R^9$ can be each independently ($C_{10}$-$C_{25}$)alkyl. The variable $L^1$ can be independently selected from a bond and ($C_1$-$C_{10}$)alkylene.

The N,N-dihydrocarbyl-substituted alkenamide can have the structure

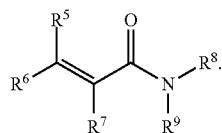

The variables $R^5$, $R^6$, and $R^7$ can be each independently selected from the group consisting of —H and ($C_1$-$C_5$)alkyl. At least one of $R^7$, $R^8$, and $R^9$ can be —H. The variables $R^8$ and $R^9$ can be each independently ($C_{10}$-$C_{25}$)alkyl.

The N,N-dihydrocarbyl-substituted alkenamide can have the structure

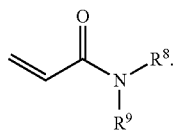

The variables $R^8$ and $R^9$ can be each independently ($C_{10}$-$C_{25}$)alkyl.

Example Mixtures of Components.

The composition including the alkenoate ester and at least one of the dialkenyldihydrocarbylammonium halide and the N,N-dihydrocarbyl-substituted alkenamide can be any suitable mixture, such that the method can be performed as described herein.

In some embodiments, the composition can include the alkenoate ester and the dialkenyldihydrocarbylammonium halide. The alkenoate ester can have the structure

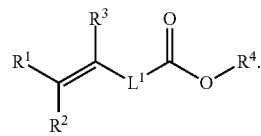

The variables $R^1$, $R^2$, and $R^3$ can be each independently selected from the group consisting of —H and substituted or unsubstituted ($C_1$-$C_{30}$)hydrocarbyl interrupted or terminated by 0, 1, 2, or 3 atoms selected from the group consisting of O, NH, and S. The variable $L^1$ can be independently selected from a bond and substituted or unsubstituted ($C_1$-$C_{30}$) hydrocarbylene interrupted or terminated by 0, 1, 2, or 3 atoms selected from the group consisting of O, NH, and S. The variable $R^4$ can be selected from the group consisting of a substituted or unsubstituted ($C_1$-$C_{30}$)hydrocarbyl interrupted or terminated by 0, 1, 2, or 3 atoms selected from the group consisting of O, NH, and S, and —R—(O—R)$_n$—OH, wherein R is a substituted or unsubstituted ($C_2$-$C_{10}$)hydrocarbylene and n is about 0 to about 10,000. The dialkenyldihydrocarbylammonium halide can have the structure

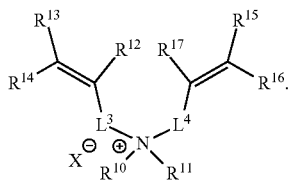

The variable $X^-$ can be selected from the group consisting of $I^-$, $Br^-$, and $Cl^-$. The variables $R^{12}$, $R^{13}$, $R^{14}$, $R^{15}$, $R^{16}$, and $R^{17}$ can be each independently selected from the group consisting of —H and substituted or unsubstituted ($C_1$-$C_{30}$) hydrocarbyl interrupted or terminated by 0, 1, 2, or 3 atoms selected from the group consisting of O, NH, and S. The variables $R^{10}$ and $R^{11}$ can be each independently a substituted or unsubstituted ($C_1$-$C_{30}$)hydrocarbyl interrupted or terminated by 0, 1, 2, or 3 atoms selected from the group consisting of O, NH, and S. The variables $L^3$ and $L^4$ can be independently selected from a bond and substituted or unsubstituted ($C_1$-$C_{30}$)hydrocarbylene interrupted or terminated by 0, 1, 2, or 3 atoms selected from the group consisting of O, NH, and S.

In some embodiments, the composition can include the alkenoate ester and the dialkenyldihydrocarbylammonium halide. The alkenoate ester can have the structure

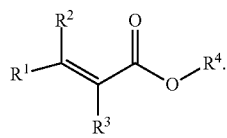

The variables $R^1$, $R^2$, and $R^3$ can be each independently selected from the group consisting of —H and ($C_1$-$C_5$)alkyl. At least one of $R^1$, $R^2$, and $R^3$ can be —H. The variable $R^4$ can be selected from the group consisting of ($C_1$-$C_{15}$)alkyl, and —R—(O—R)$_n$—OH, wherein R is a ($C_2$-$C_5$)alkylene and n is about 0 to about 1,000. The dialkenyldihydrocarbylammonium halide can have the structure

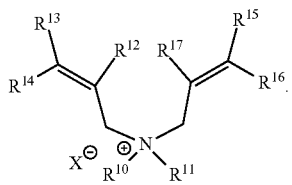

The variable $X^-$ can be selected from the group consisting of $I^-$, $Br^-$, and $Cl^-$. The variables $R^{12}$, $R^{13}$, $R^{14}$, $R^{15}$, $R^{16}$, and $R^{17}$ can be each independently selected from the group consisting of —H and $(C_1-C_5)$alkyl. The variables $R^{10}$ and $R^{11}$ can be each independently $(C_1-C_{10})$alkyl. At least one of $R^{12}$, $R^{13}$, and $R^{14}$ can be —H. At least one of $R^{15}$, $R^{16}$, and $R^{17}$ can be —H.

In some embodiments, the composition can include the alkenoate ester and the N,N-dihydrocarbyl-substituted alkenamide. The alkenoate ester can have the structure

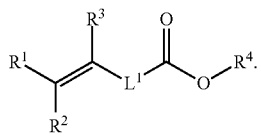

The variables $R^1$, $R^2$, and $R^3$ can be each independently selected from the group consisting of —H and substituted or unsubstituted $(C_1-C_{30})$hydrocarbyl interrupted or terminated by 0, 1, 2, or 3 atoms selected from the group consisting of O, NH, and S. The variable $L^1$ can be independently selected from a bond and substituted or unsubstituted $(C_1-C_{30})$ hydrocarbylene interrupted or terminated by 0, 1, 2, or 3 atoms selected from the group consisting of O, NH, and S. The variable $R^4$ can be selected from the group consisting of a substituted or unsubstituted $(C_1-C_{30})$hydrocarbyl interrupted or terminated by 0, 1, 2, or 3 atoms selected from the group consisting of O, NH, and S, and —R—(O—R)$_n$—OH, wherein R is a substituted or unsubstituted $(C_2-C_{10})$hydrocarbylene and n is about 0 to about 10,000. The N,N-dihydrocarbyl-substituted alkenamide can have the structure

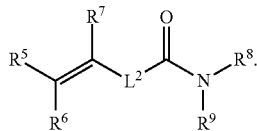

The variables $R^5$, $R^6$, and $R^7$ can be each independently selected from the group consisting of —H and substituted or unsubstituted $(C_1-C_{30})$hydrocarbyl interrupted or terminated by 0, 1, 2, or 3 atoms selected from the group consisting of O, NH, and S. The variables $R^8$ and $R^9$ are each independently substituted or unsubstituted $(C_1-C_{30})$hydrocarbyl interrupted or terminated by 0, 1, 2, or 3 atoms selected from the group consisting of O, NH, and S. The variable $L^2$ can be independently selected from a bond and substituted or unsubstituted $(C_1-C_{30})$hydrocarbylene interrupted or terminated by 0, 1, 2, or 3 atoms selected from the group consisting of O, NH, and S.

In some embodiments, the composition can include the alkenoate ester and the N,N-dihydrocarbyl-substituted alkenamide. The alkenoate ester can have the structure

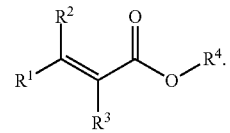

The variables $R^1$, $R^2$, and $R^3$ can be each independently selected from the group consisting of —H and $(C_1-C_5)$alkyl. At least one of $R^1$, $R^2$, and $R^3$ can be —H. The variable $R^4$ can be independently selected from the group consisting of a $(C_1-C_{15})$alkyl, and —R—(O—R)$_n$—OH, wherein R is a $(C_2-C_5)$alkylene and n is about 0 to about 1,000. The N,N-dihydrocarbyl-substituted alkenamide can have the structure

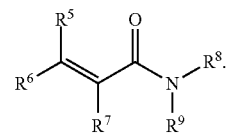

The variables $R^5$, $R^6$, and $R^7$ can be each independently selected from the group consisting of —H and $(C_1-C_5)$alkyl. At least one of $R^7$, $R^8$, and $R^9$ can be —H. The variables $R^8$ and $R^9$ can be each independently $(C_{10}-C_{25})$alkyl.

Polymer.

In various embodiments, the composition includes a polymer. In some embodiments, the polymer is derived from (e.g., derivable, and optionally but not necessarily derived from) an alkenoate ester and at least one of a dialkenyldihydrocarbylammonium halide and an N,N-dihydrocarbyl-substituted alkenamide. Some embodiments of the method include performing free-radical polymerization to provide the polymer. In other embodiments, the polymer is preformed at the time of performance of the method, either from any suitable reaction mixture described herein or from any suitable mixture. The polymers described herein can include any suitable number and variety of additional monomers, and can be terminated by any moiety via any suitable fashion. Any suitable proportion of the composition can be the polymer, such as about about 0.001 wt % to about 99.999 wt %, about 1 wt % to about 60 wt %, or about 0.001 wt % or less, or about 0.01 wt %, 0.1, 1, 2, 3, 4, 5, 10, 15, 20, 25, 30, 35, 40, 45, 50, 55, 60, 65, 70, 75, 80, 85, 90, 95, 96, 97, 98, 99, 99.9, 99.99 wt %, or about 99.999 wt % of the composition is the polymer. The polymer can have any suitable molecular weight, such as about 5,000 mol/g to about 50,000,000 mol/g, about 10,000 mol/g to about 10,000,000 mol/g, about 20,000 mol/g to about 5,000,000 mol/g, or about 5,000 mol/g or less, or about 10,000, 20,000, 25,000, 50,000, 100,000, 150,000, 200,000, 300,000, 400,000, 500,000, 750,000, 1,000,000, 1,500,000, 2,000,000, 5,000,000, 10,000,000, 25,000,000, or about 50,000,000 mol/g or more.

In various embodiments, the polymer includes repeating units having at least one of the following structures:

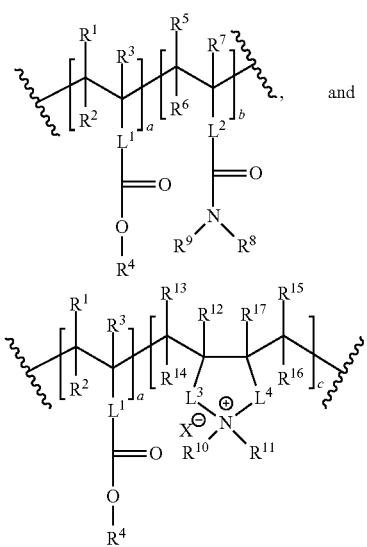
and larly coupled to provide consolidation properties. The ester groups can act as delay-activated water control agents, which can swell in the presence of water upon hydrolysis.

The polymer can include repeating units having at least one of the following structures:

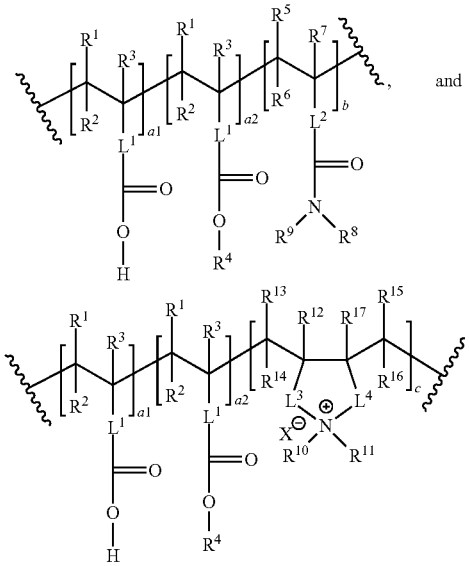

The repeating units can be in a block or random arrangement in the polymer wherein each repeating unit at each occurrence independently occurs in the orientation shown or in an opposite orientation. The variable $X^-$ can be selected from the group consisting of $I^-$, $Br^-$, and $Cl^-$. The variables $R^1$, $R^2$, $R^3$, $R^5$, $R^6$, $R^7$, $R^{12}$, $R^{13}$, $R^{14}$, $R^{15}$, $R^{16}$, and $R^{17}$ at each occurrence can be each independently selected from the group consisting of —H and substituted or unsubstituted $(C_1-C_{30})$hydrocarbyl interrupted or terminated by 0, 1, 2, or 3 atoms selected from the group consisting of O, NH, and S. The variables $L^1$, $L^2$, $L^3$, and $L^4$ at each occurrence can be each independently selected from a bond and substituted or unsubstituted $(C_1-C_{30})$hydrocarbylene interrupted or terminated by 0, 1, 2, or 3 atoms selected from the group consisting of O, NH, and S. The variables $R^8$, $R^9$, $R^{10}$, $R^{11}$ at each occurrence are each independently substituted or unsubstituted $(C_1-C_{30})$hydrocarbyl interrupted or terminated by 0, 1, 2, or 3 atoms selected from the group consisting of O, NH, and S. At each occurrence $R^4$ can be independently selected from the group consisting of a substituted or unsubstituted $(C_1-C_{30})$hydrocarbyl interrupted or terminated by 0, 1, 2, or 3 atoms selected from the group consisting of O, NH, and S, and —R—(O—R)$_n$—OH, wherein R is a substituted or unsubstituted $(C_2-C_{10})$hydrocarbylene and n is about 0 to about 10,000. The variable a is about 1 to about 100,000, b is about 1 to about 100,000, and c is about 1 to about 100,000. In some embodiments, $R^1$, $R^2$, $R^3$, $R^5$, $R^6$, $R^7$, $R^{12}$, $R^{13}$, $R^{14}$, $R^{15}$, $R^{16}$, and $R^{17}$ at each occurrence can be each independently selected from the group consisting of —H and $(C_1-C_{10})$ alkyl. The variables $L^1$, $L^2$, $L^3$, and $L^4$ at each occurrence can be each independently selected from a bond and $(C_1-C_{10})$alkylene. The variables $R^8$ and $R^9$ at each occurrence can be each independently $(C_{10}-C_{25})$alkyl. The variables $R^{10}$ and $R^{11}$ at each occurrence can be each independently $(C_1-C_{10})$alkyl. At each occurrence $R^4$ can be independently selected from the group consisting of a $(C_1-C_{10})$alkyl, and —R—(O—R)$_n$—OH, wherein R is a $(C_2-C_5)$hydrocarbylene and n is about 0 to about 1,000. In various examples, the polyalkenoate portion of the polymer can provide water control properties, such as via hydrolysis and swelling, while the amide or dialkenyldihydrocarbylammonium portion of the polymer can act as a tackyfing agent with consolidation properties. In various embodiments, the alkenoate portion of the polymer is inter- or intra-molecu- The repeating units can be in a block or random arrangement in the polymer wherein each repeating unit at each occurrence independently occurs in the orientation shown or in an opposite orientation, wherein a1+a2=a. The variables a1 and a2 can be any suitable proportion of the variable a, for example, a1 can be about 0.001% to about 99.999% of the variable a, about 1% to about 60% of a, or about 0.001% or less, or about 0.01%, 0.1, 1, 2, 3, 4, 5, 10, 15, 20, 25, 30, 35, 40, 45, 50, 55, 60, 65, 70, 75, 80, 85, 90, 95, 96, 97, 98, 99, 99.9, 99.99%, or about 99.999% or more of the variable a.

The polymer can include a repeating unit having the structure:

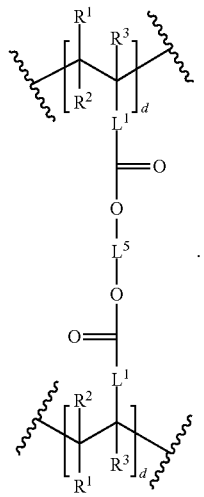

The repeating unit is in a block or random arrangement in the polymer wherein each repeating unit at each occurrence independently occurs in the orientation shown or in an opposite orientation. The repeating unit including $L^5$ is coupled to the same polymer or to a different polymer (e.g., inter- or intra-molecularly coupled), such as to a different polymer having an identical, similar, or corresponding structure. The variable $L^5$ at each occurrence can be independently selected from a substituted or unsubstituted ($C_1$-$C_{30}$) hydrocarbylene interrupted or terminated by 0, 1, 2, or 3 atoms selected from the group consisting of O, NH, and S, and —R—(O—R)$_n$—, wherein R is a substituted or unsubstituted ($C_2$-$C_{10}$)hydrocarbylene and n is about 0 to about 10,000. The variable d can be about 1 to about 100,000. The repeating unit can have the structure:

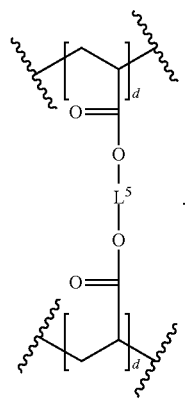

The variable $L^5$ at each occurrence can be independently selected from a ($C_1$-$C_{30}$)alkylene, and —R—(O—R)$_n$—, wherein R is a ($C_2$-$C_5$)alkylene and n is about 0 to about 10,000.

The polymer can include repeating units having the structure:

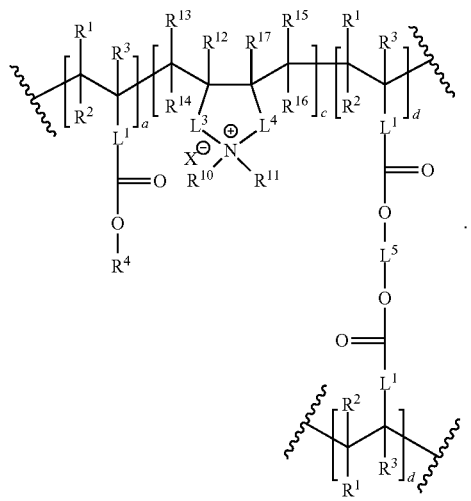

The repeating units can be in a block or random arrangement in the polymer wherein each repeating unit at each occurrence independently occurs in the orientation shown or in an opposite orientation. The repeating unit including $L^5$ can be coupled to the same polymer or to a different polymer. The variable $L^5$ at each occurrence can be independently selected from a substituted or unsubstituted ($C_1$-$C_{30}$)hydrocarbylene interrupted or terminated by 0, 1, 2, or 3 atoms selected from the group consisting of O, NH, and S, and —R—(O—R)$_n$—, wherein R is a substituted or unsubstituted ($C_2$-$C_{10}$)hydrocarbylene and n is about 0 to about 10,000. The variable d can be about 1 to about 100,000.

The polymer can include repeating units having the structure:

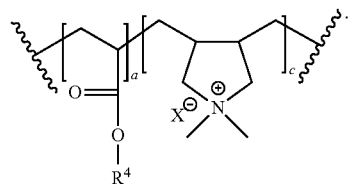

At each occurrence $R^4$ can be independently selected from the group consisting of ($C_1$-$C_{15}$)alkyl, and —R—(O—R)$_n$—OH, wherein R is a ($C_2$-$C_5$)alkylene and n is about 0 to about 1,000.

The polymer can include repeating units having the structure:

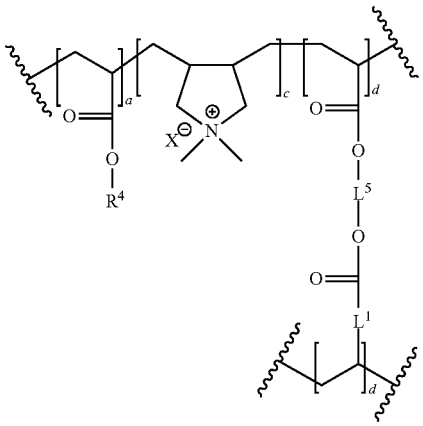

The repeating units can be in a block or random arrangement in the polymer wherein each repeating unit at each occurrence independently occurs in the orientation shown or in an opposite orientation. The repeating unit including $L^5$ can be coupled to the same polymer or to a different polymer. At each occurrence $R^4$ can be independently selected from the group consisting of ($C_1$-$C_{15}$)alkyl, and —R—(O—R)$_n$—OH, wherein R is a ($C_2$-$C_5$)alkylene and n is about 0 to about 1,000. At each occurrence $L^5$ can be independently selected from the group consisting of a ($C_1$-$C_{30}$)alkylene, and —R—(O—R)$_n$—, wherein R is a ($C_2$-$C_5$)alkylene and n is about 0 to about 10,000. The variable d can be about 1 to about 100,000.

The polymer can include repeating units having the structure:

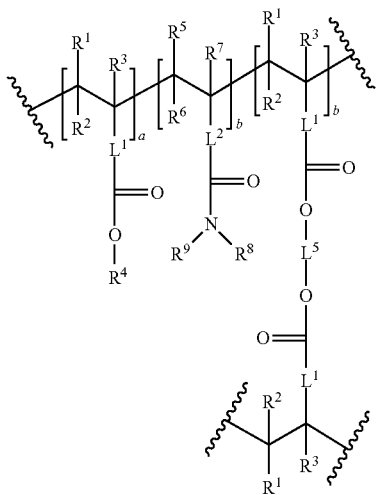

The repeating units can be in a block or random arrangement in the polymer wherein each repeating unit at each occurrence independently occurs in the orientation shown or in an opposite orientation. The repeating unit including $L^5$ can be coupled to the same polymer or to a different polymer. At each occurrence $L^5$ can be independently selected from the group consisting of a $(C_1$-$C_{30})$alkylene, and —R—(O—R)$_n$—, wherein R is a $(C_2$-$C_5)$alkylene and n is about 0 to about 10,000. The variable d can be about 1 to about 100,000.

The polymer can include repeating units having the structure:

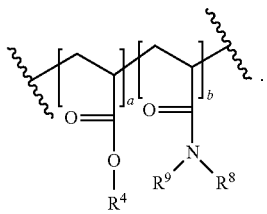

At each occurrence $R^4$ can be independently selected from the group consisting of $(C_1$-$C_{15})$alkyl, and —R—(O—R)$_n$—OH. The variable R can be a $(C_2$-$C_5)$alkylene and n is about 0 to about 1,000. The variables $R^8$ and $R^9$ at each occurrence can be each independently $(C_{10}$-$C_{25})$alkyl.

The polymer can include repeating units having the structure:

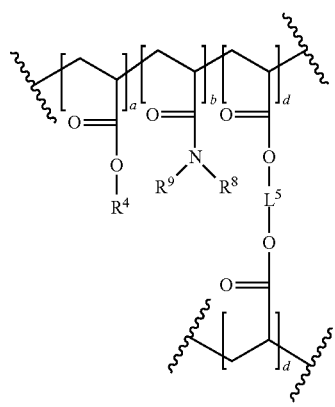

The repeating units can be in a block or random arrangement in the polymer wherein each repeating unit at each occurrence independently occurs in the orientation shown or in an opposite orientation. The repeating unit including $L^5$ can be coupled to the same polymer or to a different polymer. At each occurrence $R^4$ can be independently selected from the group consisting of $(C_1$-$C_{15})$alkyl, and —R—(O—R)$_n$—OH, wherein R is a $(C_2$-$C_5)$alkylene and n is about 0 to about 1,000. The variables $R^8$ and $R^9$ at each occurrence can be each independently $(C_{10}$-$C_{25})$alkyl. At each occurrence $L^5$ can be independently selected from the group consisting of a $(C_1$-$C_{30})$alkylene, and —R—(O—R)$_n$—, wherein R is a $(C_2$-$C_5)$alkylene and n is about 0 to about 10,000. The variable d can be about 1 to about 100,000.

Other components.

The composition including the alkenoate ester and at least one of the dialkenyldihydrocarbylammonium halide and the N,N-dihydrocarbyl-substituted alkenamide or a polymer derived or derivable therefrom can include any suitable additional components in any suitable proportion, such that the method can be performed as described herein. Any additional component can be present or not present in the composition.

Free-radicals for polymerization of unsaturated carbon-carbon bonds can be generated by any suitable method. Free-radicals can be initiated by, for example, thermal decomposition, photolysis, redox reactions, persulfates, ionizing radiation, electrolysis, plasma, sonication, or a combination thereof. In one example, a free-radical is generated using a free-radical initiator. In some embodiments, the composition further includes a radical initiator. The radical initiator can be any suitable radical initiator, such as an organic peroxide, or a free-radical initiator activated by heat. Further, a free-radical photoinitiator can be any free-radical photoinitiator capable of initiating cure (cross-linking) of free-radical polymerizable functional groups upon exposure to radiation, for example, having a wavelength of from 200 to 800 nm. In another example, the free-radical initiator is an organoborane-based free-radical initiator. In one example, the free-radical initiator can be an organic peroxide. For example, elevated temperatures can allow a peroxide to decompose and form a highly reactive radical, which can initiate free-radical polymerization. In some examples, decomposed peroxides and their derivatives can be byproducts. In some examples, the free-radical initiator can be at least one of tert-amyl peroxybenzoate, 4,4-azobis(4-cyanovaleric acid), 1,1'-azobis(cyclohexanecarbonitrile), 2,2'-azobisisobutyronitrile (AIBN), benzoyl peroxide, 2,2-bis-(tert-butylperoxy)butane, 1,1-bis(tert-butylperoxy) cyclohexane, 2,5-bis(tert-butylperoxy)-2,6-dimethylhexane, 2,5-bis(tert-butylperoxy)-2,5-dimethyl-3-hexyne, bis(1-(tert-butylperoxy)-1-methylethyl)benzene, 1,1-bis(tert-butylperoxy)-3,3,5-trimethylcyclohexane, tert-butyl hydroperoxide, tert-butyl peracetate, tert-butyl peroxybenzoate, tert-butylperoxy isopropyl carbonate, cumene hydroperoxide, cyclohexanone peroxide, dicumyl peroxide, lauroyl peroxide, 2,4-pentanedione peroxide, peracetic acid, or potassium persulfate. The radical initiator can be present as any suitable proportion of the composition, such as about 0.001 wt % to about 20 wt % of the composition, about 0.001 wt % to about 3 wt % of the composition, or about 0.001 wt % or less, or about 0.005 wt %, 0.01, 0.05, 0.1, 0.5, 1, 1.5, 2, 2.5, 3, 4, 5, 6, 8, 10, 12, 14, 16, 18, or about 20 wt % or more.

In various embodiments, the composition further includes a coupling agent. The coupling agent can be any suitable coupling agent that provides inter- or intra-molecular coupling of the polymer or of the carboxylate groups of alkenoate moieties in the composition. For example, the coupling agent can be at least one of a diol, polyol, diamine, polyamine, and a silane coupling agent. The coupling agent can be present as any suitable proportion of the composition, such as about 0.001 wt % to about 20 wt % of the composition, about 0.001 wt % to about 3 wt % of the composition, or about 0.001 wt % or less, or about 0.005 wt %, 0.01, 0.05, 0.1, 0.5, 1, 1.5, 2, 2.5, 3, 4, 5, 6, 8, 10, 12, 14, 16, 18, or about 20 wt % or more.

In some embodiments, the composition includes a silane coupling agent. The silane coupling agent can be a hydrocarbyl-substituted trimethoxysilane, wherein the hydrocarbyl group is substituted or unsubstituted. The silane coupling agent can be at least one of N-2-(aminoethyl)-3-aminopropyltrimethyloxysilane, 3-glycidoxypropyltrimethyoxysilane, and n-beta-(aminoethyl)-gamma-aminopropyltrimethoxysilane.

The coupling agent can be a $(C_1$-$C_{30})$hydrocarbyl diol or polyol, wherein the alcohol moieties are on the hydrocarbyl at terminal locations, intermediate locations, or combinations thereof. For example, the coupling agent can be a $(C_1$-$C_{30})$alkyl diol or polyol. The coupling agent can be HO—(R—O)$_n$—R—OH, wherein R is a substituted or unsubstituted $(C_2$-$C_{10})$hydrocarbylene and n is about 0 to about 10,000; R can be $(C_2$-$C_{10})$akylene. The coupling agent can be a $(C_1$-$C_{30})$hydrocarbyl diamine or polyamine, wherein the amine moieties are on the hydrocarbyl at terminal locations, intermediate locations, or combinations thereof. For example, the coupling agent can be a $(C_1$-$C_{30})$ alkyl diamine or polyamine.

The composition can further include a resin, such as any suitable resin. For example, the composition can include at least one of an epoxide-containing resin, a polyepoxide resin, a novolak resin, a polyester resin, phenolaldehyde resin, a urea-aldehyde resin, a furan resin, a urethane resin, and a glycidyl ether resin. The composition can include at least one of bisphenol A diglycidyl ether resin, butoxymethyl butyl glycidyl ether resin, bisphenol A-epichlorohydrin resin, and bisphenol F resin. The resin can be present as any suitable proportion of the composition, such as about 0.01 wt % to about 99.99 wt % of the composition, or about 0.01 wt % to about 50 wt % of the composition, or about 0.01 wt % or less, or about 0.05 wt %, 0.1, 0.5, 1, 2, 3, 4, 5, 10, 15, 20, 25, 30, 35, 40, 45, 50, 55, 60, 65, 70, 75, 80, 85, 90, 95, 96, 97, 98, 99, 99.5, 99.9, 99.95 wt %, or about 99.99 wt % or more.

The composition can further include at least one organic compound that includes at least one of an amine and an amide, wherein the amine is an aromatic amine, an aliphatic amine, a cyclo-aliphatic amine, a polyamine, or a combination thereof, wherein the amide is a mono- or polyamide. In some embodiments the composition further includes at least one of piperidine, triethylamine, benzyldimethylamine, N,N-dimethylaminopyridine, 2-(N,N-dimethylaminomethyl)phenol, tris(dimethylaminomethyl)phenol, 4,4'-diaminodiphenyl sulfone, 2-ethyl-4-methyl imidazole, and 1,1,3-trichlorotrifluoroacetone.

In some embodiments, the composition can further include at least one of acrylic acid and acrylamide. The acrylic acid or acrylamide can be any suitable proportion of the composition, such as about 0.001 wt % to about 99.999 wt % of the composition, about 1 wt % to about 60 wt %, or about 0.001 wt % or less, or about 0.01 wt %, 0.1, 1, 2, 3, 4, 5, 10, 15, 20, 25, 30, 35, 40, 45, 50, 55, 60, 65, 70, 75, 80, 85, 90, 95, 96, 97, 98, 99, 99.9, 99.99 wt %, or about 99.999 wt % or more of the composition. The composition can include a mono- or di-N-substituted hydroxy$(C_1$-$C_{30})$hydrocarbyl or amino$(C_1$-$C_{30})$hydrocarbyl acrylamide, the hydroxy and amino moieties being at an intermediate or terminal position on the hydrocarbyl group. The composition can further include an acrylamide that is mono- or di-N-substituted by —(R—O)$_n$—R—OH, wherein R is a substituted or unsubstituted $(C_2$-$C_{10})$hydrocarbylene and n is about 0 to about 10,000.

The composition can further include a carrier fluid. The carrier fluid can be any suitable carrier fluid. For example, the carrier fluid can be at least one of an aqueous liquid and an organic liquid. The carrier fluid can be any suitable downhole fluid, such as an aqueous downhole fluid. The carrier fluid can be at least one of dipropylene glycol methyl ether, dipropylene glycol dimethyl ether, dimethyl formamide, diethylene glycol methyl ether, ethylene glycol butyl ether, diethylene glycol butyl ether, propylene carbonate, D-limonene, a $C_2$-$C_{40}$ fatty acid $C_1$-$C_{10}$ alkyl ester, 2-butoxy ethanol, butyl acetate, furfuryl acetate, dimethyl sulfoxide, and dimethyl formamide. The carrier fluid can be any suitable proportion of the composition, such as about 0.01 wt % to about 99.99 wt % of the composition, about 10 wt % to about 95 wt % of the composition, or about 0.001 wt % or less, or about 0.01 wt %, 0.1, 1, 2, 3, 4, 5, 10, 15, 20, 25, 30, 35, 40, 45, 50, 55, 60, 65, 70, 75, 80, 85, 90, 95, 96, 97, 98, 99, 99.9, 99.99 wt %, or about 99.999 wt % or more of the composition.

The composition can include a surfactant. The surfactant can be any suitable surfactant, such as at least one of a cationic surfactant, an anionic surfactant, and non-ionic surfactant. The surfactant can be at least one of ethoxylated nonyl phenol phosphate ester and a $C_{12}$-$C_{22}$ alkyl phosphonate. The surfactant can be any suitable proportion of the composition, such as about 0.001 wt % to about 10 wt % of the composition, about 0.1 wt % to about 5 wt % of the composition, or about 0.001 wt % or less, or about 0.005 wt %, 0.01, 0.05, 0.1, 0.5, 1, 1.5, 2, 2.5, 3, 3.5, 4, 4.5, 5, 6, 7, 8, 9 wt %, or about 10 wt % or more of the composition.

In one example, the surfactant is sorbitan monooletate. In one example, the surfactant can be a non-ionic surfactant. Examples of non-ionic surfactants can include polyoxyethylene alkyl ethers, polyoxyethylene alkylphenol ethers, polyoxyethylene lauryl ethers, polyoxyethylene sorbitan monoleates, polyoxyethylene alkyl esters, polyoxyethylene sorbitan alkyl esters, polyethylene glycol, polypropylene glycol, diethylene glycol, ethoxylated trimethylnonanols, polyoxyalkylene glycol modified polysiloxane surfactants, and mixtures, copolymers or reaction products thereof. In one example, the surfactant is polyglycol-modified trimethylsilylated silicate surfactant.

Examples of suitable cationic surfactants can include, but are not limited to, quaternary ammonium hydroxides such as octyl trimethyl ammonium hydroxide, dodecyl trimethyl ammonium hydroxide, hexadecyl trimethyl ammonium hydroxide, octyl dimethyl benzyl ammonium hydroxide, decyl dimethyl benzyl ammonium hydroxide, didodecyl dimethyl ammonium hydroxide, dioctadecyl dimethyl ammonium hydroxide, tallow trimethyl ammonium hydroxide and coco trimethyl ammonium hydroxide and corresponding salts thereof, fatty amines and fatty acid amides and their derivatives, basic pyridinium compounds, and quaternary ammonium bases of benzimidazolines and poly (ethoxylated/propoxylated) amines.

Examples of suitable anionic surfactants can include, but are not limited to, alkyl sulphates such as lauryl sulphate, polymers such as acrylates/$C_{10\text{-}30}$ alkyl acrylate crosspolymer alkylbenzenesulfonic acids and salts such as hexylbenzenesulfonic acid, octylbenzenesulfonic acid, decylbenzenesulfonic acid, dodecylbenzenesulfonic acid, cetylbenzenesulfonic acid and myristylbenzenesulfonic acid; the sulphate esters of monoalkyl polyoxyethylene ethers; alkylnapthylsulfonic acid; alkali metal sulfoccinates, sulfonated glyceryl esters of fatty acids such as sulfonated monoglycerides of coconut oil acids, salts of sulfonated monovalent alcohol esters, amides of amino sulfonic acids, sulfonated products of fatty acid nitriles, sulfonated aromatic hydrocarbons, condensation products of naphthalene sulfonic acids with formaldehyde, sodium octahydroanthracene sulfonate, alkali metal alkyl sulphates, ester sulphates, and alkarylsulfonates. Anionic surfactants can include alkali metal soaps of higher fatty acids, alkylaryl sulfonates such as sodium dodecyl benzene sulfonate, long chain fatty alcohol sulfates, olefin sulfates and olefin sulfonates, sulfated monoglycerides, sulfated esters, sulfonated ethoxylated alcohols, sulfosuccinates, alkane sulfonates, phosphate esters, alkyl isethionates, alkyl taurates, and alkyl sarcosinates.

Examples of suitable non-ionic surfactants can include, but are not limited to, condensates of ethylene oxide with long chain fatty alcohols or fatty acids such as a ($C_{12-16}$) alcohol, condensates of ethylene oxide with an amine or an amide, condensation products of ethylene and propylene oxide, esters of glycerol, sucrose, sorbitol, fatty acid alkylol amides, sucrose esters, fluoro-surfactants, fatty amine oxides, polyoxyalkylene alkyl ethers such as polyethylene glycol long chain alkyl ether, polyoxyalkylene sorbitan ethers, polyoxyalkylene alkoxylate esters, polyoxyalkylene alkylphenol ethers, ethylene glycol propylene glycol copolymers, alkylpolysaccharides, and polymeric surfactants such as polyvinyl alcohol (PVA) and polyvinylmethylether. In certain embodiments, the surfactant is a polyoxyethylene fatty alcohol or mixture of polyoxyethylene fatty alcohols. In other embodiments, the surfactant is an aqueous dispersion of a polyoxyethylene fatty alcohol or mixture of polyoxyethylene fatty alcohols.

In some embodiments, the surfactant can be selected from Tergitol™ 15-s-3, Tergitol™ 15-s-40, sorbitan monooleate, polylycol-modified trimethsilylated silicate, polyglycol-modified siloxanes, polyglycol-modified silicas, ethoxylated quaternary ammonium salt solutions, and cetyltrimethylammonium chloride solutions.

The composition can include a crosslinked gel or a crosslinkable gel. In some examples, the crosslinked gel or crosslinkable gel can be used to control or manage the viscosity of the composition. The crosslinked gel or crosslinkable gel can include at least one of a linear polysaccharide, and poly(($C_2$-$C_{10}$)alkenylene), wherein the ($C_2$-$C_{10}$) alkenylene is substituted or unsubstituted. The crosslinked gel or crosslinkable gel can include at least one of poly (acrylic acid) or ($C_1$-$C_5$)alkyl esters thereof, poly(methacrylic acid) or ($C_1$-$C_5$)alkyl esters thereof, poly(vinyl acetate), poly(vinyl alcohol), poly(ethylene glycol), poly (vinyl pyrrolidone), polyacrylamide, poly (hydroxyethyl methacrylate), acetan, alginate, chitosan, curdlan, a cyclosophoran, dextran, emulsan, a galactoglucopolysaccharide, gellan, glucuronan, N-acetyl-glucosamine, N-acetyl-heparosan, hyaluronic acid, indicant, kefiran, lentinan, levan, mauran, pullulan, scleroglucan, schizophyllan, stewartan, succinoglycan, xanthan, welan, starch, tamarind, tragacanth, guar gum, derivatized guar, gum ghatti, gum arabic, locust bean gum, cellulose, derivatized cellulose, carboxymethyl cellulose, hydroxyethyl cellulose, carboxymethyl hydroxyethyl cellulose, hydroxypropyl cellulose, methyl hydroxyl ethyl cellulose, guar, hydroxypropyl guar, carboxy methyl guar, and carboxymethyl hydroxylpropyl guar. The composition can include a crosslinker; for example, a crosslinker suitable for crosslinking the crosslinkable gel. The crosslinker can include at least one of chromium, aluminum, antimony, zirconium, titanium, calcium, boron, iron, silicon, copper, zinc, magnesium, and an ion thereof. The crosslinker can include at least one of boric acid, borax, a borate, a ($C_1$-$C_{30}$)hydrocarbylboronic acid, a ($C_1$-$C_{30}$)hydrocarbyl ester of a ($C_1$-$C_{30}$)hydrocarbylboronic acid, a ($C_1$-$C_{30}$)hydrocarbylboronic acid-modified polyacrylamide, ferric chloride, disodium octaborate tetrahydrate, sodium metaborate, sodium diborate, sodium tetraborate, disodium tetraborate, a pentaborate, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, and zirconium lactate glycolate, titanium lactate, titanium malate, titanium citrate, titanium ammonium lactate, titanium triethanolamine, titanium acetylacetonate, aluminum lactate, or aluminum citrate. The crosslinked or crosslinkable gel can be any suitable proportion of the composition, such as about 0.01 wt % to about 50 wt % of the composition, about 10 wt % to about 30 wt % of the composition, or about 0.001 wt % or less, or about 0.01 wt %, 0.1, 1, 2, 3, 4, 5, 10, 15, 20, 25, 30, 35, 40, 45 wt %, or about 50 wt % or more of the composition. The crosslinker can be any suitable proportion of the composition, such as about 0.001 wt % to about 10 wt % of the composition, about 0.1 wt % to about 5 wt % of the composition, or about 0.001 wt % or less, or about 0.005 wt %, 0.01, 0.05, 0.1, 0.5, 1, 1.5, 2, 2.5, 3, 3.5, 4, 4.5, 5, 6, 7, 8, 9 wt %, or about 10 wt % or more of the composition.

The composition can include a hydrolyzable ester. The hydrolyzable ester can be a $C_1$-$C_5$ mono-, di-, tri-, or tetra-alkyl ester of a $C_2$-$C_{40}$ mono-, di-, tri-, or tetra-carboxylic acid. The hydrolyzable ester can be dimethylglutarate, dimethyladipate, dimethylsuccinate, sorbitol, catechol, dimethylthiolate, methyl salicylate, dimethylsalicylate, or tert-butylhydroperoxide. The hydrolyzable ester can be present as any suitable proportion of the composition, such as about 0.01 wt % to about 20 wt % of the composition, about 0.1 wt % to about 5 wt % of the composition, or about 0.001 wt % or less, or about 0.005 wt %, 0.01, 0.05, 0.1, 0.5, 1, 1.5, 2, 2.5, 3, 4, 5, 6, 8, 10, 12, 14, 16, 18, or about 20 wt % or more.

Coated Proppant or Gravel.

Various embodiments of the present invention provide a method of treating a subterranean formation, the method including obtaining or providing a proppant or a gravel pack, wherein the proppant or gravel pack is coated. The proppant or gravel can be at least partially coated with the composition described herein, such as the composition including the alkenoate ester and at least one of the dialkenyldihydrocarbylammonium halide and the N,N-dihydrocarbyl-substituted alkenamide or including the polymer derived or derivable therefrom. The proppant or gravel can be at least partially coated with a tackifier and at least partially coated with a water-control agent. The coating can be any suitable coating, such that the coating covers any suitable surface area of the proppant or gravel pack, and wherein the coating has any suitable thickness at any given location on the surface of the proppant or gravel pack. The method can include placing the coated proppant or gravel pack in a subterranean formation downhole. In some embodiments, the coated proppant or gravel pack has about 0.001 wt % to about 99.999 wt % coating, or about 0.001 to about 50 wt % coating, or about 0.001 wt % or less, or about 0.01, 0.1, 1, 2, 3, 4, 5, 10, 15, 20, 25, 30, 35, 40, 45, 50, 55, 60, 65, 70, 75, 80, 85, 90, 95, 96, 97, 98, 99, 99.9, 99.99 wt %, or about 99.999 wt % coating. The coating is sufficient such that when the coated proppant or gravel pack is placed downhole, the proppant or gravel pack exhibits consolidation properties as well as water-control properties.

Obtaining or providing the proppant or gravel pack can include forming the at least partial coating of the tackifier on the proppant or gravel pack. Obtaining or providing the proppant or gravel pack can include forming the at least partial coating of the water-control agent on the proppant or gravel pack. The proppant or gravel pack can be obtained or provided in a slurry, such as a slurry including a carrier fluid, wherein placing the proppant or gravel pack in the subterranean formation includes placing the slurry in the subterranean formation. The method can include combining the proppant or gravel pack with a carrier fluid to form a slurry, wherein placing the proppant or gravel pack in the subterranean formation can include placing the slurry in the subterranean formation.

The carrier fluid can be any suitable carrier fluid. For example, the carrier fluid can include at least one of an aqueous liquid and an organic liquid. The carrier fluid can include at least one of dipropylene glycol methyl ether, dipropylene glycol dimethyl ether, dimethyl formamide, diethylene glycol methyl ether, ethylene glycol butyl ether, diethylene glycol butyl ether, propylene carbonate, D-limonene, a $C_2$-$C_{40}$ fatty acid $C_1$-$C_{10}$ alkyl ester, 2-butoxy ethanol, butyl acetate, furfuryl acetate, dimethyl sulfoxide, and dimethyl formamide. The carrier fluid can be any suitable proportion of the slurry, such as about 0.01 wt % to about 99.99 wt % of the slurry, about 30 wt % to about 95 wt % of the slurry, or about 30 wt % or less, or about 35, 40, 45, 50, 55, 60, 65, 70, 75, 80, 85, 90, 95, 96, 97, 98, 99, 99.9, 99.99 wt %, or about 99.999 wt % or more of the slurry.

The tackifier can be any suitable tackifier. In some embodiments, the tackifier can include the composition including the alkenoate ester and at least one of the dialkenyldihydrocarbylammonium halide and the N,N-dihydrocarbyl-substituted alkenamide or including the polymer derived or derivable therefrom. In some embodiments, the tackifier includes at least one of an epoxide-containing resin, a polyepoxide resin, a novolak resin, a polyester resin, a phenolaldehyde resin, a urea-aldehyde resin, a furan resin, a urethane resin, and a glycidyl ether resin. The tackifier can include at least one of bisphenol A diglycidyl ether resin, butoxymethyl butyl glycidyl ether resin, bisphenol A-epichlorohydrin resin, and bisphenol F resin. The tackifier can include at least one of a charged polymer, an acrylic acid polymer, an acrylic acid ester polymer, an acrylic acid homopolymer, an acrylic acid ester homopolymer, poly (methyl acrylate), poly(butyl acrylate), poly(2-ethylhexyl acrylate), an acrylic acid ester copolymer, a methacrylic acid derivative polymer, a methacrylic acid homopolymer, a methacrylic acid ester homopolymer, poly(methyl methacrylate), poly(butyl methacrylate), poly(2-ethylhexyl methacrylate), an acrylamidomethylpropane sulfonate polymer or copolymer or derivative thereof, an acrylic acid/acrylamidomethylpropane sulfonate copolymer, and a condensation reaction product including at least one of a polyacid, a polyamine, a trimer acid, a fatty acid, a fatty acid-derivative, maleic anhydride, acrylic acid, a polyester, a polycarbonate, a polycarbamate, a natural resin, shellac, an aldehyde, formaldehyde, a dialdehyde, glutaraldehyde, a hemiacetal, an aldehyde-releasing compound, a diacid halide, a dihalide, a dichloride, a dibromide, a polyacid anhydride, citric acid, an epoxide, furfuraldehyde, an aldehyde condensate, and a silyl-modified polyamide.

The water-control agent can be any suitable water-control agent. The water-control agent can react with or absorb water and swell when contacted, thereby causing the flow of water to be reduced or prevented. The water control agent can be a cationic water-soluble polymer, which can attach directly to negatively changed particle surfaces. In some examples, the water-control agent includes the composition including the alkenoate ester and at least one of the dialkenyldihydrocarbylammonium halide and the N,N-dihydrocarbyl-substituted alkenamide or including the polymer derived or derivable therefrom. In some examples, the water-control agent includes at least one of a polymer derived from a dialkyldiallylammonium salt, a quaternized ammonium salt of polyethyleneimine polymer, a quaternized ammonium salt of polydimethylaminoethyl-methacrylate copolymer and a quaternized ammonium salt of a poly N-(3-dimethylaminopropyl)acrylamide polymer. The water control agent can include a quaternized ammonium salt of polydimethylaminoethylmethacrylate copolymers, a quaternized ammonium salt of poly N-(3-dimethylaminopropyl) acrylamide polymers, a quaternized ammonium salt of the reaction product of 2-hydroxypropyl-N,N-dialkyl-amine and acrylamide, or a quaternized ammonium salt of acrylamide and epichlorohydrin reacted with polyalkoxide.

In some embodiments, the water control agent can include a vinyl silane copolymer. The vinyl silane can be any suitable vinyl silane, such as vinyltrimethoxysilane, vinyltriethoxysilane, methacrylatetrimethoxysilane, or methacrylatetriethoxysilane. The vinyl silane copolymer can include monomers derived from at least one selected from the group consisting of 2-hydroxyethyl acrylate, polyalkylacrylate, acrylamide, vinylmethyl ether, methacrylamide, and vinylpyrrolidone.

In some embodiments, the water control agent includes acrylic acid or a polymer derived from the same, and the coated proppant or gravel pack further includes a water protective degradable coating that protects the acrylic acid from prematurely swelling when exposed to water, allowing the acrylic acid or polymer derived therefrom to have water-control properties in the desired location downhole.

Downhole Mixture or Composition.

The composition including the alkenoate ester and at least one of the dialkenyldihydrocarbylammonium halide and the N,N-dihydrocarbyl-substituted alkenamide or including the polymer derived or derivable therefrom can be combined with any suitable downhole fluid before, during, or after the placement of the composition in the subterranean formation or the contacting of the composition and the subterranean material. In some examples, the composition including the alkenoate ester and at least one of the dialkenyldihydrocarbylammonium halide and the N,N-dihydrocarbyl-substituted alkenamide or including the polymer derived or derivable therefrom is combined with a downhole fluid above the surface, and then the combined composition is placed in a subterranean formation or contacted with a subterranean material. In another example, the composition including the alkenoate ester and at least one of the dialkenyldihydrocarbylammonium halide and the N,N-dihydrocarbyl-substituted alkenamide or including the polymer derived or derivable therefrom is injected into a subterranean formation to combine with a downhole fluid, and the combined composition is contacted with a subterranean material or is considered to be placed in the subterranean formation. In various examples, at least one of prior to, during, and after the placement of the composition in the subterranean formation or contacting of the subterranean material and the composition, the composition is used downhole, at least one of alone and in combination with other materials, as a drilling fluid, stimulation fluid, fracturing fluid, spotting fluid, clean-up fluid, production fluid, completion fluid, remedial treatment fluid, abandonment fluid, pill, acidizing fluid, cementing fluid, packer fluid, or a combination thereof.

In various embodiments, the method includes combining the composition including the alkenoate ester and at least one of the dialkenyldihydrocarbylammonium halide and the N,N-dihydrocarbyl-substituted alkenamide or including the polymer derived or derivable therefrom with any suitable downhole fluid, such as an aqueous or oil-based fluid including a drilling fluid, stimulation fluid, fracturing fluid, spotting fluid, clean-up fluid, production fluid, completion fluid, remedial treatment fluid, abandonment fluid, pill, acidizing fluid, cementing fluid, packer fluid, or a combination thereof, to form a mixture. The placement of the composition in the subterranean formation can include contacting the subterranean material and the mixture. The contacting of the subterranean material and the composition can include contacting the subterranean material and the mixture. A mixture that is placed in the subterranean formation or contacted with the subterranean material can include any suitable weight percent of the composition including the alkenoate ester and at least one of the dialkenyldihydrocarbylammonium halide and the N,N-dihydrocarbyl-substituted alkenamide or including the polymer derived or derivable therefrom, such as about 0.000,000.01 wt % to 99.999,99 wt %, 0.000,1-99.9 wt %, 0.1 wt % to 99.9 wt %, or about 20-90 wt %, or about 0.000,000.01 wt % or less, or about 0.000,001 wt %, 0.000,1, 0.001, 0.01, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99, 99.999, 99.999,9, or about 99.999.99 wt % or more of the composition.

In some embodiments, the composition can include any suitable amount of any suitable material used in a downhole fluid. For example, the composition can include water, saline, aqueous base, oil, organic solvent, synthetic fluid oil phase, aqueous solution, alcohol or polyol, cellulose, starch, alkalinity control agents, acidity control agents, density control agents, density modifiers, emulsifiers, dispersants, polymeric stabilizers, crosslinking agents, polyacrylamide, a polymer or combination of polymers, antioxidants, heat stabilizers, foam control agents, solvents, diluents, plasticizer, filler or inorganic particle, pigment, dye, precipitating agent, rheology modifier, oil-wetting agents, set retarding additives, surfactants, corrosion inhibitors, gases, weight reducing additives, heavy-weight additives, lost circulation materials, filtration control additives, salts, fibers, thixotropic additives, breakers, crosslinkers, rheology modifiers, curing accelerators, curing retarders, pH modifiers, chelating agents, scale inhibitors, enzymes, resins, water control materials, oxidizers, markers, Portland cement, pozzolana cement, gypsum cement, high alumina content cement, slag cement, silica cement, fly ash, metakaolin, shale, zeolite, a crystalline silica compound, amorphous silica, hydratable clays, microspheres, pozzolan lime, or a combination thereof. In various embodiments, the composition can include one or more additive components such as: thinner additives such as COLDTROL®, ATC®, OMC 2™, and OMC 42™; RHEMOD™, a viscosifier and suspension agent including a modified fatty acid; additives for providing temporary increased viscosity, such as for shipping (e.g., transport to the well site) and for use in sweeps (for example, additives having the tradename TEMPERUS™ (a modified fatty acid) and VIS-PLUS®, a thixotropic viscosifying polymer blend); TAU-MOD™, a viscosifying/suspension agent including an amorphous/fibrous material; additives for filtration control, for example, ADAPTA®, a high temperature high pressure (HTHP) filtration control agent including a crosslinked copolymer; DURATONE® HT, a filtration control agent that includes an organophilic lignite, more particularly organophilic leonardite; THERMO TONE™, a HTHP filtration control agent including a synthetic polymer; BDF™-366, a HTHP filtration control agent; BDF™-454, a HTHP filtration control agent; LIQUITONE™, a polymeric filtration agent and viscosifier; additives for HTHP emulsion stability, for example, FACTANT™, which includes highly concentrated tall oil derivative; emulsifiers such as LE SUPERMUL™ and EZ MUL® NT, polyaminated fatty acid emulsifiers, and FORTI-MUL®; DRIL TREAT®, an oil wetting agent for heavy fluids; BARACARB®, a bridging agent which includes a sized calcium carbonate (ground marble); BAROID®, a weighting agent that includes barium sulfate; BAROLIFT®, a hole sweeping agent; SWEEP-WATE®, a sweep weighting agent; BDF-508, a diamine dimer rheology modifier; GELTONE® II organophilic clay; BAROFIBRE™ O for lost circulation management and seepage loss prevention, including a natural cellulose fiber; STEELSEAL®, a lost circulation material including a polymer; HYDRO-PLUG®, a lost circulation material including a Portland cement formulation; lime, which can provide alkalinity and can activate certain emulsifiers; and calcium chloride, which can provide salinity.

A drilling fluid, also known as a drilling mud or simply "mud," is a specially designed fluid that is circulated through a wellbore as the wellbore is being drilled to facilitate the drilling operation. The drilling fluid can be water-based or oil-based. The drilling fluid can carry cuttings up from beneath and around the bit, transport them up the annulus, and allow their separation. Also, a drilling fluid can cool and lubricate the drill head as well as reduce friction between the drill string and the sides of the hole. The drilling fluid aids in support of the drill pipe and drill head, and provides a hydrostatic head to maintain the integrity of the wellbore walls and prevent well blowouts. Specific drilling fluid systems can be selected to optimize a drilling operation in accordance with the characteristics of a particular geological formation. The drilling fluid can be formulated to prevent unwanted influxes of formation fluids from permeable rocks and also to form a thin, low permeability filter cake that temporarily seals pores, other openings, and formations penetrated by the bit. In water-based drilling fluids, solid particles are suspended in a water or brine solution containing other components. Oils or other non-aqueous liquids can be emulsified in the water or brine or at least partially solubilized (for less hydrophobic non-aqueous liquids), but water is the continuous phase.

A water-based drilling fluid in embodiments of the present invention can be any suitable water-based drilling fluid. In various embodiments, the drilling fluid can include at least one of water (fresh or brine), a salt (e.g., calcium chloride, sodium chloride, potassium chloride, magnesium chloride, calcium bromide, sodium bromide, potassium bromide, calcium nitrate, sodium formate, potassium formate, cesium formate), aqueous base (e.g., sodium hydroxide or potassium hydroxide), alcohol or polyol, cellulose, starches, alkalinity control agents, density control agents such as a density modifier (e.g., barium sulfate), surfactants (e.g., betaines, alkali metal alkylene acetates, sultaines, ether carboxylates), emulsifiers, dispersants, polymeric stabilizers, crosslinking agents, polyacrylamides, polymers or combinations of polymers, antioxidants, heat stabilizers, foam control agents, solvents, diluents, plasticizers, filler or inorganic particles (e.g., silica), pigments, dyes, precipitating agents (e.g., silicates or aluminum complexes), and rheology modifiers such as thickeners or viscosifiers (e.g., xanthan gum). Any ingredient listed in this paragraph can be either present or not present in the mixture. The drilling fluid can be present in the mixture with the composition including the alkenoate ester and at least one of the dialkenyldihydrocarbylammonium halide and the N,N-dihydrocarbyl-substituted alkenamide or including the polymer derived or derivable therefrom in any suitable amount, such as about 1 wt % or less, about 2 wt %, 3, 4, 5, 10, 15, 20, 30, 40, 50, 60, 70, 80, 85, 90, 95, 96, 97, 98, 99, 99.9, 99.99, 99.999, or about 99.9999 wt % or more of the mixture.

An oil-based drilling fluid or mud in embodiments of the present invention can be any suitable oil-based drilling fluid. In various embodiments the drilling fluid can include at least one of an oil-based fluid (or synthetic fluid), saline, aqueous solution, emulsifiers, other agents of additives for suspension control, weight or density control, oil-wetting agents, fluid loss or filtration control agents, and rheology control agents. For example, see H. C. H. Darley and George R. Gray, Composition and Properties of Drilling and Completion Fluids 66-67, 561-562 (5th ed. 1988). An oil-based or invert emulsion-based drilling fluid can include between about 10:90 to about 95:5, or about 50:50 to about 95:5, by volume of oil phase to water phase. A substantially all oil mud includes about 100% liquid phase oil by volume (e.g., substantially no internal aqueous phase).

A pill is a relatively small quantity (e.g., less than about 500 bbl, or less than about 200 bbl) of drilling fluid used to accomplish a specific task that the regular drilling fluid cannot perform. For example, a pill can be a high-viscosity pill to, for example, help lift cuttings out of a vertical wellbore. In another example, a pill can be a freshwater pill to, for example, dissolve a salt formation. Another example is a pipe-freeing pill to, for example, destroy filter cake and relieve differential sticking forces. In another example, a pill is a lost circulation material pill to, for example, plug a thief zone. A pill can include any component described herein as a component of a drilling fluid.

A cement fluid can include an aqueous mixture of at least one of cement and cement kiln dust. The composition including the alkenoate ester and at least one of the dialkenyldihydrocarbylammonium halide and the N,N-dihydrocarbyl-substituted alkenamide or including the polymer derived or derivable therefrom can form a useful combination with cement or cement kiln dust. The cement kiln dust can be any suitable cement kiln dust. Cement kiln dust can be formed during the manufacture of cement and can be partially calcined kiln feed that is removed from the gas stream and collected in a dust collector during a manufacturing process. Cement kiln dust can be advantageously utilized in a cost-effective manner since kiln dust is often regarded as a low value waste product of the cement industry. Some embodiments of the cement fluid can include cement kiln dust but no cement, cement kiln dust and cement, or cement but no cement kiln dust. The cement can be any suitable cement. The cement can be a hydraulic cement. A variety of cements can be utilized in accordance with embodiments of the present invention; for example, those including calcium, aluminum, silicon, oxygen, iron, or sulfur, which can set and harden by reaction with water. Suitable cements can include Portland cements, pozzolana cements, gypsum cements, high alumina content cements, slag cements, silica cements, and combinations thereof. In some embodiments, the Portland cements that are suitable for use in embodiments of the present invention are classified as Classes A, C, H, and G cements according to the American Petroleum Institute, *API Specification for Materials and Testing for Well Cements*, API Specification 10, Fifth Ed., Jul. 1, 1990. A cement can be generally included in the cementing fluid in an amount sufficient to provide the desired compressive strength, density, or cost. In some embodiments, the hydraulic cement can be present in the cementing fluid in an amount in the range of from 0 wt % to about 100 wt %, 0-95 wt %, 20-95 wt %, or about 50-90 wt %. A cement kiln dust can be present in an amount of at least about 0.01 wt %, or about 5 wt %-80 wt %, or about 10 wt % to about 50 wt %.

Optionally, other additives can be added to a cement or kiln dust-containing composition of embodiments of the present invention as deemed appropriate by one skilled in the art, with the benefit of this disclosure. Any optional ingredient listed in this paragraph can be either present or not present in the composition. For example, the composition can include fly ash, metakaolin, shale, zeolite, set retarding additive, surfactant, a gas, accelerators, weight reducing additives, heavy-weight additives, lost circulation materials, filtration control additives, dispersants, and combinations thereof. In some examples, additives can include crystalline silica compounds, amorphous silica, salts, fibers, hydratable clays, microspheres, pozzolan lime, thixotropic additives, combinations thereof, and the like.

Drilling Assembly.

The exemplary composition including the alkenoate ester and at least one of the dialkenyldihydrocarbylammonium halide and the N,N-dihydrocarbyl-substituted alkenamide or including the polymer derived or derivable therefrom disclosed herein may directly or indirectly affect one or more components or pieces of equipment associated with the preparation, delivery, recapture, recycling, reuse, and/or disposal of the disclosed composition including the alkenoate ester and at least one of the dialkenyldihydrocarbylammonium halide and the N,N-dihydrocarbyl-substituted alkenamide or including the polymer derived or derivable therefrom. For example, and with reference to FIG. 1, the disclosed composition including the alkenoate ester and at least one of the dialkenyldihydrocarbylammonium halide and the N,N-dihydrocarbyl-substituted alkenamide or including the polymer derived or derivable therefrom may directly or indirectly affect one or more components or pieces of equipment associated with an exemplary wellbore drilling assembly 100, according to one or more embodiments. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a wellbore 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the wellbore 116. At the surface, the recirculated or spent drilling fluid 122 exits the annulus 126 and may be conveyed to one or more fluid processing unit(s) 128 via an interconnecting flow line 130. After passing through the fluid processing unit(s) 128, a "cleaned" drilling fluid 122 is deposited into a nearby retention pit 132 (e.g., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the scope of the disclosure.

The composition including the alkenoate ester and at least one of the dialkenyldihydrocarbylammonium halide and the N,N-dihydrocarbyl-substituted alkenamide or including the polymer derived or derivable therefrom may be added to the drilling fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, the composition including the alkenoate ester and at least one of the dialkenyldihydrocarbylammonium halide and the N,N-dihydrocarbyl-substituted alkenamide or including the polymer derived or derivable therefrom may be added to the drilling fluid 122 at any other location in the drilling assembly 100. In at least one embodiment, for example, there could be more than one retention pit 132, such as multiple retention pits 132 in series. Moreover, the retention pit 132 may be representative of one or more fluid storage facilities and/or units where the composition including the alkenoate ester and at least one of the dialkenyldihydrocarbylammonium halide and the N,N-dihydrocarbyl-substituted alkenamide or including the polymer derived or derivable therefrom may be stored, reconditioned, and/or regulated until added to the drilling fluid 122.

As mentioned above, the composition including the alkenoate ester and at least one of the dialkenyldihydrocarbylammonium halide and the N,N-dihydrocarbyl-substituted alkenamide or including the polymer derived or derivable therefrom may directly or indirectly affect the components and equipment of the drilling assembly 100. For example, the composition including the alkenoate ester and at least one of the dialkenyldihydrocarbylammonium halide and the N,N-dihydrocarbyl-substituted alkenamide or including the polymer derived or derivable therefrom may directly or indirectly affect the fluid processing unit(s) 128, which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, or any fluid reclamation equipment. The fluid processing unit(s) 128 may further include one or more sensors, gauges, pumps, compressors, and the like used to store, monitor, regulate, and/or recondition the composition including the alkenoate ester and at least one of the dialkenyldihydrocarbylammonium halide and the N,N-dihydrocarbyl-substituted alkenamide or including the polymer derived or derivable therefrom.

The composition including the alkenoate ester and at least one of the dialkenyldihydrocarbylammonium halide and the N,N-dihydrocarbyl-substituted alkenamide or including the polymer derived or derivable therefrom may directly or indirectly affect the pump 120, which representatively includes any conduits, pipelines, trucks, tubulars, and/or pipes used to fluidically convey the composition including the alkenoate ester and at least one of the dialkenyldihydrocarbylammonium halide and the N,N-dihydrocarbyl-substituted alkenamide or including the polymer derived or derivable therefrom downhole, any pumps, compressors, or motors (e.g., topside or downhole) used to drive the composition into motion, any valves or related joints used to regulate the pressure or flow rate of the composition, and any sensors (e.g., pressure, temperature, flow rate, and the like), gauges, and/or combinations thereof, and the like. The composition may also directly or indirectly affect the mixing hopper 134 and the retention pit 132 and their assorted variations.

The composition including the alkenoate ester and at least one of the dialkenyldihydrocarbylammonium halide and the N,N-dihydrocarbyl-substituted alkenamide or including the polymer derived or derivable therefrom may also directly or indirectly affect the various downhole equipment and tools that may come into contact with the composition such as, but not limited to, the drill string 108, any floats, drill collars, mud motors, downhole motors, and/or pumps associated with the drill string 108, and any measurement while drilling (MWD)/logging while drilling (LWD) tools and related telemetry equipment, sensors, or distributed sensors associated with the drill string 108. The composition may also directly or indirectly affect any downhole heat exchangers, valves and corresponding actuation devices, tool seals, packers and other wellbore isolation devices or components, and the like associated with the wellbore 116. The composition may also directly or indirectly affect the drill bit 114, which may include, but is not limited to, roller cone bits, polycrystalline diamond compact (PDC) bits, natural diamond bits, any hole openers, reamers, coring bits, and the like.

While not specifically illustrated herein, the composition including the alkenoate ester and at least one of the dialkenyldihydrocarbylammonium halide and the N,N-dihydrocarbyl-substituted alkenamide or including the polymer derived or derivable therefrom may also directly or indirectly affect any transport or delivery equipment used to convey the composition to the drilling assembly 100 such as, for example, any transport vessels, conduits, pipelines, trucks, tubulars, and/or pipes used to fluidically move the composition from one location to another, any pumps, compressors, or motors used to drive the composition into motion, any valves or related joints used to regulate the pressure or flow rate of the composition, and any sensors (e.g., pressure and temperature), gauges, and/or combinations thereof, and the like.

System or Apparatus.

In various embodiments, the present invention provides a system. The system can be any suitable system that can include the use of the composition including the alkenoate ester and at least one of the dialkenyldihydrocarbylammonium halide and the N,N-dihydrocarbyl-substituted alkenamide or including the polymer derived or derivable therefrom described herein in a subterranean formation, or that can include performance of a method for using the composition described herein. The system can include the composition including the alkenoate ester and at least one of the dialkenyldihydrocarbylammonium halide and the N,N-dihydrocarbyl-substituted alkenamide or including the polymer derived or derivable therefrom, or the coated proppant or gravel pack, for example having a tackifier and water control agent coated thereon, as described herein. The system can also include a subterranean formation including the composition therein.

In various embodiments, the present invention provides an apparatus. The apparatus can be any suitable apparatus that can include the use of the composition or coated proppant or gravel pack described herein in a subterranean formation, or that can include performance of a method for using the composition or coated proppant or gravel pack described herein.

In various embodiments, the system or apparatus can include a drillstring disposed in a wellbore. The drillstring can include a drill bit at the downhole end of the drillstring. The system or apparatus can include an annulus between the drillstring and the wellbore. The system or apparatus can also include a pump configured to circulate the drilling fluid composition through the drill string, through the drill bit, and back above-surface through an annulus. The system or apparatus can further include a fluid processing unit configured to process the drilling fluid composition exiting the annulus to generate a cleaned drilling fluid for recirculation through the wellbore.

In some embodiments, the system can include a tubular disposed in a wellbore, and a pump configured to pump the composition downhole. In some examples, the pump can be configured to pump the composition downhole and fracture the subterranean formation.

Various embodiments provide systems and apparatus configured for delivering the composition described herein to a downhole location and for using the composition therein, such as for combined water control and particulate consolidation, such as during a drilling operation, hydraulic fracturing operation, or other suitable downhole operation. In various embodiments, the systems can include a pump fluidly coupled to a tubular (e.g., any suitable type of oilfield pipe, such as pipeline, drill pipe, production tubing, and the like), the tubular containing a composition including the alkenoate ester and at least one of the dialkenyldihydrocarbylammonium halide and the N,N-dihydrocarbyl-substituted alkenamide or including the polymer derived or derivable therefrom described herein, or containing the coated proppant or gravel pack, as described herein.

The pump can be a high pressure pump in some embodiments. As used herein, the term "high pressure pump" will refer to a pump that is capable of delivering a fluid downhole at a pressure of about 1000 psi or greater. A high pressure pump can be used when it is desired to introduce the composition to a subterranean formation at or above a fracture gradient of the subterranean formation, but it can also be used in cases where fracturing is not desired. In some embodiments, the high pressure pump can be capable of fluidly conveying particulate matter, such as proppant particulates, into the subterranean formation. Suitable high pressure pumps will be known to one having ordinary skill in the art and can include, but are not limited to, floating piston pumps and positive displacement pumps.

In other embodiments, the pump can be a low pressure pump. As used herein, the term "low pressure pump" will refer to a pump that operates at a pressure of about 1000 psi or less. In some embodiments, a low pressure pump can be fluidly coupled to a high pressure pump that is fluidly coupled to the tubular. That is, in such embodiments, the low pressure pump can be configured to convey the composition to the high pressure pump. In such embodiments, the low pressure pump can "step up" the pressure of the composition before it reaches the high pressure pump.

In some embodiments, the systems or apparatuses described herein can further include a mixing tank that is upstream of the pump and in which the composition is formulated. In various embodiments, the pump (e.g., a low pressure pump, a high pressure pump, or a combination thereof) can convey the composition from the mixing tank or other source of the composition to the tubular. In other embodiments, however, the composition can be formulated offsite and transported to a worksite, in which case the composition can be introduced to the tubular via the pump directly from its shipping container (e.g., a truck, a railcar, a barge, or the like) or from a transport pipeline. In either case, the composition can be drawn into the pump, elevated to an appropriate pressure, and then introduced into the tubular for delivery downhole.

Figure 2:
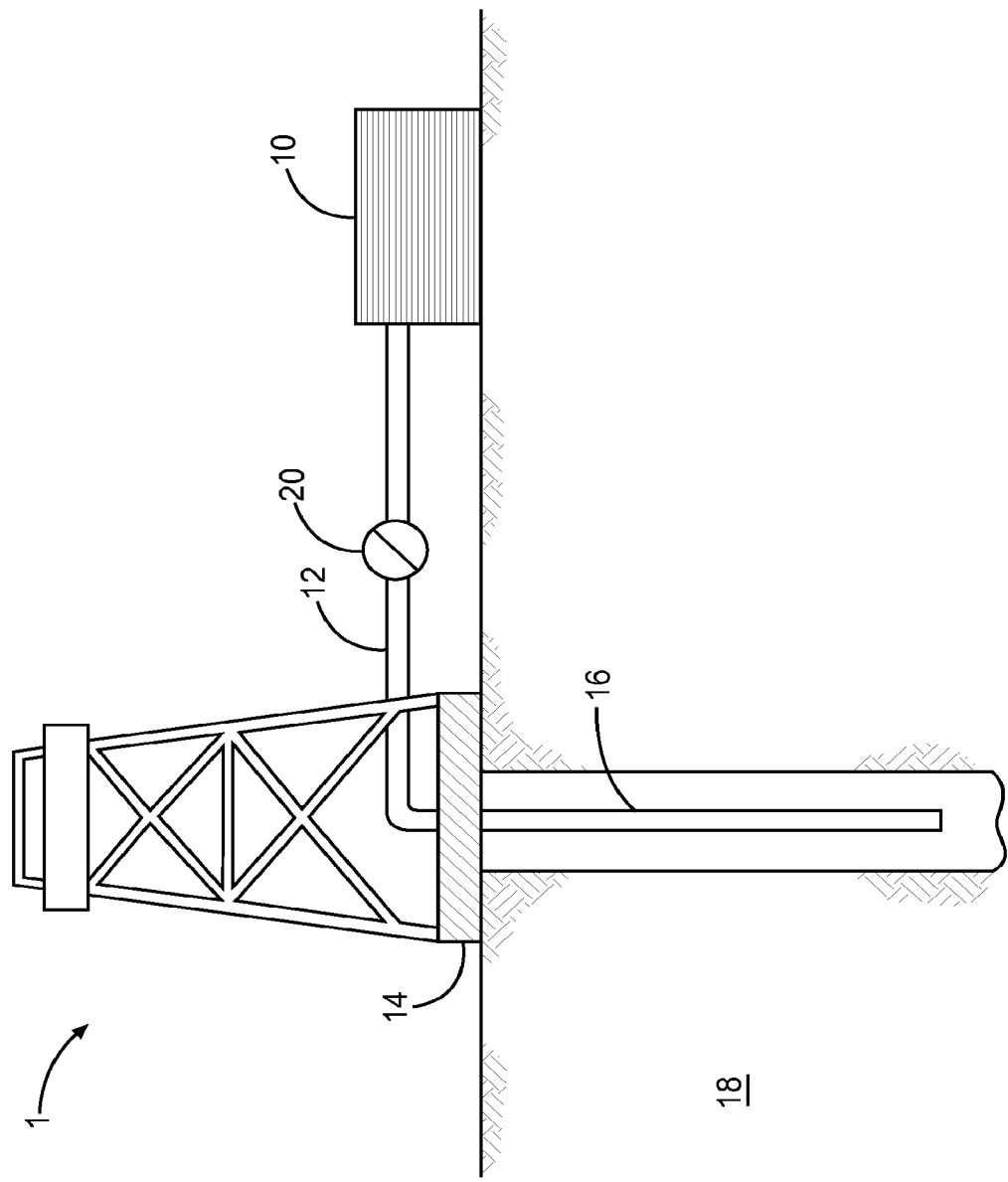
FIG. 2 illustrates a system or apparatus for delivering a composition downhole, in accordance with various embodiments.

FIG. 2 shows an illustrative schematic of systems and apparatuses that can deliver embodiments of the compositions of the present invention to a downhole location, according to one or more embodiments. It should be noted that while FIG. 2 generally depicts a land-based system or apparatus, it is to be recognized that like systems and apparatuses can be operated in subsea locations as well. Embodiments of the present invention can have a different scale than that depicted in FIG. 2. As depicted in FIG. 2, system or apparatus 1 can include mixing tank 10, in which an embodiment of the composition can be formulated. The composition can be conveyed via line 12 to wellhead 14, where the composition enters tubular 16, with tubular 16 extending from wellhead 14 into subterranean formation 18. Upon being ejected from tubular 16, the composition can subsequently penetrate into subterranean formation 18. Pump 20 can be configured to raise the pressure of the composition to a desired degree before its introduction into tubular 16. It is to be recognized that system or apparatus 1 is merely exemplary in nature and various additional components can be present that have not necessarily been depicted in FIG. 2 in the interest of clarity. Non-limiting additional components that can be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 2, at least part of the composition can, in some embodiments, flow back to wellhead 14 and exit subterranean formation 18. The composition that flows back can be substantially diminished in the concentration of the composition including the alkenoate ester and at least one of the dialkenyldihydrocarbylammonium halide and the N,N-dihydrocarbyl-substituted alkenamide or including the polymer derived or derivable therefrom, or the coated proppant or gravel pack, therein. In some embodiments, the composition that has flowed back to wellhead 14 can subsequently be recovered, and in some examples reformulated, and recirculated to subterranean formation 18.

It is also to be recognized that the disclosed composition can also directly or indirectly affect the various downhole equipment and tools that can come into contact with the composition during operation. Such equipment and tools can include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, and the like), logging tools and related telemetry equipment, actuators (e.g., electromechanical devices, hydromechanical devices, and the like), sliding sleeves, production sleeves, plugs, screens, filters, flow control devices (e.g., inflow control devices, autonomous inflow control devices, outflow control devices, and the like), couplings (e.g., electro-hydraulic wet connect, dry connect, inductive coupler, and the like), control lines (e.g., electrical, fiber optic, hydraulic, and the like), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components can be included in the systems and apparatuses generally described above and depicted in FIG. 2.

Composition for Treatment of a Subterranean Formation.

Various embodiments provide a composition for treatment of a subterranean formation. The composition can be any suitable composition that can be used to perform an embodiment of the method for treatment of a subterranean formation described herein.

For example, the composition can be any suitable composition that includes the alkenoate ester and at least one of the dialkenyldihydrocarbylammonium halide and the N,N-dihydrocarbyl-substituted alkenamide or including the polymer derived or derivable therefrom, or that includes the coated proppant or gravel pack, for example having tackifier and water control agent coated thereon, as described herein.

In some embodiments, the composition further includes a downhole fluid. The downhole fluid can be any suitable downhole fluid. In some embodiments, the downhole fluid is a drilling fluid, a composition for fracturing of a subterranean formation or subterranean material, or a fracturing fluid. The composition can include a proppant or gravel pack.

Method for Preparing a Composition for Treatment of a Subterranean Formation.

In various embodiments, the present invention provides a method for preparing a composition for treatment of a subterranean formation. The method can be any suitable method that produces a composition described herein. For example, the method can include forming any suitable composition that includes the alkenoate ester and at least one of the dialkenyldihydrocarbylammonium halide and the N,N-dihydrocarbyl-substituted alkenamide or including the polymer derived or derivable therefrom, or that includes the coated proppant or gravel pack (for example, having tackifier and water control agent coated thereon, as described herein).

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modification and variation of the concepts herein disclosed may be resorted to by those of ordinary skill in the art, and that such modifications and variations are considered to be within the scope of embodiments of the present invention.

ADDITIONAL EMBODIMENTS

The following exemplary embodiments are provided, the numbering of which is not to be construed as designating levels of importance:

Embodiment 1 provides a method of treating a subterranean formation, the method comprising: obtaining or providing a composition comprising an alkenoate ester; and at least one of a dialkenyldihydrocarbylammonium halide, and an N,N-dihydrocarbyl-substituted alkenamide; and placing the composition in a subterranean formation downhole.

Embodiment 2 provides the method of Embodiment 1, wherein the obtaining or providing of the composition occurs above-surface.

Embodiment 3 provides the method of any one of Embodiments 1-2, wherein the obtaining or providing of the composition occurs downhole.

Embodiment 4 provides the method of any one of Embodiments 1-3, further comprising polymerizing the composition.

Embodiment 5 provides the method of Embodiment 4, wherein the polymerizing occurs above-surface.

Embodiment 6 provides the method of any one of Embodiments 4-5, wherein the polymerizing occurs downhole.

Embodiment 7 provides the method of any one of Embodiments 4-6, wherein the polymerizing occurs before the placement of the composition in the subterranean formation.

Embodiment 8 provides the method of any one of Embodiments 4-7, wherein the polymerizing occurs at least one of during and after the placement of the composition in the subterranean formation.

Embodiment 9 provides the method of any one of Embodiments 1-8, wherein the subterranean material comprises a subterranean area surrounding a wellbore.

Embodiment 10 provides the method of Embodiment 9, wherein placing the composition in the subterranean formation is sufficient to saturate at least part of an area surrounding the wellbore to at least a depth of about 1 foot to about 3 feet.

Embodiment 11 provides the method of any one of Embodiments 1-10, wherein placing the composition in the subterranean formation comprises contacting the composition with at least one of a fracture, flow path, perforation, and at least a part of an area surrounding at least one of a fracture, flow path, or perforation.

Embodiment 12 provides the method of Embodiment 11, wherein the composition is placed in the subterranean formation such that at least part of the area surrounding the fracture, flow path, or perforation is saturated to a depth of at least about 0.25 to about 2 inches.

Embodiment 13 provides the method of any one of Embodiments 1-12, wherein the method comprises a method of hydraulic fracturing.

Embodiment 14 provides the method of any one of Embodiments 1-13, wherein the method comprises a method of drilling.

Embodiment 15 provides the method of any one of Embodiments 1-14, wherein the placement of the composition in the subterranean formation comprises fracturing at least part of the subterranean formation to form at least one subterranean fracture.

Embodiment 16 provides the method of any one of Embodiments 1-15, wherein placing the composition in the subterranean formation comprises contacting the composition with downhole particulates.

Embodiment 17 provides the method of Embodiment 16, wherein the downhole particulates comprise at least one of fines, sand, gravel, and proppant.

Embodiment 18 provides the method of any one of Embodiments 1-17, further comprising, prior to placing the composition in the subterranean formation, mixing the composition with a particulate substrate to form a particulate mixture, wherein placing the composition in the subterranean formation comprises contacting the subterranean material with the particulate mixture.

Embodiment 19 provides the method of Embodiment 18, wherein the particulate substrate comprises gravel or a proppant.

Embodiment 20 provides the method of any one of Embodiments 18-19, wherein the particulate substrate comprises at least one of sand, bauxite, ceramic materials, glass materials, polymer materials, tetrafluoroethylene materials, nut shell materials, seed shell materials, fruit pit materials, wood, processed wood, hollow glass microspheres, and solid glass, and composite particulates prepared from a binder and at least one of silica, alumina, fumed silica, carbon black, graphite, mica, titanium dioxide, meta-silicate, calcium silicate, kaolin, talc, zirconia, boron, and fly ash.

Embodiment 21 provides the method of any one of Embodiments 18-20, wherein the particulate substrate is about 30 wt % to about 99.999 wt % of the particulate mixture.

Embodiment 22 provides the method of any one of Embodiments 18-21, wherein the mixing of the composition with a particulate substrate comprises mixing of the composition with a particulate substrate in a carrier fluid, wherein the particulate mixture comprises a coated particulate.

Embodiment 23 provides the method of any one of Embodiments 18-22, wherein the mixing of the composition with a particulate substrate comprises mixing of the composition with a particulate substrate to provide a coated particulate, further comprising mixing the coated particulate substrate with a carrier fluid.

Embodiment 24 provides the method of any one of Embodiments 1-23, wherein placing the composition in the subterranean formation comprises contacting the composition with a fracture.

Embodiment 25 provides the method of any one of Embodiments 1-24, wherein the placing of the composition in the subterranean formation is sufficient to at least partially control particulate migration and at least partially mitigate the production of water from the formation.

Embodiment 26 provides the method of any one of Embodiments 1-25, wherein the composition further comprises a radical initiator.

Embodiment 27 provides the method of Embodiment 26, wherein about 0.001 wt % to about 20 wt % of the composition is the radical initiator.

Embodiment 28 provides the method of any one of Embodiments 26-27, wherein about 0.001 wt % to about 3 wt % of the composition is the radical initiator.

Embodiment 29 provides the method of any one of Embodiments 1-28, wherein the radical initiator comprises at least one of tert-amyl peroxybenzoate, 4,4-azobis(4-cyanovaleric acid), 1,1'-azobis(cyclohexanecarbonitrile), 2,2'-azobisisobutyronitrile (AIBN), benzoyl peroxide, 2,2-bis-(tert-butylperoxy)butane, 1,1-bis(tert-butylperoxy) cyclohexane, 2,5-bis(tert-butylperoxy)-2,6-dimethylhexane, 2,5-bis(tert-butylperoxy)-2,5-dimethyl-3-hexyne, bis(1-(tert-butylperoxy)-1-methylethyl)benzene, 1,1-bis(tert-butylperoxy)-3,3,5-trimethylcyclohexane, tert-butyl hydroperoxide, tert-butyl peracetate, tert-butyl peroxybenzoate, tert-butylperoxy isopropyl carbonate, cumene hydroperoxide, cyclohexanone peroxide, dicumyl peroxide, lauroyl peroxide, 2,4-pentanedione peroxide, peracetic acid, or potassium persulfate.

Embodiment 30 provides the method of any one of Embodiments 1-29, wherein the composition further comprises a coupling agent comprising at least one of a diol, polyol, diamine, polyamine, and a silane coupling agent.

Embodiment 31 provides the method of Embodiment 30, wherein the coupling agent is about 0.001 wt % to about 20 wt % of the composition Embodiment 32 provides the method of any one of Embodiments 30-31, wherein the coupling agent is about 0.1 wt % to about 3 wt % of the composition.

Embodiment 33 provides the method of any one of Embodiments 30-32, wherein the silane coupling agent is a hydrocarbyl-substituted trimethoxysilane, wherein the hydrocarbyl group is substituted or unsubstituted.

Embodiment 34 provides the method of any one of Embodiments 30-33, wherein the silane coupling agent is at least one of N-2-(aminoethyl)-3-aminopropyltrimethyloxysilane, 3-glycidoxypropyltrimethyoxysilane, and n-beta-(aminoethyl)-gamma-aminopropyltrimethoxy silane.

Embodiment 35 provides the method of any one of Embodiments 30-34, wherein the coupling agent is a ($C_1$-$C_{30}$)hydrocarbyl diol or polyol, wherein the alcohol moieties are on the hydrocarbyl at terminal locations, intermediate locations, or combinations thereof.

Embodiment 36 provides the method of any one of Embodiments 30-35, wherein the coupling agent is HO—(R—O)$_n$—R—OH, wherein R is a substituted or unsubstituted ($C_2$-$C_{10}$)hydrocarbylene and n is about 0 to about 10,000.

Embodiment 37 provides the method of any one of Embodiments 30-36, wherein the coupling agent is a ($C_1$-$C_{30}$)hydrocarbyl diamine or polyamine, wherein the amine moieties are on the hydrocarbyl at terminal locations, intermediate locations, or combinations thereof.

Embodiment 38 provides the method of any one of Embodiments 1-37, wherein the composition further comprises at least one of an epoxide-containing resin, a polyepoxide resin, a novolak resin, a polyester resin, phenolaldehyde resin, a urea-aldehyde resin, a furan resin, a urethane resin, and a glycidyl ether resin.

Embodiment 39 provides the method of any one of Embodiments 1-38, wherein the composition further comprises at least one of bisphenol A diglycidyl ether resin, butoxymethyl butyl glycidyl ether resin, bisphenol A-epichlorohydrin resin, and bisphenol F resin.

Embodiment 40 provides the method of any one of Embodiments 1-39, wherein the composition further comprises at least one organic compound comprising at least one of an amine and an amide, wherein the amine is an aromatic amine, an aliphatic amine, a cyclo-aliphatic amine, a polyamine, or a combination thereof, wherein the amide is a mono- or polyamide.

Embodiment 41 provides the method of any one of Embodiments 1-40, wherein the composition further comprises at least one of piperidine, triethylamine, benzyldimethylamine, N,N-dimethylaminopyridine, 2-(N,N-dimethylaminomethyl)phenol, tris(dimethylaminomethyl)phenol, 4,4'-diaminodiphenyl sulfone, 2-ethyl-4-methyl imidazole, and 1,1,3-trichlorotrifluoroacetone.

Embodiment 42 provides the method of any one of Embodiments 1-41, wherein the composition further comprises at least one of acrylic acid and acrylamide.

Embodiment 43 provides the method of any one of Embodiments 1-42, wherein the composition further comprises a mono- or di-N-substituted hydroxy($C_1$-$C_{30}$)hydrocarbyl or amino($C_1$-$C_{30}$)hydrocarbyl acrylamide, the hydroxy and amino moieties being at an intermediate or terminal position on the hydrocarbyl group.

Embodiment 44 provides the method of any one of Embodiments 1-43, wherein the composition further comprises an acrylamide that is mono- or di-N-substituted by —(R—O)$_n$—R—OH, wherein R is a substituted or unsubstituted (C$_2$-C$_{10}$)hydrocarbylene and n is about 0 to about 10,000.

Embodiment 45 provides the method of any one of Embodiments 1-44, wherein the composition further comprises a carrier fluid.

Embodiment 46 provides the method of Embodiment 45, wherein the carrier fluid comprises at least one of an aqueous liquid and an organic liquid.

Embodiment 47 provides the method of any one of Embodiments 45-46, wherein the carrier fluid comprises at least one of dipropylene glycol methyl ether, dipropylene glycol dimethyl ether, dimethyl formamide, diethylene glycol methyl ether, ethylene glycol butyl ether, diethylene glycol butyl ether, propylene carbonate, D-limonene, a C$_2$-C$_{40}$ fatty acid C$_1$-C$_{10}$ alkyl ester, 2-butoxy ethanol, butyl acetate, furfuryl acetate, dimethyl sulfoxide, and dimethyl formamide.

Embodiment 48 provides the method of any one of Embodiments 45-47, wherein the carrier fluid comprises about 0.01 wt % to about 99.99 wt % of the composition.

Embodiment 49 provides the method of any one of Embodiments 45-48, wherein the carrier fluid comprises about 10 wt % to about 95 wt % of the composition.

Embodiment 50 provides the method of any one of Embodiments 1-49, wherein the composition further comprises a surfactant.

Embodiment 51 provides the method of Embodiment 50, wherein the surfactant is at least one of a cationic surfactant, an anionic surfactant, and non-ionic surfactant.

Embodiment 52 provides the method of any one of Embodiments 50-51, wherein the surfactant is at least one of ethoxylated nonyl phenol phosphate ester and a C$_{12}$-C$_{22}$ alkyl phosphonate.

Embodiment 53 provides the method of any one of Embodiments 50-52, wherein the surfactant is about 0.01 wt % to about 10 wt % of the composition.

Embodiment 54 provides the method of any one of Embodiments 50-53, wherein the surfactant is about 0.1 wt % to about 5 wt % of the composition.

Embodiment 55 provides the method of any one of Embodiments 1-54, wherein the composition further comprises a crosslinked gel or a crosslinkable gel.

Embodiment 56 provides the method of Embodiment 55, wherein the crosslinked gel or crosslinkable gel comprises at least one of a linear polysaccharide, and poly((C$_2$-C$_{10}$)alkenylene), wherein the (C$_2$-C$_{10}$)alkenylene is substituted or unsubstituted.

Embodiment 57 provides the method of any one of Embodiments 55-56, wherein the crosslinked gel or crosslinkable gel comprises at least one of poly(acrylic acid) or (C$_1$-C$_5$)alkyl esters thereof, poly(methacrylic acid) or (C$_1$-C$_5$)alkyl esters thereof, poly(vinyl acetate), poly(vinyl alcohol), poly(ethylene glycol), poly(vinyl pyrrolidone), polyacrylamide, poly (hydroxyethyl methacrylate), acetan, alginate, chitosan, curdlan, a cyclosophoran, dextran, emulsan, a galactoglucopolysaccharide, gellan, glucuronan, N-acetyl-glucosamine, N-acetyl-heparosan, hyaluronic acid, indicant, kefiran, lentinan, levan, mauran, pullulan, scleroglucan, schizophyllan, stewartan, succinoglycan, xanthan, welan, starch, tamarind, tragacanth, guar gum, derivatized guar, gum ghatti, gum arabic, locust bean gum, cellulose, derivatized cellulose, carboxymethyl cellulose, hydroxyethyl cellulose, carboxymethyl hydroxyethyl cellulose, hydroxypropyl cellulose, methyl hydroxyl ethyl cellulose, guar, hydroxypropyl guar, carboxy methyl guar, and carboxymethyl hydroxylpropyl guar.

Embodiment 58 provides the method of any one of Embodiments 1-57, wherein the composition comprises a crosslinker comprising at least one of chromium, aluminum, antimony, zirconium, titanium, calcium, boron, iron, silicon, copper, zinc, magnesium, and an ion thereof.

Embodiment 59 provides the method of Embodiment 58, wherein the composition comprises at least one of boric acid, borax, a borate, a (C$_1$-C$_{30}$)hydrocarbylboronic acid, a (C$_1$-C$_{30}$)hydrocarbyl ester of a (C$_1$-C$_{30}$)hydrocarbylboronic acid, a (C$_1$-C$_{30}$)hydrocarbylboronic acid-modified polyacrylamide, ferric chloride, disodium octaborate tetrahydrate, sodium metaborate, sodium diborate, sodium tetraborate, disodium tetraborate, a pentaborate, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, and zirconium lactate glycolate, titanium lactate, titanium malate, titanium citrate, titanium ammonium lactate, titanium triethanolamine, titanium acetylacetonate, aluminum lactate, or aluminum citrate.

Embodiment 60 provides the method of any one of Embodiments 1-59, wherein the composition further comprises a hydrolyzable ester.

Embodiment 61 provides the method of Embodiment 60, wherein the hydrolyzable ester is a C$_1$-C$_5$ mono-, di-, tri-, or tetra-alkyl ester of a C$_2$-C$_{40}$ mono-, di-, tri-, or tetra-carboxylic acid.

Embodiment 62 provides the method of any one of Embodiments 60-61, wherein the hydrolyzable ester is at least one of dimethylglutarate, dimethyladipate, dimethylsuccinate, sorbitol, catechol, dimethylthiolate, methyl salicylate, dimethylsalicylate, and tert-butylhydroperoxide.

Embodiment 63 provides the method of any one of Embodiments 60-62, wherein the hydrolyzable ester is about 0.01 wt % to about 20 wt % of the composition.

Embodiment 64 provides the method of any one of Embodiments 60-63, wherein the hydrolyzable ester is about 0.1 wt % to about 5 wt % of the composition.

Embodiment 65 provides the method of any one of Embodiments 1-64, further comprising applying a preflush solution to the subterranean formation.

Embodiment 66 provides the method of Embodiment 65, wherein the preflush solution comprises an aqueous liquid.

Embodiment 67 provides the method of Embodiment 66, wherein the aqueous liquid in the preflush solution comprises at least one of salt water and brine.

Embodiment 68 provides the method of any one of Embodiments 65-67, wherein the preflush solution comprises a surfactant.

Embodiment 69 provides the method of Embodiment 68, wherein the surfactant in the preflush solution comprises at least one of an ethoxylated nonyl phenol phosphate ester, a cationic surfactant, a non-ionic surfactant, an alkyl phosphonate surfactant, or mixtures thereof.

Embodiment 70 provides the method of any one of Embodiments 1-69, wherein the composition further comprises applying an afterflush fluid to the subterranean formation.

Embodiment 71 provides the method of Embodiment 70, wherein the afterflush fluid comprises at least one of salt water, brine, and nitrogen gas.

Embodiment 72 provides the method of any one of Embodiments 1-71, wherein about 0.001 wt % to about 99.999 wt % of the composition is the alkenoate ester.

Embodiment 73 provides the method of any one of Embodiments 1-72, wherein about 1 wt % to about 60 wt % of the composition is the alkenoate ester.

Embodiment 74 provides the method of any one of Embodiments 1-73, wherein the alkenoate ester is a $(C_1$-$C_{30})$alkyl $(C_1$-$C_{10})$alkenoate ester or a poly($(C_2$-$C_{30})$alkenyene oxide) $(C_1$-$C_{10})$alkenoate ester, wherein the $(C_1$-$C_{30})$alkyl, $(C_1$-$C_{30})$alkenyene, and $(C_1$-$C_{10})$alkenoate are independently substituted or unsubstituted.

Embodiment 75 provides the method of any one of Embodiments 1-74, wherein the alkenoate ester is a $(C_1$-$C_{10})$alkyl $(C_1$-$C_{10})$alkenoate ester or a poly($(C_2$-$C_5)$alkenyene oxide) $(C_1$-$C_{10})$alkenoate ester, wherein the $(C_1$-$C_{30})$alkyl, $(C_1$-$C_{30})$alkenyene, and $(C_1$-$C_{10})$alkenoate are independently substituted or unsubstituted.

Embodiment 76 provides the method of any one of Embodiments 1-75, wherein the alkenoate ester is an acrylate ester.

Embodiment 77 provides the method of any one of Embodiments 1-76, wherein the alkenoate ester is a $(C_1$-$C_{15})$alkyl alkenoate.

Embodiment 78 provides the method of any one of Embodiments 1-77, wherein the alkenoate ester is a hydroxyl$(C_1$-$C_{15})$alkyl alkenoate or a hydroxypoly($(C_1$-$C_5)$ alkenylene oxide) alkenoate.

Embodiment 79 provides the method of any one of Embodiments 1-78, wherein the alkenoate ester is hydroxyethyl acrylate.

Embodiment 80 provides the method of any one of Embodiments 1-79, wherein the alkenoate ester has the structure

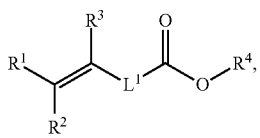

wherein
$R^1$, $R^2$, and $R^3$ are each independently selected from the group consisting of —H and substituted or unsubstituted $(C_1$-$C_{30})$hydrocarbyl interrupted or terminated by 0, 1, 2, or 3 atoms selected from the group consisting of O, NH, and S, $L^1$ is independently selected from a bond and substituted or unsubstituted $(C_1$-$C_{30})$hydrocarbylene interrupted or terminated by 0, 1, 2, or 3 atoms selected from the group consisting of O, NH, and S, and $R^4$ is independently selected from the group consisting of
a substituted or unsubstituted $(C_1$-$C_{30})$hydrocarbyl interrupted or terminated by 0, 1, 2, or 3 atoms selected from the group consisting of O, NH, and S, and
—R—(O—R)$_n$—OH, wherein R is a substituted or unsubstituted $(C_2$-$C_{10})$hydrocarbylene and n is about 0 to about 10,000.

Embodiment 81 provides the method of Embodiment 80, wherein
$R^1$, $R^2$, and $R^3$ are each independently selected from the group consisting of —H and $(C_1$-$C_{10})$alkyl, $L^1$ is independently selected from a bond and $(C_1$-$C_{10})$ alkylene, and $R^4$ is selected from the group consisting of a $(C_1$-$C_{15})$alkyl, and
—R—(O—R)$_n$—OH, wherein R is a $(C_2$-$C_5)$alkylene and n is about 0 to about 1,000.

Embodiment 82 provides the method of any one of Embodiments 80-81, wherein the alkenoate ester has the structure

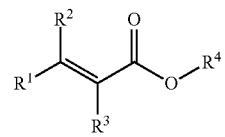

wherein $R^1$, $R^2$, and $R^3$ are each independently selected from the group consisting of —H and $(C_1$-$C_5)$alkyl, and at least one of $R^1$, $R^2$, and $R^3$ is —H, $R^4$ is selected from the group consisting of
$(C_1$-$C_{15})$alkyl, and
—R—(O—R)$_n$—OH, wherein R is a $(C_2$-$C_5)$alkylene and n is about 0 to about 1,000.

Embodiment 83 provides the method of any one of Embodiments 80-82, wherein the alkenoate ester has the structure

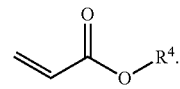

Embodiment 84 provides the method of any one of Embodiments 1-83, wherein about 0.001 wt % to about 99.999 wt % of the composition is the alkyl dialkenyldihydrocarbylammonium halide.

Embodiment 85 provides the method of any one of Embodiments 1-84, wherein about 1 wt % to about 60 wt % of the composition is the dialkenyldihydrocarbylammonium halide.

Embodiment 86 provides the method of any one of Embodiments 1-85, wherein the dialkenyldihydrocarbylammonium halide is a di(($(C_1$-$C_{30})$alkenyl)di(($(C_1$-$C_{30})$alkyl)) ammonium halide, wherein the $(C_1$-$C_{30})$alkenyl and the $(C_1$-$C_{30})$alkyl are each independently selected and are independently substituted or unsubstituted.

Embodiment 87 provides the method of any one of Embodiments 1-86, wherein the dialkenyldihydrocarbylammonium halide is a di(($(C_1$-$C_{10})$alkenyl)di(($(C_1$-$C_{10})$alkyl)) ammonium halide, wherein the $(C_1$-$C_{10})$alkenyl and the $(C_1$-$C_{10})$alkyl are each independently selected.

Embodiment 88 provides the method of any one of Embodiments 1-87, wherein the dialkenyldihydrocarbylammonium halide is di(($(C_1$-$C_5)$alkenyl)dimethylammonium halide, wherein the $(C_1$-$C_{10})$alkenyl and the $(C_1$-$C_{30})$alkyl are each independently selected.

Embodiment 89 provides the method of any one of Embodiments 1-88, wherein the dialkenyldihydrocarbylammonium halide is diallyldimethylammonium chloride (DADMAC).

Embodiment 90 provides the method of any one of Embodiments 1-89, wherein the dialkenyldihydrocarbylammonium halide has the structure

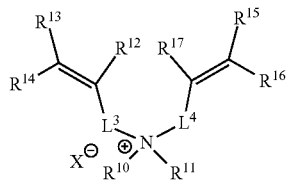

wherein
- $X^-$ is selected from the group consisting of $I^-$, $Br^-$, and $Cl^-$,
- $R^{12}$, $R^{13}$, $R^{14}$, $R^{15}$, $R^{16}$, and $R^{17}$ are each independently selected from the group consisting of —H and substituted or unsubstituted $(C_1$-$C_{30})$hydrocarbyl interrupted or terminated by 0, 1, 2, or 3 atoms selected from the group consisting of O, NH, and S,
- $R^{10}$ and $R^{11}$ are each independently a substituted or unsubstituted $(C_1$-$C_{30})$hydrocarbyl interrupted or terminated by 0, 1, 2, or 3 atoms selected from the group consisting of O, NH, and S, and
- $L^3$ and $L^4$ are independently selected from a bond and substituted or unsubstituted $(C_1$-$C_{30})$hydrocarbylene interrupted or terminated by 0, 1, 2, or 3 atoms selected from the group consisting of O, NH, and S.

Embodiment 91 provides the method of any one of Embodiments 80-90, wherein
- $R^{12}$, $R^{13}$, $R^{14}$, $R^{15}$, $R^{16}$, and $R^{17}$ are each independently selected from the group consisting of —H and $(C_1$-$C_{10})$alkyl,
- $R^{10}$ and $R^{11}$ are each independently $(C_1$-$C_{10})$alkyl, and
- $L^3$ and $L^4$ are independently selected from a bond and $(C_1$-$C_{10})$alkyl.

Embodiment 92 provides the method of any one of Embodiments 80-91, wherein the dialkenyldihydrocarbylammonium halide has the structure

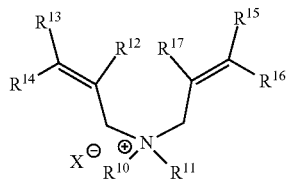

- $R^{12}$, $R^{13}$, $R^{14}$, $R^{15}$, $R^{16}$, and $R^{17}$ are each independently selected from the group consisting of —H and $(C_1$-$C_5)$alkyl,
- $R^{10}$ and $R^{11}$ are each independently $(C_1$-$C_{10})$alkyl,
- at least one of $R^{12}$, $R^{13}$, and $R^{14}$ is —H, and
- at least one of $R^{15}$, $R^{16}$, and $R^{17}$ is —H.

Embodiment 93 provides the method of any one of Embodiments 80-92, wherein the dialkenyldihydrocarbylammonium halide has the structure

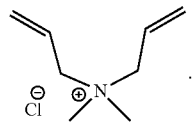

Embodiment 94 provides the method of any one of Embodiments 1-93, wherein about 0.001 wt % to about 99.999 wt % of the composition is the N,N-dihydrocarbyl-substituted alkenamide.

Embodiment 95 provides the method of any one of Embodiments 1-94, wherein about 1 wt % to about 60 wt % of the composition is the N,N-dihydrocarbyl-substituted alkenamide.

Embodiment 96 provides the method of any one of Embodiments 1-95, wherein the N,N-dihydrocarbyl-substituted alkenamide is N,N-di($(C_1$-$C_{30})$alkyl)-substituted $(C_1$-$C_{10})$alkenamide, wherein the $(C_1$-$C_{30})$alkyl groups are independently selected and the $(C_1$-$C_{30})$alkyl and $(C_1$-$C_{10})$alkenamide groups are independently substituted or unsubstituted.

Embodiment 97 provides the method of any one of Embodiments 1-96, wherein the N,N-dihydrocarbyl-substituted alkenamide is an N,N-di($(C_{10}$-$C_{25})$alkyl)-substituted $(C_1$-$C_{10})$alkenamide, wherein the $(C_1$-$C_{30})$alkyl groups are independently selected.

Embodiment 98 provides the method of any one of Embodiments 1-97, wherein the N,N-dihydrocarbyl-substituted alkenamide is an N,N-di($(C_{10}$-$C_{25})$alkyl)-substituted acrylamide.

Embodiment 99 provides the method of any one of Embodiments 1-98, wherein the N,N-dihydrocarbyl-substituted alkenamide has the structure

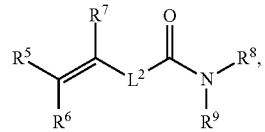

wherein
- $R^5$, $R^6$, and $R^7$ are each independently selected from the group consisting of —H and substituted or unsubstituted $(C_1$-$C_{30})$hydrocarbyl interrupted or terminated by 0, 1, 2, or 3 atoms selected from the group consisting of O, NH, and S,
- $R^8$ and $R^9$ are each independently substituted or unsubstituted $(C_1$-$C_{30})$hydrocarbyl interrupted or terminated by 0, 1, 2, or 3 atoms selected from the group consisting of O, NH, and S, and
- $L^2$ is independently selected from a bond and substituted or unsubstituted $(C_1$-$C_{30})$hydrocarbylene interrupted or terminated by 0, 1, 2, or 3 atoms selected from the group consisting of O, NH, and S.

Embodiment 100 provides the method of any one of Embodiments 80-99, wherein
- $R^5$, $R^6$, and $R^7$ are each independently selected from the group consisting of —H and $(C_1$-$C_{10})$alkyl,
- $R^8$ and $R^9$ are each independently $(C_{10}$-$C_{25})$alkyl,
- $L^1$ is independently selected from a bond and $(C_1$-$C_{10})$alkylene.

Embodiment 101 provides the method of any one of Embodiments 80-100, wherein the N,N-dihydrocarbyl-substituted alkenamide has the structure

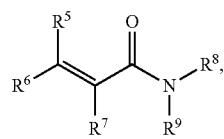

wherein
R$^5$, R$^6$, and R$^7$ are each independently selected from the group consisting of —H and (C$_1$-C$_5$)alkyl, wherein at least one of R$^7$, R$^8$, and R$^9$ is —H.
R$^8$ and R$^9$ are each independently (C$_{10}$-C$_{25}$)alkyl.

Embodiment 102 provides the method of any one of Embodiments 80-101, wherein the N,N-dihydrocarbyl-substituted alkenamide has the structure

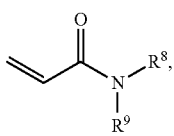

wherein R$^8$ and R$^9$ are each independently (C$_{10}$-C$_{25}$)alkyl.

Embodiment 103 provides the method of any one of Embodiments 1-102, wherein the composition comprises the alkenoate ester and the dialkenyldihydrocarbylammonium halide, wherein the alkenoate ester has the structure

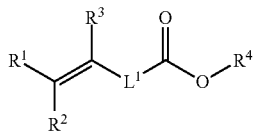

wherein
R$^1$, R$^2$, and R$^3$ are each independently selected from the group consisting of —H and substituted or unsubstituted (C$_1$-C$_{30}$)hydrocarbyl interrupted or terminated by 0, 1, 2, or 3 atoms selected from the group consisting of O, NH, and S,
L$^1$ is independently selected from a bond and substituted or unsubstituted (C$_1$-C$_{30}$)hydrocarbylene interrupted or terminated by 0, 1, 2, or 3 atoms selected from the group consisting of O, NH, and S, and
R$^4$ is selected from the group consisting of
a substituted or unsubstituted (C$_1$-C$_{30}$)hydrocarbyl interrupted or terminated by 0, 1, 2, or 3 atoms selected from the group consisting of O, NH, and S, and
—R—(O—R)$_n$—OH, wherein R is a substituted or unsubstituted (C$_2$-C$_{10}$)hydrocarbylene and n is about 0 to about 10,000; and
wherein the dialkenyldihydrocarbylammonium halide has the structure

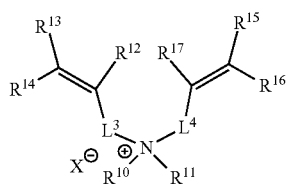

wherein
X$^-$ is selected from the group consisting of I$^-$, Br$^-$, and Cl$^-$,
R$^{12}$, R$^{13}$, R$^{14}$, R$^{15}$, R$^{16}$, and R$^{17}$ are each independently selected from the group consisting of —H and substituted or unsubstituted (C$_1$-C$_{30}$)hydrocarbyl interrupted or terminated by 0, 1, 2, or 3 atoms selected from the group consisting of O, NH, and S,
R$^{10}$ and R$^{11}$ are each independently a substituted or unsubstituted (C$_1$-C$_{30}$)hydrocarbyl interrupted or terminated by 0, 1, 2, or 3 atoms selected from the group consisting of O, NH, and S, and
L$^3$ and L$^4$ are independently selected from a bond and substituted or unsubstituted (C$_1$-C$_{30}$)hydrocarbylene interrupted or terminated by 0, 1, 2, or 3 atoms selected from the group consisting of O, NH, and S.

Embodiment 104 provides the method of any one of Embodiments 1-103, wherein the composition comprises the alkenoate ester and the dialkenyldihydrocarbylammonium halide, wherein the alkenoate ester has the structure

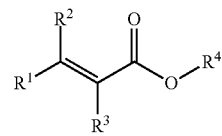

wherein R$^1$, R$^2$, and R$^3$ are each independently selected from the group consisting of —H and (C$_1$-C$_5$)alkyl, and at least one of R$^1$, R$^2$, and R$^3$ is —H,
R$^4$ is selected from the group consisting of
(C$_1$-C$_{15}$)alkyl, and
—R—(O—R)$_n$—OH, wherein R is a (C$_2$-C$_5$)alkylene and n is about 0 to about 1,000; and
wherein the dialkenyldihydrocarbylammonium halide has the structure

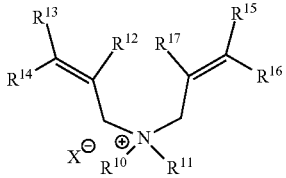

wherein X$^-$ is selected from the group consisting of I$^-$, Br$^-$, and Cl$^-$,
R$^{12}$, R$^{13}$, R$^{14}$, R$^{15}$, R$^{16}$, and R$^{17}$ are each independently selected from the group consisting of —H and (C$_1$-C$_5$)alkyl,
R$^{10}$ and R$^{11}$ are each independently (C$_1$-C$_{10}$)alkyl,
at least one of R$^{12}$, R$^{13}$, and R$^{14}$ is —H, and
at least one of R$^{15}$, R$^{16}$, and R$^{17}$ is —H.

Embodiment 105 provides the method of any one of Embodiments 1-104, wherein the composition comprises the alkenoate ester and the N,N-dihydrocarbyl-substituted alkenamide, wherein the alkenoate ester has the structure

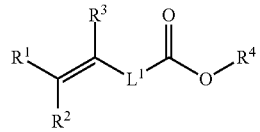

wherein
R$^1$, R$^2$, and R$^3$ are each independently selected from the group consisting of —H and substituted or unsubstituted (C$_1$-C$_{30}$)hydrocarbyl interrupted or terminated by 0, 1, 2, or 3 atoms selected from the group consisting of O, NH, and S, $L^1$ is independently selected from a bond and substituted or unsubstituted $(C_1\text{-}C_{30})$hydrocarbylene interrupted or terminated by 0, 1, 2, or 3 atoms selected from the group consisting of O, NH, and S, and $R^4$ is selected from the group consisting of
- a substituted or unsubstituted $(C_1\text{-}C_{30})$hydrocarbyl interrupted or terminated by 0, 1, 2, or 3 atoms selected from the group consisting of O, NH, and S, and
- —R—(O—R)$_n$—OH, wherein R is a substituted or unsubstituted $(C_2\text{-}C_{10})$hydrocarbylene and n is about 0 to about 10,000; and wherein the N,N-dihydrocarbyl-substituted alkenamide has the structure

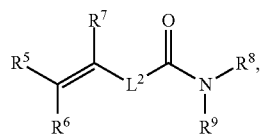

wherein
$R^5$, $R^6$, and $R^7$ are each independently selected from the group consisting of —H and substituted or unsubstituted $(C_1\text{-}C_{30})$hydrocarbyl interrupted or terminated by 0, 1, 2, or 3 atoms selected from the group consisting of O, NH, and S, $R^8$ and $R^9$ are each independently substituted or unsubstituted $(C_1\text{-}C_{30})$hydrocarbyl interrupted or terminated by 0, 1, 2, or 3 atoms selected from the group consisting of O, NH, and S, and $L^2$ is independently selected from a bond and substituted or unsubstituted $(C_1\text{-}C_{30})$hydrocarbylene interrupted or terminated by 0, 1, 2, or 3 atoms selected from the group consisting of O, NH, and S.

Embodiment 106 provides the method of any one of Embodiments 1-105, wherein the composition comprises the alkenoate ester and the N,N-dihydrocarbyl-substituted alkenamide, wherein the alkenoate ester has the structure

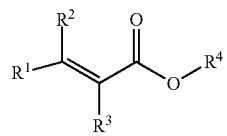

wherein $R^1$, $R^2$, and $R^3$ are each independently selected from the group consisting of —H and $(C_1\text{-}C_5)$alkyl, and at least one of $R^1$, $R^2$, and $R^3$ is —H, $R^4$ is independently selected from the group consisting of
a $(C_1\text{-}C_{15})$alkyl, and
—R—(O—R)$_n$—OH, wherein R is a $(C_2\text{-}C_5)$alkylene and n is about 0 to about 1,000; and wherein the N,N-dihydrocarbyl-substituted alkenamide has the structure

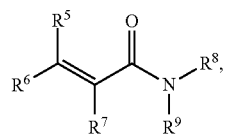

wherein
$R^5$, $R^6$, and $R^7$ are each independently selected from the group consisting of —H and $(C_1\text{-}C_5)$alkyl, wherein at least one of $R^7$, $R^8$, and $R^9$ is —H.

$R^8$ and $R^9$ are each independently $(C_{10}\text{-}C_{25})$alkyl.

Embodiment 107 provides the method of any one of Embodiments 1-106, further comprising allowing the composition to react to form a polymer comprising repeating units having at least one of the structures

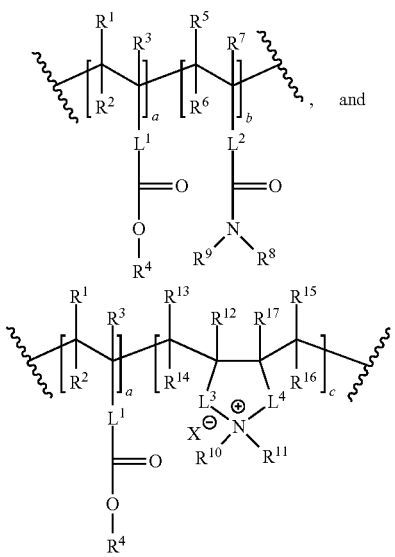

wherein the repeating units are in a block or random arrangement in the polymer wherein each repeating unit at each occurrence independently occurs in the orientation shown or in an opposite orientation, wherein
$X^-$ is selected from the group consisting of $I^-$, $Br^-$, and $Cl^-$, $R^1$, $R^2$, $R^3$, $R^5$, $R^6$, $R^7$, $R^{12}$, $R^{13}$, $R^{14}$, $R^{15}$, $R^{16}$, and $R^{17}$ at each occurrence are each independently selected from the group consisting of —H and substituted or unsubstituted $(C_1\text{-}C_{30})$hydrocarbyl interrupted or terminated by 0, 1, 2, or 3 atoms selected from the group consisting of O, NH, and S, $L^1$, $L^2$, $L^3$, and $L^4$ at each occurrence are each independently selected from a bond and substituted or unsubstituted $(C_1\text{-}C_{30})$hydrocarbylene interrupted or terminated by 0, 1, 2, or 3 atoms selected from the group consisting of O, NH, and S, $R^8$, $R^9$, $R^{10}$, $R^{11}$ at each occurrence are each independently substituted or unsubstituted $(C_1\text{-}C_{30})$hydrocarbyl interrupted or terminated by 0, 1, 2, or 3 atoms selected from the group consisting of O, NH, and S, at each occurrence $R^4$ is independently selected from the group consisting of
- a substituted or unsubstituted $(C_1\text{-}C_{30})$hydrocarbyl interrupted or terminated by 0, 1, 2, or 3 atoms selected from the group consisting of O, NH, and S, and
- —R—(O—R)$_n$—OH, wherein R is a substituted or unsubstituted $(C_2\text{-}C_{10})$hydrocarbylene and n is about 0 to about 10,000, and a is about 1 to about 100,000, b is about 1 to about 100,000, and c is about 1 to about 100,000.

Embodiment 108 provides the method of Embodiment 107, wherein the polymer further comprises a repeating unit having the structure

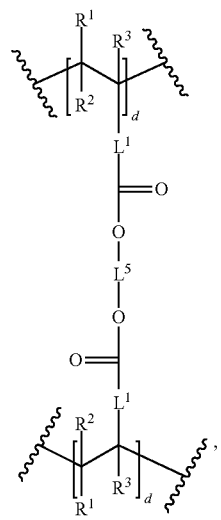

wherein the repeating unit is in a block or random arrangement in the polymer wherein each repeating unit at each occurrence independently occurs in the orientation shown or in an opposite orientation, wherein the repeating unit comprising $L^5$ is coupled to the same polymer or to a different polymer,
wherein
$L^5$ at each occurrence is independently selected from
a substituted or unsubstituted $(C_1-C_{30})$hydrocarbylene interrupted or terminated by 0, 1, 2, or 3 atoms selected from the group consisting of O, NH, and S, and
—R—(O—R)$_n$—, wherein R is a substituted or unsubstituted $(C_2-C_{10})$hydrocarbylene and n is about 0 to about 10,000, and d is about 1 to about 100,000.

Embodiment 109 provides the method of any one of Embodiments 1-108, further comprising combining the composition with an aqueous or oil-based fluid comprising a drilling fluid, stimulation fluid, fracturing fluid, spotting fluid, clean-up fluid, production fluid, completion fluid, remedial treatment fluid, abandonment fluid, pill, acidizing fluid, cementing fluid, packer fluid, or a combination thereof, to form a mixture, wherein the placing the composition in the subterranean formation comprises placing the mixture in the subterranean formation.

Embodiment 110 provides the method of Embodiment 109, wherein the cementing fluid comprises Portland cement, pozzolana cement, gypsum cement, high alumina content cement, slag cement, silica cement, or a combination thereof.

Embodiment 111 provides the method of any one of Embodiments 1-110, wherein at least one of prior to, during, and after the placing of the composition in the subterranean formation, the composition is used downhole, at least one of alone and in combination with other materials, as a drilling fluid, stimulation fluid, fracturing fluid, spotting fluid, clean-up fluid, production fluid, completion fluid, remedial treatment fluid, abandonment fluid, pill, acidizing fluid, cementing fluid, packer fluid, or a combination thereof.

Embodiment 112 provides the method of any one of Embodiments 1-111, wherein the composition further comprises water, saline, aqueous base, oil, organic solvent, synthetic fluid oil phase, aqueous solution, alcohol or polyol, cellulose, starch, alkalinity control agent, acidity control agent, density control agent, density modifier, emulsifier, dispersant, polymeric stabilizer, crosslinking agent, polyacrylamide, polymer or combination of polymers, antioxidant, heat stabilizer, foam control agent, solvent, diluent, plasticizer, filler or inorganic particle, pigment, dye, precipitating agent, rheology modifier, oil-wetting agent, set retarding additive, surfactant, corrosion inhibitor, gas, weight reducing additive, heavy-weight additive, lost circulation material, filtration control additive, salt, fiber, thixotropic additive, breaker, crosslinker, gas, rheology modifier, curing accelerator, curing retarder, pH modifier, chelating agent, scale inhibitor, enzyme, resin, water control material, polymer, oxidizer, a marker, Portland cement, pozzolana cement, gypsum cement, high alumina content cement, slag cement, silica cement, fly ash, metakaolin, shale, zeolite, a crystalline silica compound, amorphous silica, fibers, a hydratable clay, microspheres, pozzolan lime, or a combination thereof.

Embodiment 113 provides the method of any one of Embodiments 1-112, wherein the placing of the drilling fluid composition in the subterranean formation downhole comprises pumping the drilling fluid composition through a drill string disposed in a wellbore, and through a drill bit at a downhole end of the drill string.

Embodiment 114 provides a method of treating a subterranean formation, the method comprising:
obtaining or providing a composition comprising
a $(C_1-C_{30})$hydrocarbyl $(C_1-C_{10})$alkenoate ester or a poly$((C_2-C_3)$hydrocarbylene oxide) $(C_1-C_{10})$alkenoate ester, wherein the $(C_1-C_{30})$hydrocarbyl, $(C_1-C_{30})$hydrocarbyene, and $(C_1-C_{10})$alkenoate are independently substituted or unsubstituted; and
at least one of
a di$((C_1-C_{30})$alkenyl)di$((C_1-C_{30})$hydrocarbyl))ammonium halide, wherein the $(C_1-C_{30})$alkenyl and the $(C_1-C_{30})$hydrocarbyl are each independently selected and are independently substituted or unsubstituted, and
an N,N-di$((C_1-C_{30})$hydrocarbyl)-substituted $(C_1-C_{10})$alkenamide, wherein the $(C_1-C_{30})$alkyl are independently selected and the $(C_1-C_{30})$hydrocarbyl and $(C_1-C_{10})$alkenamide are independently substituted or unsubstituted; and
placing the composition in a subterranean formation downhole.

Embodiment 115 provides a method of treating a subterranean formation, the method comprising:
obtaining or providing a composition comprising
about 0.001 wt % to about 99.999 wt % of at least one of hydroxyethyl acrylate and a $(C_1-Cis)$alkyl acrylate; and
about 0.001 wt % to about 99.999 wt % of at least one of diallyldimethylammonium chloride, and
an N,N-dihydrocarbyl-substituted acrylamide; and
placing the composition in a subterranean formation downhole.

Embodiment 116 provides a method of treating a subterranean formation, the method comprising:
obtaining or providing a composition comprising a polymer comprising repeating units having at least one of the structures

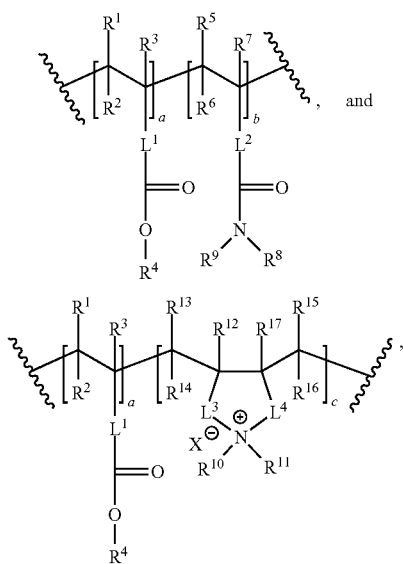

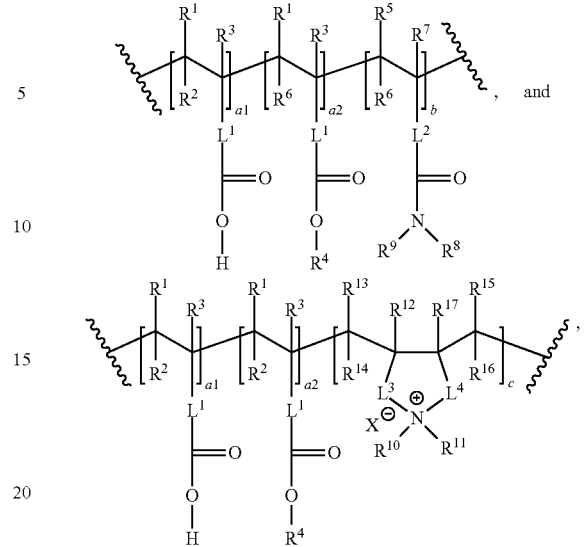

wherein the repeating units are in a block or random arrangement in the polymer wherein each repeating unit at each occurrence independently occurs in the orientation shown or in an opposite orientation, wherein
- X⁻ is selected from the group consisting of I⁻, Br⁻, and Cl⁻,
- $R^1$, $R^2$, $R^3$, $R^5$, $R^6$, $R^7$, $R^{12}$, $R^{13}$, $R^{14}$, $R^{15}$, $R^{16}$, and $R^{17}$ at each occurrence are each independently selected from the group consisting of —H and substituted or unsubstituted $(C_1\text{-}C_{30})$hydrocarbyl interrupted or terminated by 0, 1, 2, or 3 atoms selected from the group consisting of O, NH, and S,
- $L^1$, $L^2$, $L^3$, and $L^4$ at each occurrence are each independently selected from a bond and substituted or unsubstituted $(C_1\text{-}C_{30})$hydrocarbylene interrupted or terminated by 0, 1, 2, or 3 atoms selected from the group consisting of O, NH, and S,
- $R^8$, $R^9$, $R^{10}$, $R^{11}$ at each occurrence are each independently substituted or unsubstituted $(C_1\text{-}C_{30})$hydrocarbyl interrupted or terminated by 0, 1, 2, or 3 atoms selected from the group consisting of O, NH, and S,
- at each occurrence $R^4$ is independently selected from the group consisting of
  - a substituted or unsubstituted $(C_1\text{-}C_{30})$hydrocarbyl interrupted or terminated by 0, 1, 2, or 3 atoms selected from the group consisting of O, NH, and S, and
  - —R—(O—R)$_n$—OH, wherein R is a substituted or unsubstituted $(C_2\text{-}C_{10})$hydrocarbylene and n is about 0 to about 10,000, and
- a is about 1 to about 100,000, b is about 1 to about 100,000, and c is about 1 to about 100,000; and placing the composition in a subterranean formation downhole.

Embodiment 117 provides the method of Embodiment 116, wherein the polymer comprises repeating units having at least one of the structures wherein the repeating units are in a block or random arrangement in the polymer wherein each repeating unit at each occurrence independently occurs in the orientation shown or in an opposite orientation, wherein a1+a2=a.

Embodiment 118 provides the method of any one of Embodiments 116-117, wherein about 0.001 wt % to about 99.999 wt % of the composition is the polymer.

Embodiment 119 provides the method of any one of Embodiments 116-118, wherein about 1 wt % to about 60 wt % of the composition is the polymer.

Embodiment 120 provides the method of any one of Embodiments 116-119, wherein the polymer further comprises a repeating unit having the structure

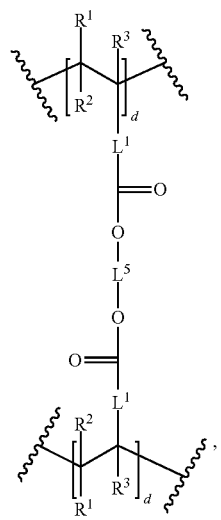

wherein the repeating unit is in a block or random arrangement in the polymer wherein each repeating unit at each occurrence independently occurs in the orientation shown or in an opposite orientation, wherein the repeating unit comprising $L^5$ is coupled to the same polymer or to a different polymer, wherein L⁵ at each occurrence is independently selected from
- a substituted or unsubstituted $(C_1-C_{30})$hydrocarbylene interrupted or terminated by 0, 1, 2, or 3 atoms selected from the group consisting of O, NH, and S, and
- $-R-(O-R)_n-$, wherein R is a substituted or unsubstituted $(C_2-C_{10})$hydrocarbylene and n is about 0 to about 10,000, and d is about 1 to about 100,000.

Embodiment 121 provides the method of any one of Embodiments 116-120, wherein the polymer further comprises a repeating unit having the structure

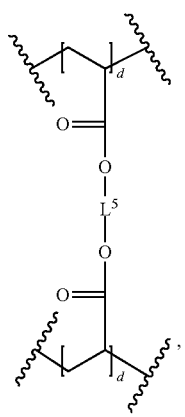

wherein the repeating unit is in a block or random arrangement in the polymer wherein each repeating unit at each occurrence independently occurs in the orientation shown or in an opposite orientation, wherein the repeating unit comprising L⁵ is coupled to the same polymer or to a different polymer, wherein L⁵ at each occurrence is independently selected from
- a $(C_1-C_{30})$alkylene, and
- $-R-(O-R)_n-$, wherein R is a $(C_2-C_5)$alkylene and n is about 0 to about 10,000.

Embodiment 122 provides the method of any one of Embodiments 116-121, wherein $R^1$, $R^2$, $R^3$, $R^5$, $R^6$, $R^7$, $R^{12}$, $R^{13}$, $R^{14}$, $R^{15}$, $R^{16}$, and $R^{17}$ at each occurrence are each independently selected from the group consisting of —H and $(C_1-C_{10})$ alkyl, $L^1$, $L^2$, $L^3$, and $L^4$ at each occurrence are each independently selected from a bond and $(C_1-C_{10})$alkylene, $R^8$ and $R^9$ at each occurrence are each independently $(C_{10}-C_{25})$alkyl, $R^{10}$ and $R^{11}$ at each occurrence are each independently $(C_1-C_{10})$alkyl, at each occurrence $R^4$ is can be independently selected from the group consisting of
- a $(C_1-C_{10})$alkyl, and
- $-R-(O-R)_n-OH$, wherein R is a $(C_2-C_5)$hydrocarbylene and n is about 0 to about 1,000.

Embodiment 123 provides the method of any one of Embodiments 116-122, wherein the polymer comprises repeating units having the structure

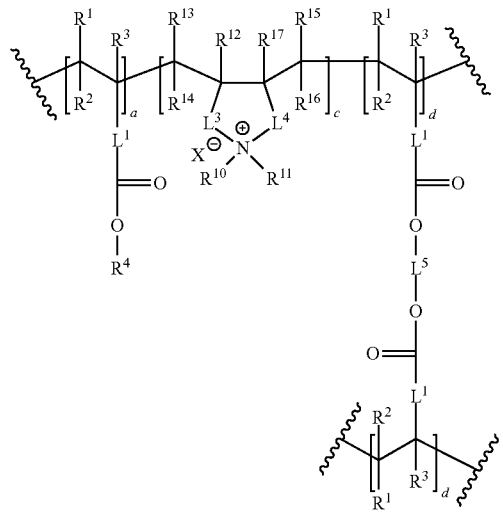

wherein the repeating units are in a block or random arrangement in the polymer wherein each repeating unit at each occurrence independently occurs in the orientation shown or in an opposite orientation, wherein the repeating unit comprising L⁵ is coupled to the same polymer or to a different polymer, wherein L⁵ at each occurrence is independently selected from
- a substituted or unsubstituted $(C_1-C_{30})$hydrocarbylene interrupted or terminated by 0, 1, 2, or 3 atoms selected from the group consisting of O, NH, and S, and
- $-R-(O-R)_n-$, wherein R is a substituted or unsubstituted $(C_2-C_{10})$hydrocarbylene and n is about 0 to about 10,000, and d is about 1 to about 100,000.

Embodiment 124 provides the method of any one of Embodiments 116-123, wherein the polymer comprises repeating units having the structure

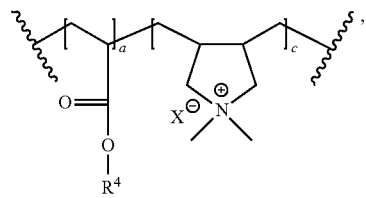

wherein at each occurrence $R^4$ is independently selected from the group consisting of
- $(C_1-C_{15})$alkyl, and
- $-R-(O-R)_n-OH$, wherein R is a $(C_2-C_5)$alkylene and n is about 0 to about 1,000.

Embodiment 125 provides the method of any one of Embodiments 116-124, wherein the polymer comprises repeating units having the structure

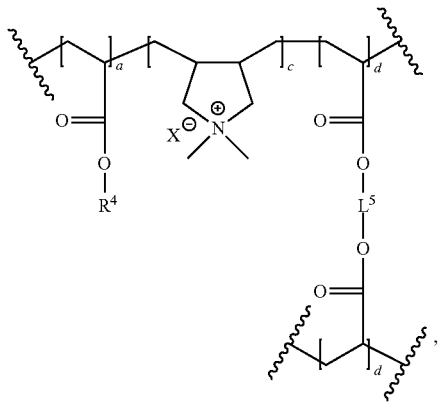

wherein the repeating units are in a block or random arrangement in the polymer wherein each repeating unit at each occurrence independently occurs in the orientation shown or in an opposite orientation, wherein the repeating unit comprising $L^5$ is coupled to the same polymer or to a different polymer,
wherein
at each occurrence $R^4$ is independently selected from the group consisting of
$(C_1$-$C_{15})$alkyl, and
—R—(O—R)$_n$—OH, wherein R is a $(C_2$-$C_5)$alkylene and n is about 0 to about 1,000,
at each occurrence $L^5$ is independently selected from the group consisting of
a $(C_1$-$C_{30})$alkylene, and
—R—(O—R)$_n$—, wherein R is a $(C_2$-$C_5)$alkylene and n is about 0 to about 10,000, and
d is about 1 to about 100,000.

Embodiment 126 provides the method of any one of Embodiments 116-125, wherein the polymer comprises repeating units having the structure

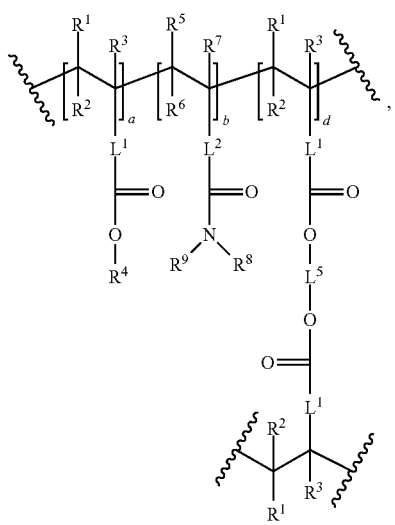

wherein the repeating units are in a block or random arrangement in the polymer wherein each repeating unit at each occurrence independently occurs in the orientation shown or in an opposite orientation, wherein the repeating unit comprising $L^5$ is coupled to the same polymer or to a different polymer,
wherein
at each occurrence $L^5$ is independently selected from the group consisting of
a $(C_1$-$C_{30})$alkylene, and
—R—(O—R)$_n$—, wherein R is a $(C_2$-$C_5)$alkylene and n is about 0 to about 10,000, and
d is about 1 to about 100,000.

Embodiment 127 provides the method of any one of Embodiments 116-126, wherein the polymer comprises repeating units having the structure

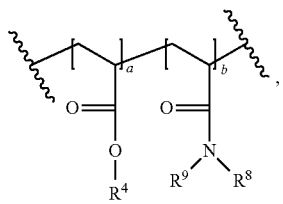

wherein
at each occurrence $R^4$ is independently selected from the group consisting of
$(C_1$-$C_{15})$alkyl, and
—R—(O—R)$_n$—OH, wherein R is a $(C_2$-$C_5)$alkylene and n is about 0 to about 1,000, and
$R^8$ and $R^9$ at each occurrence are each independently $(C_{10}$-$C_{25})$alkyl.

Embodiment 128 provides the method of any one of Embodiments 116-127, wherein the polymer comprises repeating units having the structure

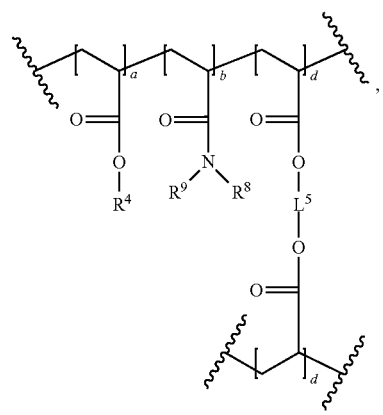

wherein the repeating units are in a block or random arrangement in the polymer wherein each repeating unit at each occurrence independently occurs in the orientation shown or in an opposite orientation, wherein the repeating unit comprising $L^5$ is coupled to the same polymer or to a different polymer,
wherein
at each occurrence $R^4$ is independently selected from the group consisting of
$(C_1$-$C_{15})$alkyl, and
—R—(O—R)$_n$—OH, wherein R is a $(C_2$-$C_5)$alkylene and n is about 0 to about 1,000,
$R^8$ and $R^9$ at each occurrence are each independently $(C_{10}$-$C_{25})$alkyl,
at each occurrence $L^5$ is independently selected from the group consisting of a (C$_1$-C$_{30}$)alkylene, and
—R—(O—R)$_n$—, wherein R is a (C$_2$-C$_5$)alkylene and n is about 0 to about 10,000, and
d is about 1 to about 100,000.

Embodiment 129 provides a method of treating a subterranean formation, the method comprising:
obtaining or providing a composition comprising a polymer comprising repeating units having at least one of the structures

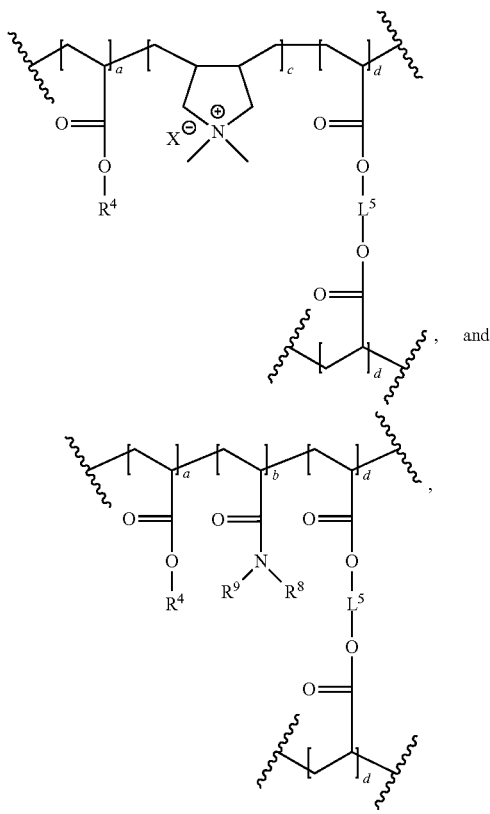

wherein the repeating units are in a block or random arrangement in the polymer wherein each repeating unit at each occurrence independently occurs in the orientation shown or in an opposite orientation, wherein the repeating unit comprising L$^5$ is coupled to the same polymer or to a different polymer,
wherein
at each occurrence R$^4$ is independently selected from the group consisting of
(C$_1$-C$_{15}$)alkyl, and
—R—(O—R)$_n$—OH, wherein R is a (C$_2$-C$_5$)alkylene and n is about 0 to about 1,000,
R$^8$ and R$^9$ at each occurrence are each independently (C$_{10}$-C$_{25}$)alkyl,
at each occurrence L$^5$ is independently selected from the group consisting of
a (C$_1$-C$_{30}$)alkylene, and
—R—(O—R)$_n$—, wherein R is a (C$_2$-C$_5$)alkylene and n is about 0 to about 10,000
a is about 1 to about 100,000, b is about 1 to about 100,000, c is about 1 to about 100,000, and d is about 1 to about 100,000; and
placing the composition in a subterranean formation downhole.

Embodiment 130 provides a method of treating a subterranean formation, the method comprising:
obtaining or providing a proppant or a gravel pack comprising an at least partial coating of a tackifier and at least partial coating of a water-control agent on the proppant or the gravel pack; and placing the proppant or gravel pack in a subterranean formation downhole.

Embodiment 131 provides the method of 130, wherein obtaining or providing the proppant or gravel pack comprises forming the at least partial coating of the tackifier on the proppant or gravel pack.

Embodiment 132 provides the method of any one of Embodiments 130-131, wherein obtaining or providing the proppant or gravel pack comprises forming the at least partial coating of the water-control agent on the proppant or gravel pack.

Embodiment 133 provides the method of any one of Embodiments 130-132, wherein the proppant or gravel pack is obtained or provided in a slurry, wherein placing the proppant or gravel pack in the subterranean formation comprises placing the slurry in the subterranean formation.

Embodiment 134 provides the method of any one of Embodiments 130-133, wherein the method further comprises combining the proppant or gravel pack with a carrier fluid to form a slurry, wherein placing the proppant or gravel pack in the subterranean formation comprises placing the slurry in the subterranean formation.

Embodiment 135 provides the method of Embodiment 134, wherein the carrier fluid comprises at least one of an aqueous liquid and an organic liquid.

Embodiment 136 provides the method of any one of Embodiments 134-135, wherein the carrier fluid comprises at least one of dipropylene glycol methyl ether, dipropylene glycol dimethyl ether, dimethyl formamide, diethylene glycol methyl ether, ethylene glycol butyl ether, diethylene glycol butyl ether, propylene carbonate, D-limonene, a C$_2$-C$_{40}$ fatty acid C$_1$-C$_{10}$ alkyl ester, 2-butoxy ethanol, butyl acetate, furfuryl acetate, dimethyl sulfoxide, and dimethyl formamide.

Embodiment 137 provides the method of any one of Embodiments 134-136, wherein the carrier fluid comprises about 30 wt % to about 95 wt % of the slurry.

Embodiment 138 provides the method of any one of Embodiments 130-137, wherein the tackifier comprises at least one of an epoxide-containing resin, a polyepoxide resin, a novolak resin, a polyester resin, phenolaldehyde resin, a urea-aldehyde resin, a furan resin, a urethane resin, a glycidyl ether resin, a charged polymer, an acrylic acid polymer, an acrylic acid ester polymer, an acrylic acid homopolymer, an acrylic acid ester homopolymer, poly (methyl acrylate), poly(butyl acrylate), poly(2-ethylhexyl acrylate), an acrylic acid ester copolymer, a methacrylic acid derivative polymer, a methacrylic acid homopolymer, a methacrylic acid ester homopolymer, poly(methyl methacrylate), poly(butyl methacrylate), poly(2-ethylhexyl methacrylate), an acrylamidomethylpropane sulfonate polymer or copolymer or derivative thereof, an acrylic acid/acrylamidomethylpropane sulfonate copolymer, and a condensation reaction product comprising at least one of a polyacid, a polyamine, a trimer acid, a fatty acid, a fatty acid-derivative, maleic anhydride, acrylic acid, a polyester, a polycarbonate, a polycarbamate, a natural resin, shellac, an aldehyde, formaldehyde, a dialdehyde, glutaraldehyde, a hemiacetal, an aldehyde-releasing compound, a diacid halide, a dihalide, a dichloride, a dibromide, a polyacid anhydride, citric acid, an epoxide, furfuraldehyde, an aldehyde condensate, and a silyl-modified polyamide.

Embodiment 139 provides the method of any one of Embodiments 130-138, wherein the tackifier comprises at least one of bisphenol A diglycidyl ether resin, butoxymethyl butyl glycidyl ether resin, bisphenol A-epichlorohydrin resin, and bisphenol F resin.

Embodiment 140 provides the method of any one of Embodiments 130-139, wherein the water control agent comprises at least one of the composition of Embodiment 1 and the polymer of Embodiment 116.

Embodiment 141 provides the method of any one of Embodiments 130-140, wherein the water control agent comprises at least one of a polymer derived from a dialkyldiallylammonium salt, a quaternized ammonium salt of polyethyleneimine polymer, a quaternized ammonium salt of polydimethylaminoethyl-methacrylate copolymer and a quaternized ammonium salt of a poly N-(3-dimethylaminopropyl)acrylamide polymer.

Embodiment 142 provides the method of any one of Embodiments 130-141, wherein the water control agent comprises a vinyl silane copolymer.

Embodiment 143 provides the method of Embodiment 142, wherein the vinyl silane is selected from the group consisting of vinyltrimethoxysilane, vinyltriethoxysilane, methacrylatetrimethoxysilane and methacrylatetriethoxysilane.

Embodiment 144 provides the method of any one of Embodiments 142-143, wherein the vinyl silane copolymer comprises monomers derived from at least one selected from the group consisting of 2-hydroxyethyl acrylate, polyalkylacrylate, acrylamide, vinylmethyl ether, methacrylamide and vinylpyrrolidone.

Embodiment 145 provides the method of any one of Embodiments 130-144, wherein the water control agent comprises acrylic acid, further comprising coating the proppant or gravel pack with a protective coating.

Embodiment 146 provides a composition for treatment of a subterranean formation, the composition comprising a proppant or a gravel pack comprising an at least partial coating of a tackifier and an at least partial coating of a water-control agent.

Embodiment 147 provides a system comprising: a composition comprising at least one of the composition of any one of Embodiments 152-155, the polymer of any one of Embodiments 156-160, and the coated proppant or gravel pack of Embodiment 146; and a subterranean formation comprising the composition therein.

Embodiment 148 provides the system of Embodiment 147, further comprising a drillstring disposed in a wellbore, the drillstring comprising a drill bit at the downhole end of the drillstring;
an annulus between the drillstring and the wellbore; and
a pump configured to circulate the drilling fluid composition through the drill string, through the drill bit, and back above-surface through an annulus.

Embodiment 149 provides the system of Embodiment 148, further comprising a fluid processing unit configured to process the drilling fluid composition exiting the annulus to generate a cleaned drilling fluid for recirculation through the wellbore.

Embodiment 150 provides the system of any one of Embodiments 147-149, further comprising a tubular disposed in a wellbore; and a pump configured to pump the composition downhole.

Embodiment 151 provides the system of Embodiment 150, wherein the pump is configured to pump the composition downhole and fracture the subterranean formation.

Embodiment 152 provides a composition for treatment of a subterranean formation, the composition comprising:
an alkenoate ester; and
at least one of
a dialkenyldihydrocarbylammonium halide, and
an N,N-dihydrocarbyl-substituted alkenamide,
wherein the alkenoate ester has the structure

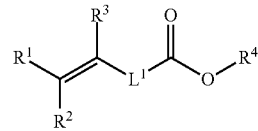

wherein $R^1$, $R^2$, and $R^3$ are each independently selected from the group consisting of —H and substituted or unsubstituted $(C_1$-$C_{30})$hydrocarbyl interrupted or terminated by 0, 1, 2, or 3 atoms selected from the group consisting of O, NH, and S, $L^1$ is independently selected from a bond and substituted or unsubstituted $(C_1$-$C_{30})$hydrocarbylene interrupted or terminated by 0, 1, 2, or 3 atoms selected from the group consisting of O, NH, and S, and $R^4$ is selected from the group consisting of
a substituted or unsubstituted $(C_1$-$C_{30})$hydrocarbyl interrupted or terminated by 0, 1, 2, or 3 atoms selected from the group consisting of O, NH, and S, and
—R—(O—R)$_n$—OH, wherein R is a substituted or unsubstituted $(C_2$-$C_{10})$hydrocarbylene and n is about 0 to about 10,000 wherein the dialkenyldihydrocarbylammonium halide has the structure

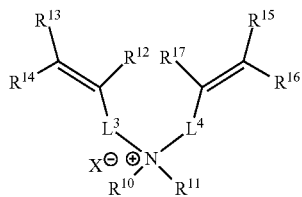

wherein $X^-$ is selected from the group consisting of $I^-$, $Br^-$, and $Cl^-$, $R^{12}$, $R^{13}$, $R^{14}$, $R^{15}$, $R^{16}$, and $R^{17}$ are each independently selected from the group consisting of —H and substituted or unsubstituted $(C_1$-$C_{30})$hydrocarbyl interrupted or terminated by 0, 1, 2, or 3 atoms selected from the group consisting of O, NH, and S, $R^{10}$ and $R^{11}$ are each independently a substituted or unsubstituted $(C_1$-$C_{30})$hydrocarbyl interrupted or terminated by 0, 1, 2, or 3 atoms selected from the group consisting of O, NH, and S, and $L^3$ and $L^4$ are independently selected from a bond and substituted or unsubstituted $(C_1$-$C_{30})$hydrocarbylene interrupted or terminated by 0, 1, 2, or 3 atoms selected from the group consisting of O, NH, and S, wherein the N,N-dihydrocarbyl-substituted alkenamide has the structure

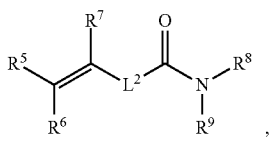

wherein
$R^5$, $R^6$, and $R^7$ are each independently selected from the group consisting of —H and substituted or unsubstituted $(C_1$-$C_{30})$hydrocarbyl interrupted or terminated by 0, 1, 2, or 3 atoms selected from the group consisting of O, NH, and S, $R^8$ and $R^9$ are each independently substituted or unsubstituted $(C_1$-$C_{30})$hydrocarbyl interrupted or terminated by 0, 1, 2, or 3 atoms selected from the group consisting of O, NH, and S, and $L^2$ is independently selected from a bond and substituted or unsubstituted $(C_1$-$C_{30})$hydrocarbylene interrupted or terminated by 0, 1, 2, or 3 atoms selected from the group consisting of O, NH, and S.

Embodiment 153 provides the composition of Embodiment 152, wherein the composition further comprises a downhole fluid.

Embodiment 154 provides the composition of any one of Embodiments 152-153, wherein the composition further comprises a proppant or gravel pack.

Embodiment 155 provides the composition of any one of Embodiments 152-154, wherein the composition is a composition for fracturing of a subterranean formation.

Embodiment 156 provides a composition for treatment of a subterranean formation, the composition comprising:
a polymer comprising repeating units having at least one of the following structures

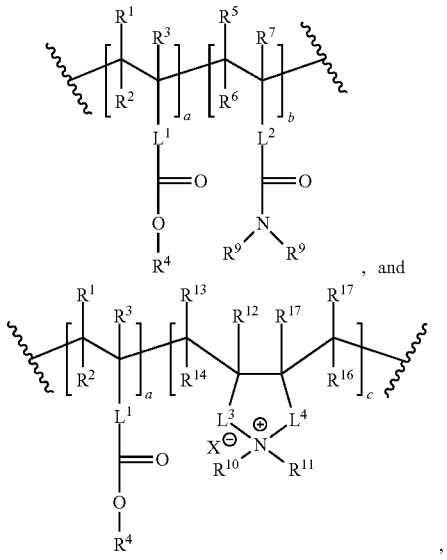

, and wherein the repeating units are in a block or random arrangement in the polymer wherein each repeating unit at each occurrence independently occurs in the orientation shown or in an opposite orientation,
wherein
$X^-$ is selected from the group consisting of $I^-$, $Br^-$, and $Cl^-$, $R^1$, $R^2$, $R^3$, $R^5$, $R^6$, $R^7$, $R^{12}$, $R^{13}$, $R^{14}$, $R^{15}$, $R^{16}$, and $R^{17}$ at each occurrence are each independently selected from the group consisting of —H and substituted or unsubstituted $(C_1$-$C_{30})$hydrocarbyl interrupted or terminated by 0, 1, 2, or 3 atoms selected from the group consisting of O, NH, and S, $L^1$, $L^2$, $L^3$, and $L^4$ at each occurrence are each independently selected from a bond and substituted or unsubstituted $(C_1$-$C_{30})$hydrocarbylene interrupted or terminated by 0, 1, 2, or 3 atoms selected from the group consisting of O, NH, and S, $R^8$, $R^9$, $R^{10}$, $R^{11}$ at each occurrence are each independently substituted or unsubstituted $(C_1$-$C_{30})$hydrocarbyl interrupted or terminated by 0, 1, 2, or 3 atoms selected from the group consisting of O, NH, and S, at each occurrence $R^4$ is independently selected from the group consisting of
a substituted or unsubstituted $(C_1$-$C_{30})$hydrocarbyl interrupted or terminated by 0, 1, 2, or 3 atoms selected from the group consisting of O, NH, and S, and
—R—(O—R)$_n$—OH, wherein R is a substituted or unsubstituted $(C_2$-$C_{10})$hydrocarbylene and n is about 0 to about 10,000, and a is about 1 to about 100,000, b is about 1 to about 100,000, and c is about 1 to about 100,000.

Embodiment 157 provides the composition of Embodiment 156, wherein the polymer further comprises a repeating unit having the structure

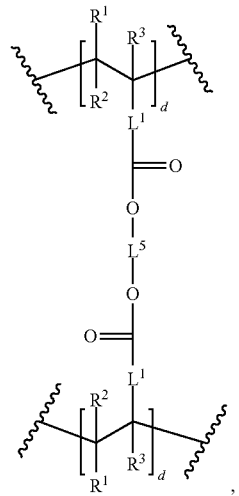

, wherein the repeating unit is in a block or random arrangement in the polymer wherein each repeating unit at each occurrence independently occurs in the orientation shown or in an opposite orientation, wherein the repeating unit comprising $L^5$ is coupled to the same polymer or to a different polymer,
wherein
$L^5$ at each occurrence is independently selected from
a substituted or unsubstituted $(C_1$-$C_{30})$hydrocarbylene interrupted or terminated by 0, 1, 2, or 3 atoms selected from the group consisting of O, NH, and —R—(O—R)$_n$—, wherein R is a substituted or unsubstituted (C$_2$-C$_{10}$)hydrocarbylene and n is about 0 to about 10,000, and d is about 1 to about 100,000.

Embodiment 158 provides the composition of any one of Embodiments 156-157, wherein the composition further comprises a downhole fluid.

Embodiment 159 provides the composition of any one of Embodiments 156-158, wherein the composition further comprises a proppant or gravel pack.

Embodiment 160 provides the composition of any one of Embodiments 156-159, wherein the composition is a composition for fracturing of a subterranean formation.

Embodiment 161 provides a method of preparing a composition for treatment of a subterranean formation, the method comprising:
forming a composition comprising
an alkenoate ester; and
at least one of
a dialkenyldihydrocarbylammonium halide, and
an N,N-dihydrocarbyl-substituted alkenamide.

Embodiment 162 provides a method of preparing a composition for treatment of a subterranean formation, the method comprising:
forming a composition comprising a polymer comprising repeating units having at least one of the following structures

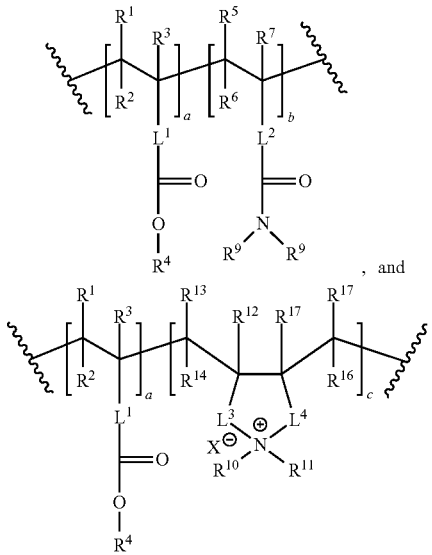

wherein the repeating units are in a block or random arrangement in the polymer wherein each repeating unit at each occurrence independently occurs in the orientation shown or in an opposite orientation, wherein X$^-$ is selected from the group consisting of I$^-$, Br$^-$, and Cl$^-$, R$^1$, R$^2$, R$^3$, R$^5$, R$^6$, R$^7$, R$^{12}$, R$^{13}$, R$^{14}$, R$^{15}$, R$^{16}$, and R$^{17}$ at each occurrence are each independently selected from the group consisting of —H and substituted or unsubstituted (C$_1$-C$_{30}$)hydrocarbyl interrupted or terminated by 0, 1, 2, or 3 atoms selected from the group consisting of O, NH, and S, L$^1$, L$^2$, L$^3$, and L$^4$ at each occurrence are each independently selected from a bond and substituted or unsubstituted (C$_1$-C$_{30}$)hydrocarbylene interrupted or terminated by 0, 1, 2, or 3 atoms selected from the group consisting of O, NH, and S, R$^8$, R$^9$, R$^{10}$, R$^{11}$ at each occurrence are each independently substituted or unsubstituted (C$_1$-C$_{30}$)hydrocarbyl interrupted or terminated by 0, 1, 2, or 3 atoms selected from the group consisting of O, NH, and S, at each occurrence R$^4$ is independently selected from the group consisting of
a substituted or unsubstituted (C$_1$-C$_{30}$)hydrocarbyl interrupted or terminated by 0, 1, 2, or 3 atoms selected from the group consisting of O, NH, and S, and
—R—(O—R)$_n$—OH, wherein R is a substituted or unsubstituted (C$_2$-C$_{10}$)hydrocarbylene and n is about 0 to about 10,000, and a is about 1 to about 100,000, b is about 1 to about 100,000, and c is about 1 to about 100,000.

Embodiment 163 provides a method of preparing a composition for treatment of a subterranean formation, the method comprising: forming a composition for treatment of a subterranean formation, the composition comprising a proppant or a gravel pack comprising an at least partial coating of a tackifier and an at least partial coating of a water-control agent.

Embodiment 164 provides the composition, apparatus, method, or system of any one or any combination of Embodiments 1-163 optionally configured such that all elements or options recited are available to use or select from.

What is claimed is:

1. A method of treating a subterranean formation, the method comprising:
obtaining or providing a composition comprising
an alkenoate ester and a dialkenyldihydrocarbylammonium halide;
polymerizing the alkenoate ester and the dialkenyldihydrocarbylammonium halide to form a polymer including an ammonium halide portion and a polyalkenoate portion;
mixing the polymer with a plurality of particulate substrates to provide coated particulates; and then
placing the coated particulates downhole in the subterranean formation and thereby contacting the subterranean formation with the coated particulates, wherein the placing of the composition in the subterranean formation at least partially controls migration of downhole particulate and at least partially mitigates a production of water from the formation, wherein the ammonium halide portion of the polymer provides consolidation of the downhole particulate and the polyalkenoate portion of the polymer provides mitigation of the production of water.

2. The method of claim 1, wherein the method further comprises hydraulic fracturing.

3. The method of claim 1, wherein the method further comprises drilling.

4. The method of claim 1, wherein the composition further comprises a radical initiator.

5. The method of claim 1, wherein the composition further comprises a coupling agent comprising at least one of a diol, polyol, diamine, polyamine, and a silane coupling agent.

6. The method of claim 1, wherein the composition further comprises at least one of an epoxide-containing resin, a polyepoxide resin, a novolak resin, a polyester resin, phenolaldehyde resin, a urea-aldehyde resin, a furan resin, a urethane resin, and a glycidyl ether resin.

7. The method of claim 1, wherein the composition further comprises at least one organic compound comprising at least one of an amine and an amide, wherein the amine is an aromatic amine, an aliphatic amine, a cyclo-aliphatic amine, a polyamine, or a combination thereof, wherein the amide is a mono- or polyamide.

8. The method of claim 1, wherein the composition further comprises at least one of piperidine, triethylamine, benzyldimethylamine, N,N-dimethylaminopyridine, 2-(N,N-dimethylaminomethyl)phenol, tris(dimethylaminomethyl)phenol, 4,4'-diaminodiphenyl sulfone, 2-ethyl-4-methyl imidazole, and 1,1,3-trichlorotrifluoroacetone.

9. The method of claim 1, wherein the composition further comprises at least one of acrylic acid and acrylamide.

10. The method of claim 1, wherein the alkenoate ester is a $(C_1-C_{30})$alkyl $(C_1-C_{10})$alkenoate ester or a poly$((C_2-C_{30})$alkenyene oxide$)$ $(C_1-C_{10})$alkenoate ester, wherein the $(C_1-C_{30})$alkyl, $(C_2-C_{30})$alkenyene, and $(C_1-C_{10})$alkenoate are independently substituted or unsubstituted.

11. The method of claim 1, wherein the alkenoate ester has the structure

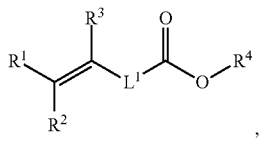

wherein
$R^1$, $R^2$, and $R^3$ are each independently selected from the group consisting of —H and substituted or unsubstituted $(C_1-C_{30})$hydrocarbyl interrupted or terminated by 0, 1, 2, or 3 atoms selected from the group consisting of O, NH, and S,
$L^1$ is independently selected from a bond and substituted or unsubstituted $(C_1-C_{30})$hydrocarbylene interrupted or terminated by 0, 1, 2, or 3 atoms selected from the group consisting of O, NH, and S, and
$R^4$ is independently selected from the group consisting of (i) a substituted or unsubstituted $(C_1-C_{30})$hydrocarbyl interrupted or terminated by 0, 1, 2, or 3 atoms selected from the group consisting of O, NH, and S, and (ii) —R—(O—R)$_n$—OH, wherein R is a substituted or unsubstituted $(C_2-C_{10})$hydrocarbylene and n is 0 to 10,000.

12. The method of claim 1, wherein the alkenoate ester has the structure

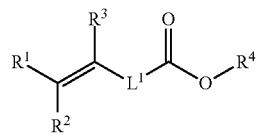

wherein
$R^1$, $R^2$, and $R^3$ are each independently selected from the group consisting of —H and substituted or unsubstituted $(C_1-C_{30})$hydrocarbyl interrupted or terminated by 0, 1, 2, or 3 atoms selected from the group consisting of O, NH, and S,
$L^1$ is independently selected from a bond and substituted or unsubstituted $(C_1-C_{30})$hydrocarbylene interrupted or terminated by 0, 1, 2, or 3 atoms selected from the group consisting of O, NH, and S, and
$R^4$ is selected from the group consisting of
(i) a substituted or unsubstituted $(C_1-C_{30})$hydrocarbyl interrupted or terminated by 0, 1, 2, or 3 atoms selected from the group consisting of O, NH, and S, and
(ii) —R—(O—R)$_n$—OH, wherein R is a substituted or unsubstituted $(C_2-C_{10})$hydrocarbylene and n is 0 to 10,000; and
wherein the dialkenyldihydrocarbylammonium halide has the structure

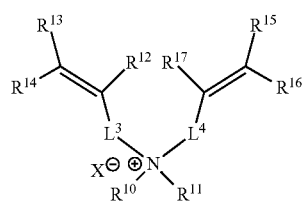

wherein
$X^-$ is selected from the group consisting of $I^-$, $Br^-$, and $Cl^-$,
$R^{12}$, $R^{13}$, $R^{14}$, $R^{15}$, $R^{16}$, and $R^{17}$ are each independently selected from the group consisting of —H and substituted or unsubstituted $(C_1-C_{30})$hydrocarbyl interrupted or terminated by 0, 1, 2, or 3 atoms selected from the group consisting of O, NH, and S,
$R^{10}$ and $R^{11}$ are each independently a substituted or unsubstituted $(C_1-C_{30})$hydrocarbyl interrupted or terminated by 0, 1, 2, or 3 atoms selected from the group consisting of O, NH, and S, and
$L^3$ and $L^4$ are independently selected from a bond and substituted or unsubstituted $(C_1-C_{30})$hydrocarbylene interrupted or terminated by 0, 1, 2, or 3 atoms selected from the group consisting of O, NH, and S.

13. The method of claim 1, wherein the polymer comprises repeating units having the structure

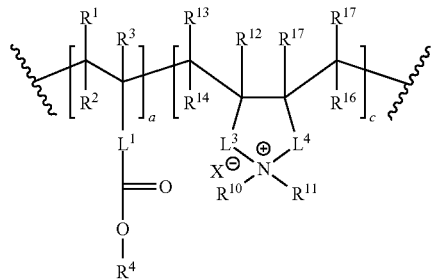

wherein the repeating units are in a block or random arrangement in the polymer wherein each repeating unit at each occurrence independently occurs in the orientation shown or in an opposite orientation,
wherein
$X^-$ is selected from the group consisting of $I^-$, $Br^-$, and $Cl^-$,
$R^1$, $R^2$, $R^3$, $R^{12}$, $R^{13}$, $R^{14}$, $R^{15}$, $R^{16}$, and $R^{17}$ at each occurrence are each independently selected from the group consisting of –H and substituted or unsubstituted $(C_1-C_{30})$ hydrocarbyl interrupted or terminated by 0, 1, 2, or 3 atoms selected from the group consisting of O, NH, and S, $L^1$, $L^3$, and $L^4$ at each occurrence are each independently selected from a bond and substituted or unsubstituted $(C_1$-$C_{30})$hydrocarbylene interrupted or terminated by 0, 1, 2, or 3 atoms selected from the group consisting of O, NH, and S, $R^{10}$, $R^{11}$ at each occurrence are each independently substituted or unsubstituted $(C_1$-$C_{30})$hydrocarbyl interrupted or terminated by 0, 1, 2, or 3 atoms selected from the group consisting of O, NH, and S, at each occurrence $R^4$ is independently selected from the group consisting of (i) a substituted or unsubstituted $(C_1$-$C_{30})$hydrocarbyl interrupted or terminated by 0, 1, 2, or 3 atoms selected from the group consisting of O, NH, and S, and (ii) —R—(O—R)$_n$—OH, wherein R is a substituted or unsubstituted $(C_2$-$C_{10})$hydrocarbylene and n is 0 to 10,000, and wherein a is 1 to 100,000, and c is 1 to 100,000.

14. The method of claim 1, wherein the obtaining or providing comprises:

obtaining or providing the composition comprising:
0.001 to less than 80 wt. %, based on the total weight of the composition, of the alkenoate ester; and
20 to 99.999 wt. %, based on the total weight of the composition, of the dialkenyldihydrocarbylammonium halide.

15. A method of treating a subterranean formation, the method comprising:

placing in the subterranean formation a composition comprising
a $(C_1$-$C_{30})$hydrocarbyl $(C_1$-$C_{10})$alkenoate ester or a poly($(C_2$-$C_{30})$hydrocarbylene oxide) $(C_1$-$C_{10})$alkenoate ester, wherein the $(C_1$-$C_{30})$hydrocarbyl, $(C_2$-$C_{30})$hydrocarbyene, and $(C_1$-$C_{10})$alkenoate are independently substituted or unsubstituted; and
a di($(C_1$-$C_{30})$alkenyl)di($(C_1$-$C_{30})$hydrocarbyl))ammonium halide, wherein the $(C_1$-$C_{30})$alkenyl and the $(C_1$-$C_{30})$hydrocarbyl are each independently interrupted or terminated by 0, 1, 2, or 3 atoms selected from the group consisting of O, NH, and S and are independently substituted or unsubstituted;

polymerizing the $(C_1$-$C_{30})$hydrocarbyl $(C_1$-$C_{10})$alkenoate ester or the poly($(C_2$-$C_{30})$hydrocarbylene oxide) $(C_1$-$C_{10})$alkenoate ester and the di($(C_1$-$C_{30})$alkenyl)di($(C_1$-$C_{30})$hydrocarbyl))ammonium halide to form a polymer including an ammonium halide portion and a polyalkenoate portion;

mixing the polymer with a plurality of particulate substrates to provide coated particulates; and then placing the coated particulates downhole in the subterranean formation and thereby contacting the subterranean formation with the coated particulates, wherein the placing of the composition in the subterranean formation at least partially controls migration of downhole particulate and at least partially mitigates a production of water from the formation, wherein the ammonium halide portion of the polymer provides consolidation of the downhole particulate and the polyalkenoate portion of the polymer provides mitigation of the production of water.

16. The method of claim 15, wherein the method further comprises at least one of hydraulic fracturing or drilling.

17. A method of treating a subterranean formation, the method comprising:

obtaining or providing a composition comprising:
an alkenoate ester, having the structure

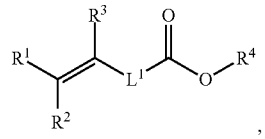

wherein
$R^1$, $R^2$, and $R^3$ are each independently selected from the group consisting of —H and substituted or unsubstituted $(C_1$-$C_{30})$hydrocarbyl interrupted or terminated by 0, 1, 2, or 3 atoms selected from the group consisting of O, NH, and S, $L^1$ is independently selected from a bond and substituted or unsubstituted $(C_1$-$C_{30})$hydrocarbylene interrupted or terminated by 0, 1, 2, or 3 atoms selected from the group consisting of O, NH, and S, and $R^4$ is selected from the group consisting of (i) a substituted or unsubstituted $(C_1$-$C_{30})$hydrocarbyl interrupted or terminated by 0, 1, 2, or 3 atoms selected from the group consisting of O, NH, and S, and (ii) —R—(O—R)$_n$–OH, wherein R is a substituted or unsubstituted $(C_2$-$C_{10})$hydrocarbylene and n is 0 to 10,000; and a dialkenyldihydrocarbylammonium halide having the structure

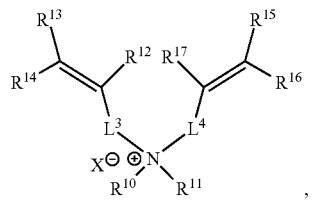

wherein
$X^-$ is selected from the group consisting of $I^-$, $Br^-$, and $Cl^-$, $R^{12}$, $R^{13}$, $R^{14}$, $R^{15}$, $R^{16}$, and $R^{17}$ are each independently selected from the group consisting of —H and substituted or unsubstituted $(C_1$-$C_{30})$hydrocarbyl interrupted or terminated by 0, 1, 2, or 3 atoms selected from the group consisting of O, NH, and S, $R^{10}$ and $R^{11}$ are each independently a substituted or unsubstituted $(C_1$-$C_{30})$hydrocarbyl interrupted or terminated by 0, 1, 2, or 3 atoms selected from the group consisting of O, NH, and S, and $L^3$ and $L^4$ are independently selected from a bond and substituted or unsubstituted $(C_1$-$C_{30})$hydrocarbylene interrupted or terminated by 0, 1, 2, or 3 atoms selected from the group consisting of O, NH, and S;

polymerizing the alkenoate ester and the dialkenyldihydrocarbylammonium halide to form a polymer including an ammonium halide portion and a polyalkenoate portion and comprising repeating units having the structure:

81

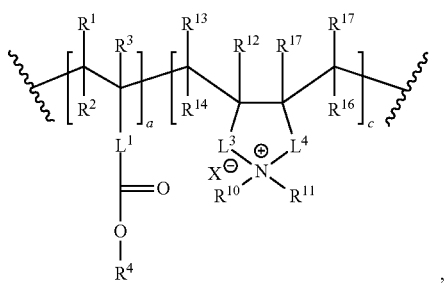

wherein a is 1 to 100,000, and c is 1 to 100,000; mixing the polymer with a plurality of particulate substrates to provide coated particulates; and then placing the coated particulates in a subterranean formation downhole, and thereby contacting the subterranean formation with the coated particulates, wherein the placing of the composition in the subterranean formation at least partially controls migration of downhole particulate and at least partially mitigates a production of water from the formation, wherein the ammonium halide portion of the polymer provides consolidation of the downhole particulate and the polyalkenoate portion of the polymer provides mitigation of the production of water.

18. The method of claim 17, wherein the method further comprises at least one of hydraulic fracturing or drilling.

19. The method of claim 17, wherein the composition further comprises at least one of:
a radical initiator;
a coupling agent comprising a diol, a polyol, a diamine, a polyamine, a silane, or any combination thereof;
a resin selected from the group consisting of an epoxide-containing resin, a polyepoxide resin, a novolak resin, a polyester resin, phenolaldehyde resin, a urea-aldehyde resin, a furan resin, a urethane resin, a glycidyl ether resin, or any combination thereof;
piperidine, triethylamine, benzyldimethylamine, N,N-dimethylaminopyridine, 2-(N,N-dimethylaminomethyl) phenol, tris(dimethylaminomethyl)phenol, 4,4'-diaminodiphenyl sulfone, 2-ethyl-4-methyl imidazole, or 1,1,3-trichlorotrifluoroacetone, or any combination thereof; or
acrylic acid, acrylamide, or a combination thereof.

82

20. The method of claim 17, wherein the obtaining or providing comprises:
obtaining or providing the composition comprising:
0.001 to less than 80 wt. %, based on the total weight of the composition, of the alkenoate ester, having the structure

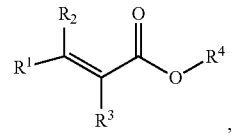

wherein R1, R2, and R3 are each independently selected from the group consisting of —H and methyl, and wherein R4 is selected from the group consisting of methyl and ethyl; and 20 to 99.999 wt. %, based on the total weight of the composition, of:
the dialkenyldihydrocarbylammonium halide having the structure

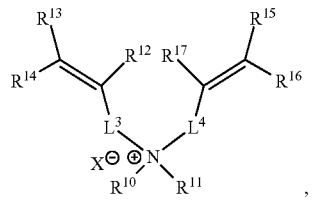

wherein:
X— is selected from the group consisting of I—, Br—, and Cl—,
R12, R13, R14, R15, R16, and R17 are each independently selected from the group consisting of —H and (C1-C5)alkyl,
R10 and R11 are each independently (C1-C10)alkyl,
at least one of R12, R13, and R14 is —H, and
at least one of R15, R16, and R17 is —H.

* * * * *

UNITED STATES PATENT AND TRADEMARK OFFICE
CERTIFICATE OF CORRECTION

| | | |
|---|---|---|
| PATENT NO. | : 11,130,907 B2 | Page 1 of 1 |
| APPLICATION NO. | : 16/731159 | |
| DATED | : September 28, 2021 | |
| INVENTOR(S) | : Nguyen et al. | |

It is certified that error appears in the above-identified patent and that said Letters Patent is hereby corrected as shown below:

In the Claims

In Claim 15, Column 79, Line 37: "$C_{30}$)hydrocarbyene, and ($C_1$-$C_{10}$)alkenoate are inde-" should read "$C_{30}$)hydrocarbylene, and ($C_1$-$C_{10}$)alkenoate are inde-"

Signed and Sealed this
Twenty-second Day of March, 2022

Drew Hirshfeld
*Performing the Functions and Duties of the*
*Under Secretary of Commerce for Intellectual Property and*
*Director of the United States Patent and Trademark Office*